United States Patent
Schmidt et al.

(10) Patent No.: US 10,913,053 B2
(45) Date of Patent: Feb. 9, 2021

(54) GERMANOSILICATE COMPOSITIONS AND METHODS OF PREPARING THE SAME

(71) Applicants: California Institute of Technology, Pasadena, CA (US); Chevron U.S.A., Inc., San Ramon, CA (US)

(72) Inventors: Joel E. Schmidt, Utrecht (NL); Mark E. Davis, Pasadena, CA (US); Ben W. Boal, Eugene, OR (US); Jong Hun Kang, Pasadena, CA (US); Dan Xie, Richmond, CA (US)

(73) Assignees: California Institute of Technology, Pasadena, CA (US); Chevron U.S.A., Inc., San Ramon, CA (US)

( * ) Notice: Subject to any disclaimer, the term of this patent is extended or adjusted under 35 U.S.C. 154(b) by 0 days.

(21) Appl. No.: 15/449,317

(22) Filed: Mar. 3, 2017

(65) Prior Publication Data
US 2017/0252729 A1    Sep. 7, 2017

Related U.S. Application Data

(60) Provisional application No. 62/440,742, filed on Dec. 30, 2016, provisional application No. 62/344,025, (Continued)

(51) Int. Cl.
*C01B 39/02* (2006.01)
*C01B 39/48* (2006.01)
(Continued)

(52) U.S. Cl.
CPC ............. *B01J 29/047* (2013.01); *B01J 29/70* (2013.01); *B01J 35/002* (2013.01); *B01J 37/08* (2013.01);
(Continued)

(58) Field of Classification Search
CPC ....... C01B 39/026; C01B 39/06; C01B 39/08; C01B 39/48; C01B 39/065; B01J 29/047;
(Continued)

(56) References Cited

U.S. PATENT DOCUMENTS

| 4,016,245 A | 4/1977 | Plank et al. |
| 4,481,177 A | 11/1984 | Valyocsik |

(Continued)

FOREIGN PATENT DOCUMENTS

| CN | 104370296 A | 2/2015 |
| EP | 0040016 A1 | 11/1981 |

(Continued)

OTHER PUBLICATIONS

Wagner et al, CIT-5: a high-silica zeolite with 14-ring pores (Year: 1997).*

(Continued)

*Primary Examiner* — David M Brunsman
(74) *Attorney, Agent, or Firm* — BakerHostetler

(57) ABSTRACT

The present disclosure is directed to novel germanosilicate compositions and methods of producing the same. In particular, this disclosure describes an array of transformations originating from the extra-large-pore crystalline germanosilicate compositions, designated CIT-13, possessing 10- and 14-membered rings. Included among the new materials are the new phyllosilicate compositions, designated CIT-13P, new crystalline microporous germanosilicates including high silica versions of CIT-5 and CIT-13, with and without added metal oxides, and new germanosilicate compounds designated CIT-14 and CIT-15. The disclosure also describes methods of preparing these new germanosilicate compositions as well as the compositions themselves.

26 Claims, 26 Drawing Sheets

Related U.S. Application Data filed on Jun. 1, 2016, provisional application No. 62/303,604, filed on Mar. 4, 2016.

(51) Int. Cl.

| | |
|---|---|
| B01J 29/70 | (2006.01) |
| B01J 29/04 | (2006.01) |
| C01B 39/06 | (2006.01) |
| C01B 39/08 | (2006.01) |
| B01J 35/00 | (2006.01) |
| B01J 37/08 | (2006.01) |
| B01J 37/10 | (2006.01) |
| B01J 37/30 | (2006.01) |
| C01B 39/46 | (2006.01) |

(52) U.S. Cl.
CPC ............ *B01J 37/10* (2013.01); *B01J 37/30* (2013.01); *C01B 39/026* (2013.01); *C01B 39/06* (2013.01); *C01B 39/065* (2013.01); *C01B 39/08* (2013.01); *C01B 39/46* (2013.01); *C01B 39/48* (2013.01); *B01J 2229/183* (2013.01); *B01J 2229/36* (2013.01); *B01J 2229/37* (2013.01); *C01P 2002/20* (2013.01); *C01P 2002/72* (2013.01); *C01P 2002/74* (2013.01); *C01P 2002/76* (2013.01); *C01P 2002/77* (2013.01); *C01P 2002/78* (2013.01); *C01P 2002/86* (2013.01)

(58) Field of Classification Search
CPC ... B01J 29/70; B01J 37/08; B01J 37/10; B01J 37/30; B01J 2229/183; B01J 2229/36; B01J 2229/37; C01P 2002/20; C01P 2002/72; C01P 2002/74; C01P 2002/76; C01P 2002/77; C01P 2002/78; C01P 2002/86

See application file for complete search history.

(56) References Cited

U.S. PATENT DOCUMENTS

| | | | |
|---|---|---|---|
| 4,544,538 A | 10/1985 | Zones | |
| 4,873,067 A | 10/1989 | Valyocsik et al. | |
| 4,900,528 A | 2/1990 | Lowe et al. | |
| 4,910,006 A | 3/1990 | Zones et al. | |
| 5,316,753 A | 5/1994 | Nakagawa | |
| 5,342,596 A | 8/1994 | Barri et al. | |
| 5,866,096 A | 2/1999 | Verduijn et al. | |
| 6,040,258 A | 3/2000 | Yoshikawa et al. | |
| 6,043,179 A | 3/2000 | Davis et al. | |
| 6,054,113 A * | 4/2000 | Vaughan | B01J 29/084 423/713 |
| 6,508,860 B1 | 1/2003 | Kulkarni et al. | |
| 6,827,843 B2 | 12/2004 | Elomari | |
| 6,841,063 B2 | 1/2005 | Elomari | |
| 6,916,459 B2 * | 7/2005 | Corma Canos | B01J 29/04 208/111.01 |
| 7,083,714 B2 | 8/2006 | Elomari | |
| 8,105,481 B2 | 1/2012 | Driver et al. | |
| 8,545,797 B2 * | 10/2013 | Davis | C01B 37/005 423/700 |
| 9,278,344 B2 | 3/2016 | Jothimurugesan et al. | |
| 2003/0170217 A1* | 9/2003 | Collins | A23C 9/1234 424/93.45 |
| 2004/0042958 A1* | 3/2004 | Canos | B01J 29/04 423/718 |
| 2010/0310449 A1* | 12/2010 | Lorgouilloux | B01J 20/10 423/704 |
| 2012/0275995 A1 | 11/2012 | Davis et al. | |
| 2016/0346771 A1 | 12/2016 | Schmidt et al. | |

FOREIGN PATENT DOCUMENTS

| | | | | |
|---|---|---|---|---|
| EP | 0170003 A1 | 2/1986 | | |
| EP | 1338561 A1 | 8/2003 | | |
| EP | 1413553 A1 * | 4/2004 | ............ | C01B 39/48 |
| EP | 1514844 A1 | 3/2005 | | |
| WO | WO 99/008961 A1 | 2/1999 | | |
| WO | 2010/118377 A2 | 10/2010 | | |

OTHER PUBLICATIONS

Firth et al, "Assembly-diassennbly-organization-reassembly synthesis of zeolites based on cfi-type layers", Chemistry of Materials (Jun. 8, 2017) pp. 5605-5611 (Year: 2017).*

Liu et al, "New insights into the degermanation process of ITQ-17 zeolites", Microporous and Mesoporous Materails 190 (2014) 171-180 (Year: 2014).*

Gao et al, "A Stable Extra-Large-Pore Zeolite with Intesecting 14- and 10-membered-Ring Channels", Chem. Eur. J., 22, 14367-14372 (Aug. 17, 2016) (Year: 2016).*

Boal et al, "Synthesis of Germanosilcate Molecular Sieves from Mono- and Di-Quaternary Ammonium OSDAs Constructed from Benzy Imidazolium Derivatives: Stabilization of Large Mlcropore Volumes Including Molecular Sieve CIT-13", Chem. Mater, 28, 2158-2164 (Mar. 18, 2016) (Year: 2016).*

Yannick (Journal of Solid State Chemistry; 182, (2009) 622-629.

Jinlong et al., "Synthesis and characterization of high siliceous ZSM-5 zeolite from acid-treated palygorskite", Powder Technology, Oct. 19, 2013, vol. 251, 9-14.

Roth et al., "Postsynthesis transformation of three-dimensional framework into a lamellar zeolite with modifiable architecture", Journal of the American Chemical Society, Apr. 1, 2011, vol. 133, 6130-6133.

Xu et al., "Post-synthesis treatment gives highly stable siliceous zeolites through the isomorphous substitution of silicon for germanium in germosilicates", Angewandte Chemie International Edition, Dec. 2013, vol. 53, 1355-1359.

Burel et al: "Quasi All-Silica Zeolite Obtained by Isomorphous Degermanation of an As-Made Germanium-Containing Precursor", Angewandte Chemie, International Edition, vol. 53, No. 5, Dec. 27, 2013 (Dec. 27, 2013), XP055606039 pp. 1360-1363.

Burel, et al: "Quasi All-Silica Zeolite Obtained by Isomorphous Degermanation of an As-Made Germanium-Containing Precursor"; Angewandte Chemie; Supporting Information © Wiley VCH 2014 69451 Weinheim, Germany; 7 pages.

European Patent Application No. 17760910.4: Communication pursuant to Rule 164(1) EPC, dated Dec. 9, 2019, 15 pages.

Araya et al., "Synthesis and Characterization of Zeolite Nu-10", Zeolites, Jul. 1984, vol. 4, pp. 281-286.

Atlas of Zeolite Framework Types, 6th Edition, 2007, 381-386.

Barri et al., "Structure of Theta-1, the first unidimensional medium-pore high-silica zeolite", Nature, Dec. 6, 1984, vol. 312, pp. 533-534.

Firth et al: Assembly-Disassembly-Organization-Reassembly Synthesis of Zeolites Based on cf i-Type Layers, ACS Publications, American Chemical Society, 2017, 29, 5605-5611.

Firth et al: Supporting Information, Assembly-diassembly-organisation-reassembly synthesis of zeolites based on cfi-type layers, 2017, pp. 1-6.

Highcock et al., "Structure of the New Zeolite Theta-1 Determined from X-ray Powder Data", Acta Cryst., 1985, C41, 1391-1394.

Hong, et al., "Synthesis Structure Solution, Characterization, and Catalytic Properties of TNU-10: A High-Silica Zeolite with the STI Topology", J. Am. Chem. Soc., 2004, vol. 126, 5817-26.

IZA-Structure-Commission, "Database of Zeolite Structures" http://izasc.biw.kuleuven.be/fmi/xsl/IZA-SC/ft.xsl, Accessed Jan. 7, 2016, 1 pg.

Jackowski, et al., "Diquatemary Ammonium Compounds in Zeolite Synthesis: Cyclic and Polycyclic N-Heterocycles Connected by Methylene Chains", J. Am. Chem. Soc. Jan. 7, 2009, vol. 131, 1092-100.

(56) References Cited

OTHER PUBLICATIONS

Li, et al., "Metal Exchanged Ferrierites as Catalysts for the Selective Reduction of NO with Methane", Appl. Catal. B Environ., 1993, vol. 3, L1-L11.

Liu et al: Supporting Information, Topotactic Conversion of Alkali-Treated Intergrown Germanosilicate CIT-13 into Single-Crystalline ECNU-21 Zeolite as Shape-Selective Catalyst for Ethylene Oxide Hydration, 2019, 1-22.

Liu et al: Topotactic Conversion of Alkali-Treated Intergrown Germanosilicate CIT-13 into Single-Crystalline ECNU-21 Zeolite as Shape-Selective Catalyst for Ethylene Oxide Hydration, Chem. Eur. J. 2019, 25, 1-11.

Lorgouilloux et al, "IM-16: A new microporous germanosilicate with a novel framework topology containing d4r and mtw composite building units", Journal of Solid State Chemistry, Mar. 2009, 182, 622-629.

Nakagawa, et al. "Guest/host Relationships in Zeolite Synthesis: Ring-Substituted Piperidines and the Remarkable Adamantane Mimicry by 1-azonio spiro [5.5] Undecanes" Microporous and Mesoporous Materials, 1998, vol. 22, 69-85.

Papiz et al., "Structure of the Zeolite Theta-1. Redetermination using single-crystal synchrotron-radiation data", Acta Cryst., 1990, C46, 172-173.

Parker et al., "Synthesis and some properties of two novel seolites, KZ-1 and KZ-2", Zeolites, Jan. 1983, vol. 3, pp. 8-11.

Pinar et al: "Location of Ge and extra-framework species in the zeolite ITQ-24", Dal Ton Transactions, vol. 44, No. 13, Jan. 1, 2015 (Jan. 1, 2015), pp. 6288-6295, XP055515909, GB, ISSN: 1477-9226, DOI: 0.1039/C4DT03831B.

Robson, "Verified Synthesis of Zeolitic Materials", Elsevier, Netherlands, 2001, 273 pgs.

Schmidt et al., "CIT-7, a crystalline, molecular sieve with pores bounded by 8 and 10- membered rings", Chemical Science, Jan. 2015, 6, 1728-1734.

Smeets, et al., "SSZ-45: A High-Silica Zeolite with Small Pore Openings, Large Cavities and Unusual Adsorption Properties", Chem. Mater, May 30, 2014, 12 pgs.

Wagner et al., "Guest Relationship in the Synthesis of the Novel Cage-Based Zeolites SSZ-35, SSZ-36, and SSZ-39", J. Am. Chem. Soc., Dec. 1999, 122(2), 263-273.

Wang, et al., "Synthesis and Crystal Structure of Zeolite RUB-41 Obtained as Calcination Product of a Layers Precursor: A Systematic Approach to a New Synthesis Route", Chem. Matter, 2005, vol. 17, 43-49.

Yilmaz, et al., "Al-RUB-41: A Shape-Selective Zeolite Catalyst from a Layered Silicate" Chem. Commun., Nov. 22, 2011, vol. 47, 1812-4.

Zeolites with Ton Structure Type, Chapter VI, pp. 233-249.

Zones et al., "Synthesis of High Silica Zeolites Using a Mixed Quaternary Ammonium Cation, Amine Approach: Discovery of Zeolite SSZ-47", Dec. 29, 2001, Chemistry of Materials, vol. 14, No. 1, 313-320.

Zones, et al., "Searching for New High Silica Zeolites Through a Synergy of Organic Templates and Novel Inorganic Conditions", Micro and Meso Materials, 1998, vol. 21, 199-211.

Zones, et al., "Strategies in Developing Routes to Commercialization of Novel High Silica Zeolites", Studies in Surface Science and Catalysis, 2005, vol. 158, 10 pgs.

\* cited by examiner

| Original Ge-CIT-13 2θ (°) | Miller Indices | Ex. 1 2θ (°) |
|---|---|---|
| 6.48 | (200) | 6.70 |
| 7.24 | (110) | 7.34 |
| 12.82 | (020) | ~13.2 |
| 18.34 | (420) | 18.74 |
| 18.76 | (112) | ~19.4 |
| 19.62 | (130) | 19.98 |
| 20.88 | (312) | 21.54 |
| 21.66 | (402) | 22.44 |
| 23.48 | (620) | 24.00 |
| 26.70 | (240) | 27.14 |

No paired Al-site was observed due to High Si/Al Ratio

Structure of CIT-13P layered phyllosilicate
"Idealized" structure of CIT-13P

Structure of CIT-13P close to the reality

| a (Å) | 17.4686 |
| b (Å) | 13.8271 |
| c (Å) | 5.1665 |
| α (°) | 90 |
| β (°) | 90 |
| γ (°) | 90 |
| Space Group | 65 (Cmmm) |

Peak list

| 2-Theta | Intensity |
|---|---|
| 8.15 | 36.9 |
| 10.13 | 100 |
| 12.8 | 44.7 |
| 16.35 | 50.67 |
| 19.03 | 74.63 |
| 19.97 | 71.52 |
| 20.33 | 32.02 |
| 23.79 | 23.79 |
| 23.91 | 67.6 |
| 24.1 | 41.49 |
| 24.63 | 22.41 |
| 25.77 | 44.22 |
| 26.41 | 18.02 |
| 26.73 | 8.02 |
| 27.75 | 12.39 |
| 32.15 | 6.68 |
| 32.82 | 5.71 |
| 34.73 | 16.07 |
| 35.39 | 6.49 |
| 37.78 | 14.12 |

GERMANOSILICATE COMPOSITIONS AND METHODS OF PREPARING THE SAME

CROSS REFERENCE TO RELATED APPLICATIONS

This application claims the benefit of priority to U.S. Patent Application Ser. Nos. 62/303,604, filed Mar. 4, 2016; 62/344,025, filed Jun. 1, 2016; and 62/440,742, filed Dec. 30, 2016.

TECHNICAL FIELD

The present disclosure is directed to novel germanosilicate compositions and methods of preparing the same. In particular, this disclosure describes an array of transformations originating from the extra-large-pore crystalline germanosilicate compositions, designated CIT-13, possessing 10- and 14-membered rings. Included among the new materials are new phyllosilicate compositions, designated CIT-13P, new crystalline microporous high silica germanosilicates of CIT-5 and CIT-13 topology, with and without added lattice metal oxides, and new high silica germanosilicate compounds designated CIT-14 and CIT-15, possessing 8 and 12 MR and 10 MR, respectively. The disclosure also describes methods of preparing these new germanosilicate compositions as well as the compositions themselves.

BACKGROUND

Zeolites play an important role as heterogeneous catalysts and are used in a variety of industrial settings. Initially, these materials were largely developed to support the petroleum industry in the quest to create more selective, robust catalysts for making gasoline and other fuels. Currently, these solids have emerged as specialty materials, with properties that are based upon structure and chemical composition able to handle specific large-scale applications. While there is a considerable effort that must go into bringing a new material from the discovery phase into a commercially viable catalyst, there remains room for discovery of new structures with the hope that one might emerge as superior to the existing materials.

One goal toward finding new materials has been the hope that increasingly large pores that retain some catalytic properties in their interior surfaces can be capable of handling larger feed molecules in the oil upgrade arena.

Hence, interest remains in the discovery of new crystalline phases for use in these applications. The present work is aimed at addressing the deficiencies in the art in this area.

SUMMARY

This disclosure is directed to new germanosilicates derived from the recently reported crystalline microporous germanosilicates with CIT-13 topology. as described in U.S. patent application Ser. No. 15/169,816, titled "Crystalline Germanosilicate Materials Of New CIT-13 Topology And Methods Of Preparing The Same" and filed Jun. 1, 2016. This reference is incorporated by reference herein in its entirety for all purposes, including the characterization and methods of making and using materials of the CIT-13 topology. These CIT-13 germanosilicates were prepared hydrothermally using benzyl-imidazoleum organic structuring directing agents and were characterized as possessing a three dimensional framework having pores defined by 10- and 14-membered rings (pore dimensions of 6.2×4.5 Å and 9.1×7.2 Å, respectively). These are the first known crystalline silicate with this architecture. These structures were characterized by their powder X-ray diffraction (PXRD) patterns, their unit cell parameters, SEM micrographs, $^{29}$Si MAS NMR spectroscopy, and adsorption/desorption isotherms.

The present disclosure is directed to methods of manipulating the structures of these CIT-13 germanosilicates, having a Si/Ge ratio in a range of from 3.8 to 10, by subjecting them to several reaction conditions. The present disclosure is also directed to products derived from such manipulations. In particular, the reactions include the application of heat, steam, and/or concentrated or dilute mineral acid, in the presence or absence of sources of various metal- or metalloid-oxides, to provide an array of new germanosilicate compositions. In each case, the reactions either depleted or rearranged the germania within the original structures, in some cases resulting in germanosilicates of CIT-13 topologies having higher Si/Ge ratios than accessible through hydrothermal syntheses. These germanosilicates may also be (a) optionally substituted with other metal oxides; (b) germanosilicates of CIT-5 topologies also having the same or higher Si/Ge ratios than accessible through hydrothermal syntheses and also optionally substituted with other metal oxides; (c) phyllosilicates comprising delaminated cfi-layers; and (d) new structures designated CIT-14 and CIT-15, resulting from the apparent pillaring and assembly of the novel phyllosilicates, respectively. The relative effects of these manipulations depends on the germania content of the starting germanosilicates of the present disclosure. See FIG. 1.

For example, some embodiments of the present inventions include crystalline microporous so-called high silicagermanosilicates of CIT-13 topology having Si/Ge ratios in a range of from about 25 to about 250 (Forms IA and IB) These Si/Ge ratios are sigificantly higher than those CIT-13 structures derived from hydrothermal syntheses, such as described in U.S. patent application Ser. No. 15/169,816 (e.g., Si/Ge=3.8 to 10). Yet, the PXRD patterns of these new high silica germansilicates show them to be structurally analogous to those prepared by these hydrothermal methods. The only significant difference in the PXRD patterns is the slight shift to higher 2-θ values of the (200) and (110) crystallographic planes, consistent with a depleted germania-rich D4R units in the high silica structures.

Other embodiments include crystalline microporous high silica-germanosilicates of CIT-13 topology (Si/Ge in a range of about 50 to about 200) which further comprise oxides of a metal or metalloid, M, where M is Al, B, Fe, Ga, Hf, Si, Sn, Ti, V, Zn, Zr, or a combination thereof, and M is present in the CIT-13 lattices in a Si/M ratio in a range of from about 25 to about 250. (Form IB).

These high silica germanosilicates can be prepared by treating the original hydrothermally-derived CIT-13 germanosilicates, having a Si/Ge ratio in a range of from about 4.5 to about 10, with concentrated mineral acids (e.g., ca. 1 M HNO$_3$) at elevated temperatures (e.g., from 170-225° C.) in the presence of sources of the corresponding metal or metalloid oxides. In some embodiments, the source of the M-oxides also provide the source of the acid, for example in the case of Al(NO$_3$)$_3$. In some specific embodiments, M is or comprises Al, B, Fe, Si, Sn, Ti, and/or Zn, most preferably Al. The high silica aluminogermanosilicates of CIT-13 topology are characterized herein as exhibiting a $^{27}$Al MAS NMR spectrum having a characteristic chemical shift at about 54 ppm, relative to 1 M aqueous aluminum nitrate solution, and as exhibiting a $^{29}$Si MAS NMR spectrum having characteristic chemical shifts at about −110 ppm and −115 ppm, relative to tetramethylsilane (TMS).

Still other embodiments of the present inventions include crystalline microporous germania-rich germansilicates of CIT-5 topology, having an Si/Ge ratio in a range of about 3.8 to about 5.4, preferably from 3.8 to 5 or 3.8 to 4.35 (Form II). These compositions having CIT-5 topology may be described as topotactic analogues (or resulting from the topotactic rearrangement) of the CIT-13 germanosilicates, in which the germania-rich D4R units of the latter are replaced by double zig-zag chains of germania in the former.

Such structures can be prepared by heating germanosilicates, having a Si/Ge ratio in a range of about 3.8 to about 5.4, preferably from 3.8 to 5 or 3.8 to 4.35, to at least one temperature in a range of from about 450° C. to about 1200° C., optionally with the stepwise or simultaneous application of steam (at a temperature in a range of from 600° C. to about 1000° C., more preferably in a range of from 700° C. to 900° C.), for a time sufficient so as to effect the transformation. Treating these germania-rich germanosilicates of CIT-5 with concentrated mineral acids (e.g., ca. 1 M $HNO_3$) at elevated temperatures (e.g., from 170-225° C.), results in the formation of high silica germanosilicates of CIT-5 topology, having Si/Ge ratios in a range of from 30 to 200 (Forms IIIA and IIIB). When this treatment with concentrated mineral acid is accompanied by the presence of sources of oxides of M, where M is Al, B, Fe, Ga, Hf, Si, Sn, Ti, V, Zn, Zr, or a combination thereof, the additional M oxide are incorporated into the lattice as such that the resulting Si/M ratio is in the range of from about 25 to 250 (Form IIIB). The manner of calcining appears to affect the morphology, and in some cases the structure, of the resulting products, whether the calcining is done in a static or rotating chamber. The use of a rotating chamber appears to be preferred.

Certain further embodiments of the present inventions include phyllosilicates, designated CIT-13P, having Si/Ge ratios ranging from about 40 to about infinitiy or from about 50 to about 100 (Form IV). These may be described as structures comprising the silica-rich cfi-layers resulting from the delamination of germania-rich germanosilicates of CIT-13 topology (Si/Ge=3.8 to about 4.5, 5, 5.4, or even 5.68), in which the germania-rich D4R layers are removed, leaving surface silanol (Si—OH) groups. Indeed, these structures can be derived from reacting the germania-rich germanosilicates of either CIT-13 or CIT-5 topology with dilute mineral acid (<0.3 M) at elevated temperatures (e.g., 90° C. to 120° C.). These phyllosilicates CIT-13P are characterized by a major peak in the powder X-ray diffraction (PXRD) pattern in a range of from about 6.9 to about 9 degrees 2-θ that is at a higher angle than the corresponding major peak in the crystalline microporous germania-rich germanosilicate composition designated CIT-13. Again, this shift to higher 2-θ angles in the phyllosilicate is consistent with the removal of the D4R units, and the closer pack stacking of the silica-rich cfi-layers.

These phyllosilicate structures are also capable of topotactic rearrangements to form new crystalline microporous structures, designated CIT-14 (Form VI) and CIT-15 (Form V) herein. Each of these are high silica germanosilicate frameworks, having Si/Ge ratios ranging from about 25 to infinity, including specific embodiments where this ratio is 75 to about 150 (in the case of CIT-14) or about 50 to about 100 (in the case of CIT-15).

The CIT-14 structures (Form VI) appear to be three-dimensional frameworks having pores defined by 8- and 12-membered rings, and have been characterized by PXRD patterns consistent with a structure having silica pillars between silica-rich cfi-layers.

The CIT-14 structures can be prepared by treating the phyllosilicates of CIT-13P topology with a source of silica in the presence of a concentrated mineral acid (e.g., HCl, or preferably $HNO_3$) at one or more temperatures in a range of from about 165° C. to about 225° C. for a time in a range of from 12 to 48 hours to form an intermediate composition, then isolating and calcining the intermediate composition so as to form a crystalline microporous silicate composition of CIT-14 topology.

The CIT-15 structures (Form V) comprise a three dimensional framework having pores defined by 10-membered rings (the pores being 5.6 Å×3.8 Å), and have been characterized by PXRD patterns. The CIT-15 structures can be prepared by calcining the phyllosilicates of CIT-13P topology at a temperature in a range of from 400° C. to about 950° C. so as to form a crystalline microporous silicate composition of CIT-15 topology.

In some aspects, the CIT-13P phyllosilicates may be characterized by their ability to provide the CIT-14 and CIT-15 structures, which are crystallographically simpler to characterize, under the conditions described herein.

In certain of these embodiments, the crystalline microporous solids are present in their hydrogen form. In other embodiments, the crystalline microporous solids containing at least one metal cation salt or a transition metal or salt in their micropores.

These catalysts may be used in a variety of organic and inorganic transformations, including but not necessarily limited to:

(a) carbonylating DME with CO at low temperatures;
(b) reducing NOx with methane:
(c) cracking, hydrocracking, or dehydrogenating a hydrocarbon;
(d) dewaxing a hydrocarbon feedstock;
(d) converting paraffins to aromatics:
(e) isomerizing or disproportionating an aromatic feedstock;
(f) alkylating an aromatic hydrocarbon;
(g) oligomerizing an alkene;
(h) aminating a lower alcohol;
(i) separating and sorbing a lower alkane from a hydrocarbon feedstock;
(j) isomerizing an olefin;
(k) producing a higher molecular weight hydrocarbon from lower molecular weight hydrocarbon;
(l) reforming a hydrocarbon
(m) converting a lower alcohol or other oxygenated hydrocarbon to produce an olefin products (including MTO);
(n) epoxiding olefins with hydrogen peroxide;
(o) reducing the content of an oxide of nitrogen contained in a gas stream in the presence of oxygen;
(p) separating nitrogen from a nitrogen-containing gas mixture; or
(q) converting synthesis gas containing hydrogen and carbon monoxide to a hydrocarbon stream; or
(r) reducing the concentration of an organic halide in an initial hydrocarbon product.

These transformations may be realized by contacting the respective feedstock with any one or more of the catalysts described herein, under conditions sufficient to affect the named transformation.

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, the presently disclosed subject matter is not limited to the specific methods, devices, and systems disclosed. In addition, the drawings are not necessarily drawn to scale. In the drawings:

FIGS. 7(A-B) show portions of the PXRD patterns for products of the reaction of 1 M nitric acid with hydrothermally synthesized CIT-13, reflecting the shift to higher angles of 2-θ after nitric acid treatments, showing shrinkage of (200) and (110) crystallographic planes with increasing Si.Ge ratios.

DETAILED DESCRIPTION OF ILLUSTRATIVE EMBODIMENTS

The present invention is directed to new compositions of matter, including those comprising crystalline microporous silicates, including germanosilicates, and methods of making and using these compositions The present invention may be understood more readily by reference to the following description taken in connection with the accompanying Figures and Examples, all of which form a part of this disclosure. It is to be understood that this invention is not limited to the specific products, methods, conditions or parameters described or shown herein, and that the terminology used herein is for the purpose of describing particular embodiments by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer to compositions and methods of making and using said compositions. That is, where the disclosure describes or claims a feature or embodiment associated with a composition or a method of making or using a composition, it is appreciated that such a description or claim is intended to extend these features or embodiment to embodiments in each of these contexts (i.e., compositions, methods of making, and methods of using). Where methods of treatment are described, unless otherwise specifically excluded, additional embodiments provide that the product compositions are isolated and optionally post-treated in a manner consistent with molecular sieve or zeolite syntheses.

Hydrothermally Prepared Germanosilicate Compositions of CIT-13 Topology.

Figure 1:
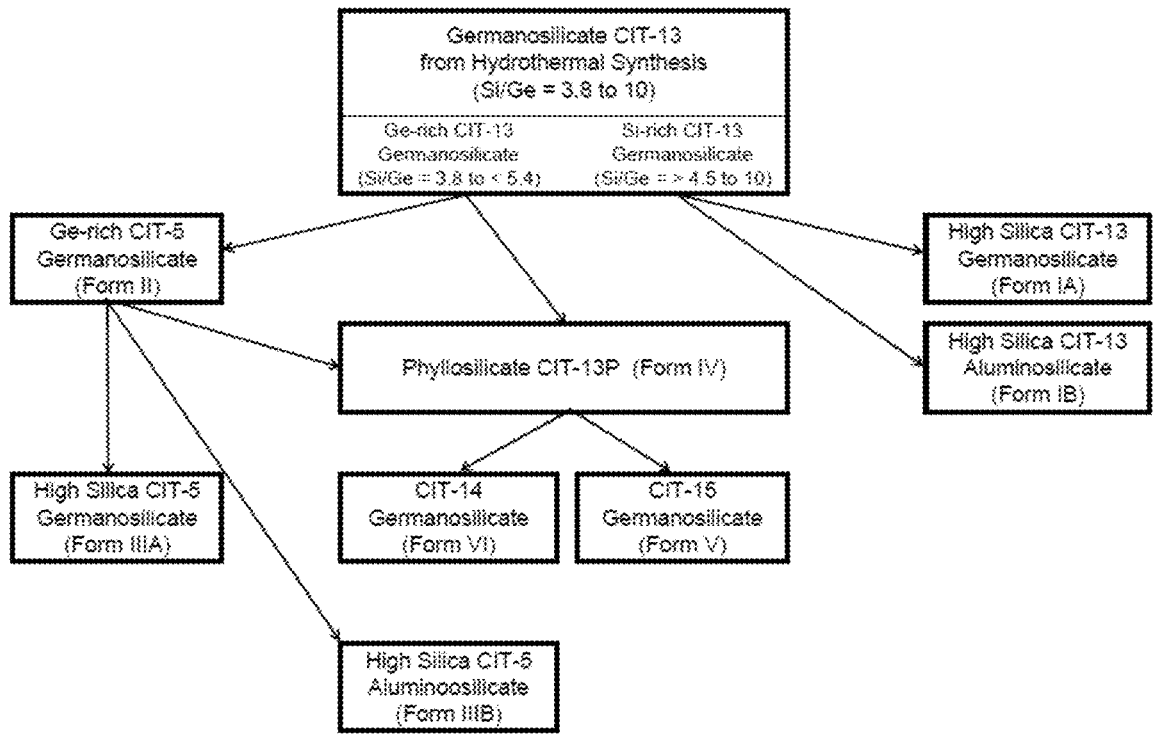
FIG. 1 shows illustrative schemes of some of the transformations discussed in this disclosure.
Figure 2:
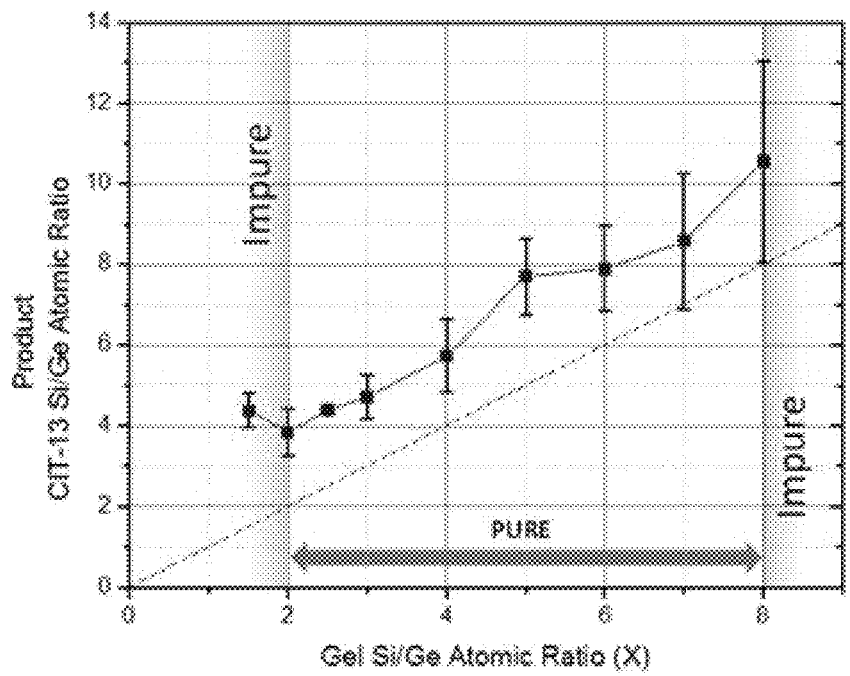
FIG. 2 shows the relationship of the Si/Ge ratio with respect to gels and calcined products for CIT-13 syntheses as characterized by EDS (from U.S. patent application Ser. No. 15/169,816).
Figure 3:
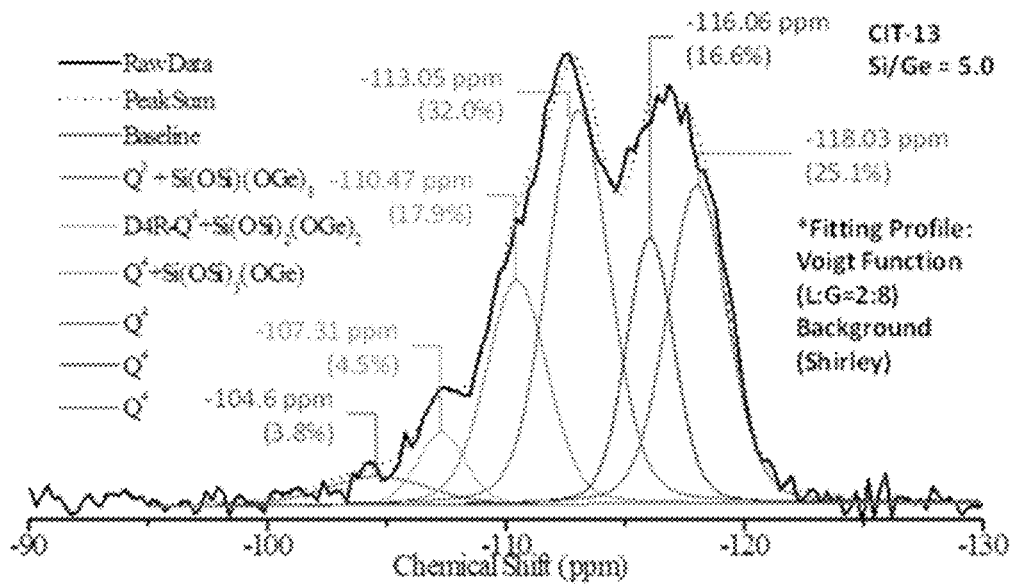
FIG. 3 shows the deconvoluted $^{29}$Si 8K MAS solid-state NMR spectra of as-calcined CIT-13 (Si/Ge=5.0), with chemical shifts at −104.6 ppm (3.8%), −107.31 ppm (4.5%), −110.47 ppm (17.9%), −113.05 ppm (32.0%), −116.06 ppm (16.5%), −118.03 ppm (25.1%). Solid line is actual spectrum; dotted line is sum of the indicated peaks (from U.S. patent application Ser. No. 15/169,816).

This disclosure is directed to new germanosilicates derived from the recently reported crystalline germanosilicate phase molecular sieve with CIT-13 topology. This CIT-13 topology is described in U.S. patent application Ser. No. 15/169,816, filed Jun. 1, 2016, which is incorporated by reference herein in its entirety for all purposes, including the characterization and methods of making and using materials of the CIT-13 topology. These reported crystalline microporous germanosilicate CIT-13 structures were prepared hydrothermally using benzyl-imidazolium organic structuring directing agents and characterized as possessing a three dimensional framework having pores defined by 10- and 14-membered rings (pore dimensions of 6.2×4.5 Å and 9.1×7.2 Å, respectively), are the first known crystalline silicate with this architecture. These structures, prepared over a Si/Ge range of 3.8 to 10 (see FIG. 2) were variously characterized by their powder X-ray diffraction (PXRD) patterns, their unit cell parameters (Table 1), SEM micrographs, $^{29}$Si MAS NMR spectroscopy, and porosimetry data. The $^{29}$Si MAS NMR spectra showed a plurality of silicon environments (FIG. 3), when Si/Ge=5.0, the complexity deriving from the presence of the germania-rich D4R units positioned between the silica-rich layers (see inset, FIG. 4).

TABLE 1

Unit cell parameters for hydrothermally derived CIT-13 germanosilicates, as provided in U.S. patent application Ser. No., 15/169,816

| Space group | Cmmm |
|---|---|
| a (Å) | 27.4374(5) |
| b (Å) | 13.8000(2) |
| c (Å) | 10.2910(2) |
| V (Å$^3$) | 3896.6(1) |
| Z | 8 |
| ρ (g/cm$^3$) | 2.144(2) |
| λ (Å) | 0.776381(1) |

Figure 4:
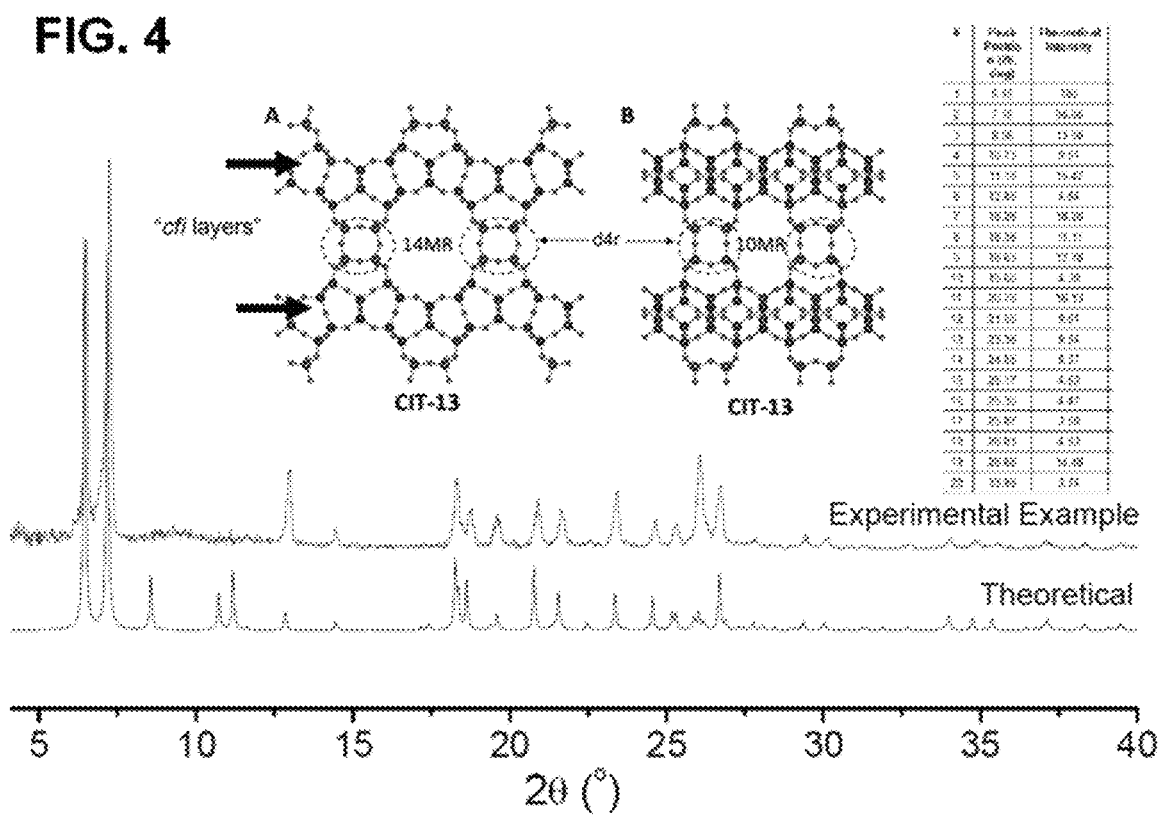
FIG. 4 shows representative PXRD data for hydrothermally synthesized CIT-13, theoretical and experimentally derived. See Table 10 for theoretical peak listings.

For purposes of the present discussion, these structures are described in terms of silica-rich cfi-layers, comprising tetrahedral arrays of silica groups, that are joined by germania-rich D4R units (see inset FIG. 4). The silica-rich cfi-layers, are so-called because they are comprised of cfi-composite building units, its name coming from the framework type CFI, of which CIT-5 is a notable example. The term "silica-rich' is used to allow for the presence of other metal or metalloid oxides present in this ideal silica lattice.

As is shown elsewhere herein, the transformations described herein generally retain the structure of these silica-rich cfi-layers, as evidenced crystallographically, and the product structures differ in the ways in which these silica-rich cfi-layers are joined with one another. The term "joined" refers to the bonding of of an arrangement of germania or other oxides (e.g., with D4R, double zig zag, pillared, or other arrangements between the layers, in positions which hold the silica-rich cfi-layers separate and parallel or practically parallel to one another. In the absence of such oxide bonding, and in some embodiments, the silica-rich cfi-layers comprise silanol (Si—OH) groups in at least some of the positions otherwise occupied by the bonded germania or other oxides.

The present application discloses new silicate compositions derived from the transformation of these crystalline microporous germanosilicate compositions designated CIT-13, having Si/Ge ratios in a range of from about 3.8 to about 10. Just as these germanosilicate precursors may also contain other metal or metalloid oxides in the lattice, so also can the resulting products contain the same or similar metal or metalloid oxides in their lattice before or after the transformations described herein.

Figure 24:
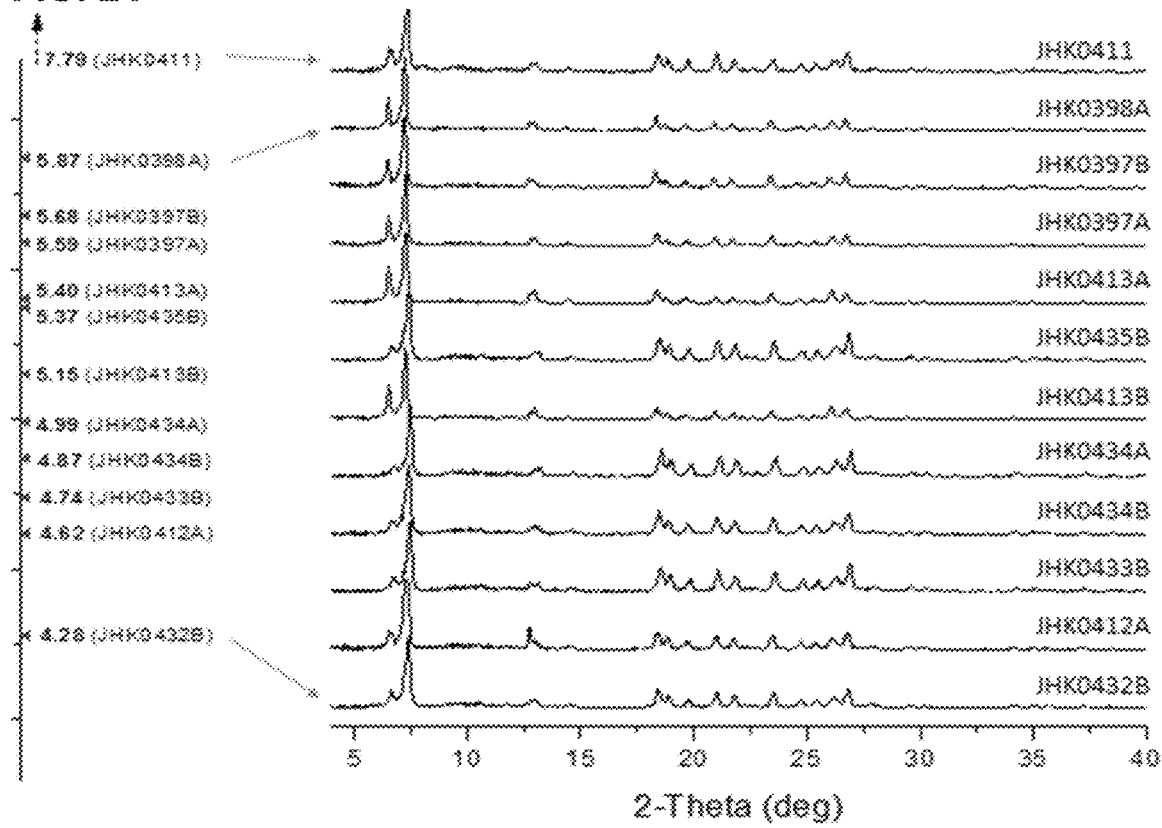
FIG. 24 shows the PXRD patterns of the precursor CIT-13 germanosilicates used to prepare the CIT-13P phyllosilicates over a range of Si/Ge ratios.
Figure 25:
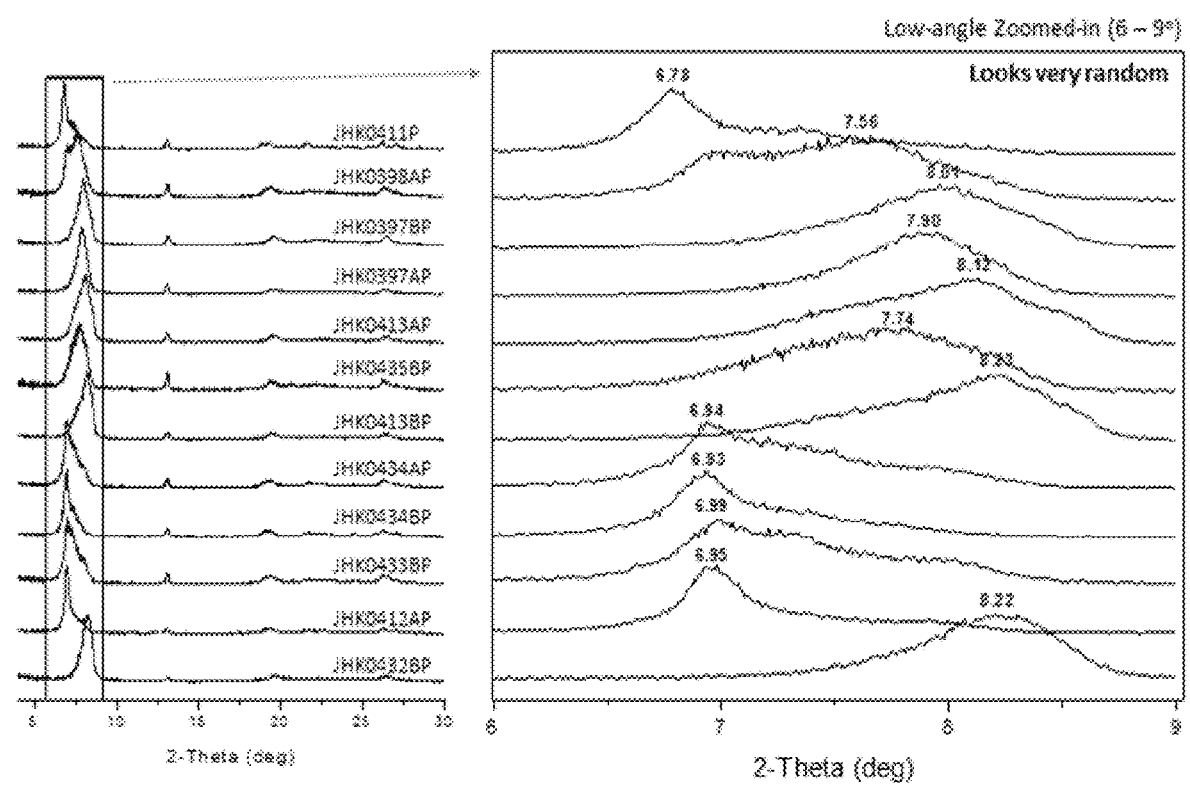
FIG. 25 shows the PXRD patterns of the corresponding CIT-13P phyllosilicates prepared from these precursors. The calcined precursors were treated with 0.1 M hydrochloric acid for 24 hours at 99° C. Y-axis numbers are Si/Ge ratios for the precursor CIT-13 germanosilicates.

For the sake of discussion herein, when used in the context of an overall composition, the term "germania-rich" refers to a germanosilicate composition having sufficient germania to favor a delamination as described below. Generally, such delaminations occur with germanosilicates of CIT-5 and CIT-13 topologies where the Si/Ge is less than about 5.68, 54, 5, 4.4, or 4.35. Having said this, depending on the accuracy of the Si and Ge analyses, some compositions have been seen to delaminate at higher apparent ratios, for example, at Si/Ge ratios as high as 5.4 or 5.68 (see, e.g., FIGS. 24, 25, and 31). When used in the context of the D4R or double zig-zag building block (e.g., "germania-rich D4R units), the germania content is much higher, and the Si/Ge ratios can approach or be practically zero (i.e., these units are practically entirely germania). By contrast, when used in the context of an overall composition, the term "silica-rich" refers to a composition which is not prone to delamination, presumably because of the silica content in the joining units is too refractory. Generally, this term is used in the context when the Si/Ge ratio is in a range of from about 5.4 to about 10. The term "high silica" refers to Si/Ge ratios in excess of this upper boundary; i.e., greater than about 10. The compositions of the present disclosure to which this term is applied generally has Si/Ge ratios in a range of from about 25 to about 250, or higher.

I. Reactions of Silica-Rich Germanosilicates of CIT-13 Topology with Concentrated Mineral Acids to Form High Silica Germanosilicate Compositions of CIT-13 Topology (Crystal Forms IA and IB)

Form IA:

Among the transformations being disclosed herein are the products which can be derived from the treatment of the silica-rich CIT-13 germanosilicates with concentrated mineral acids. The first of these new classes of materials includes embodiments which are crystalline microporous high silica-CIT-13 germanosilicates of having Si/Ge ratios in a range of from about 25 to about 250. These Si/Ge ratios of these materials are sigificantly higher than those CIT-13 germanosilicates synthesized from hydrothermal crystallizations, yet, the PXRD patterns of these high silica CIT-13 germansilicates show them to be structurally analogous to those prepared by these hydrothermal methods. The only significant difference in the PXRD patterns is the slight shift to higher 2-θ values of the (200) and (110) crystallographic planes, consistent with the relative amounts of germania-rich D4R units in the respective structures.

Form IB:

Other embodiments include crystalline microporous high silica-germanosilicates of CIT-13 topology (again, with Si/Ge ratios in a range of about 25 to about 250) which further comprise oxides of M, where M is Al, B, Fe, Ga, Hf, Si, Sn, Ti, V, Zn, Zr, or a combination thereof, and M is present in the CIT-13 lattices in a Si/M ratio in a range of from about 15 to about 200, preferably from about about 25 to about 250.

These high silica CIT-13 germanosilicates can be prepared by treating the original hydrothermally-derived CIT-13 germanosilicates having a Si/Ge ratio in a range of from about 4.5 to about 10, with concentrated mineral acids at elevated temperatures. In particular embodiments, "concentrated mineral acids" are defined broadly elsewhere herein, but in preferred embodiments, the mineral is or comprises nitric acid at concentrations in a range of 0.9 to 1.1 M. Similarly, the term "elevated temperature" is also defined elsewhere, but in this context is in a range of from about 160° C. to about 230° C., preferably about 175° C. to about 195° C.

As this transformation appears to be mainly a degermanation reaction, where the original hydrothermally-derived CIT-13 germanosilicates contain other metal or metalloid oxides in the framework, for example, in the cfi-layers, the resulting high silica CIT-13 germanosilicates also contain these features.

In expanded embodiments, these high silica CIT-13 germanosilicates have Si/Ge ratios in a range of from about 15 to about 250, and may be described in terms of Si/Ge ratios in one or more ranges from about 15 to about 25, from about 25 to about 50, from about 50 to about 75, from about 75 to about 100, from about 100 to about 125, from about 125 to about 150, from about 150 to about 200, and from about 200 to about 250 or higher (e.g., with the complete elimination of the germania).

Figure 5:
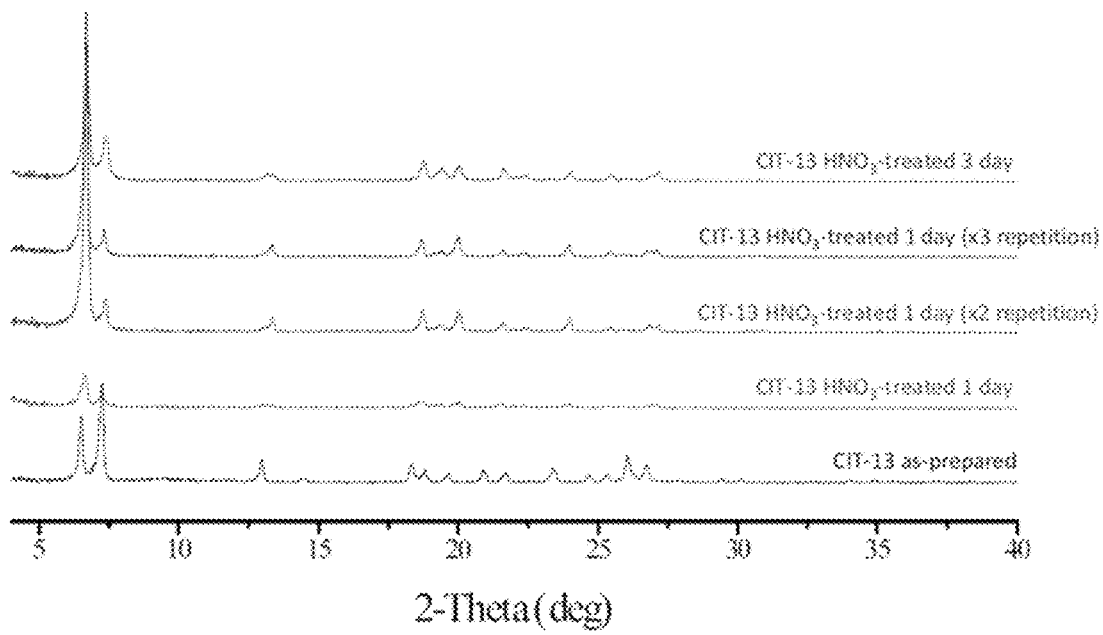
FIG. 5 shows exemplary PXRD data for silica-rich CIT-13 germanosilicate. See Table 2 for specific details.

In one exemplary set of representative experiments, silica-rich CIT-13 germanosilicate (Si/Ge=5.03±0.48) was treated with nitric acid (1 M) at 190° C. for 1-3 days (see Table 2, FIG. 5).

TABLE 2

Results of extracting samples of silica-rich CIT-13 germanosilicates in aqueous nitric acid (1M) at 190° C. for various times; see FIG. 5 for corresponding PXRD patterns

| Sample | Time of Exposure (days) | Framework | EDS (Si/Ge) |
| --- | --- | --- | --- |
| 1 | 0 (starting material) | CIT-13 | 5.03 ± 0.48 |
| 2 | 1 day | CIT-13 | 26.5 ± 16.1 |
| 3 | 2 x one day | CIT-13 | 67.2 ± 27.1 |
| 4 | 3 x one day | CIT-13 | 55.6 ± 10.5 |
| 5 | 3 days | CIT-13 | 122 ± 26 |

Figure 6:
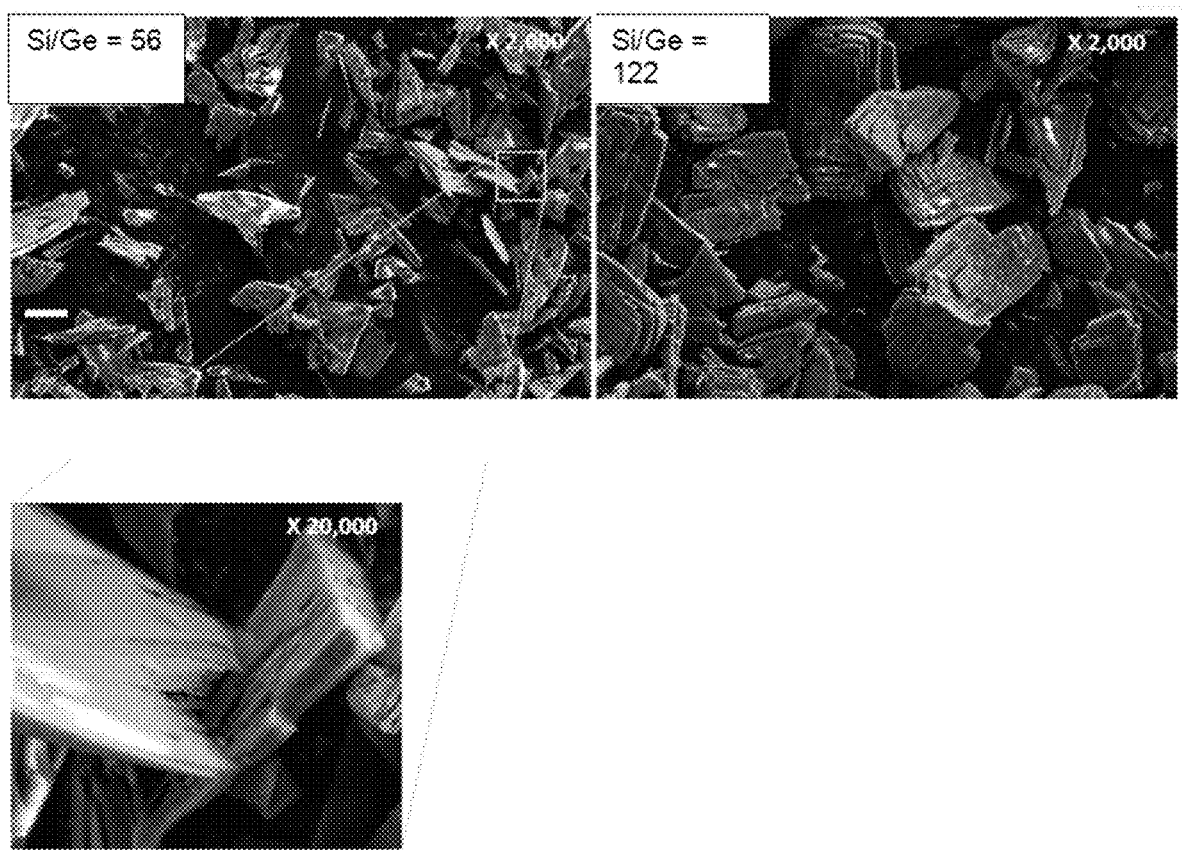
FIG. 6 shows illustrative morphologies for products resulting from the reaction of 1 M nitric acid with hydrothermally synthesized CIT-13. See Table 2 for specific details.
Figure 7A:
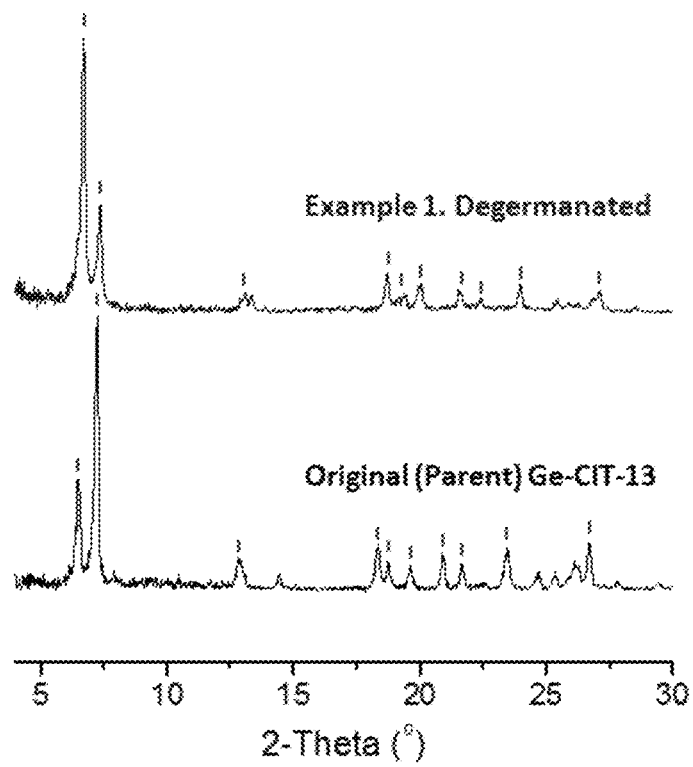
FIG. 7(A) shows full pattern.
Figure 7B:
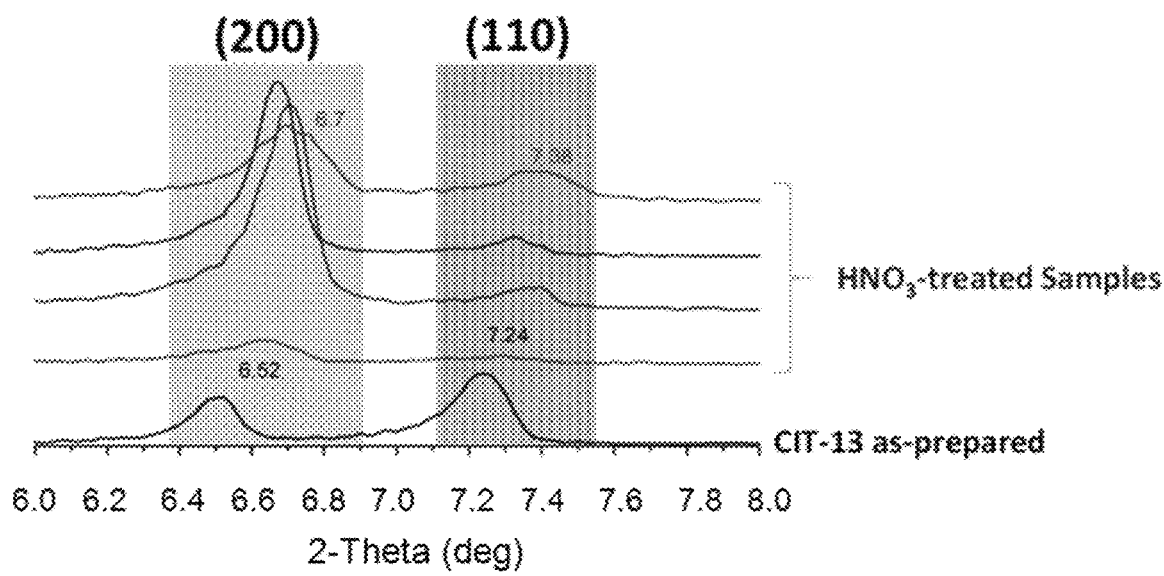
FIG. 7(B) shows selected peaks FIG. 8 illustrate the relative positions of the (200) and (110) crystallographic planes in the CIT-13 topology.
Figure 8:
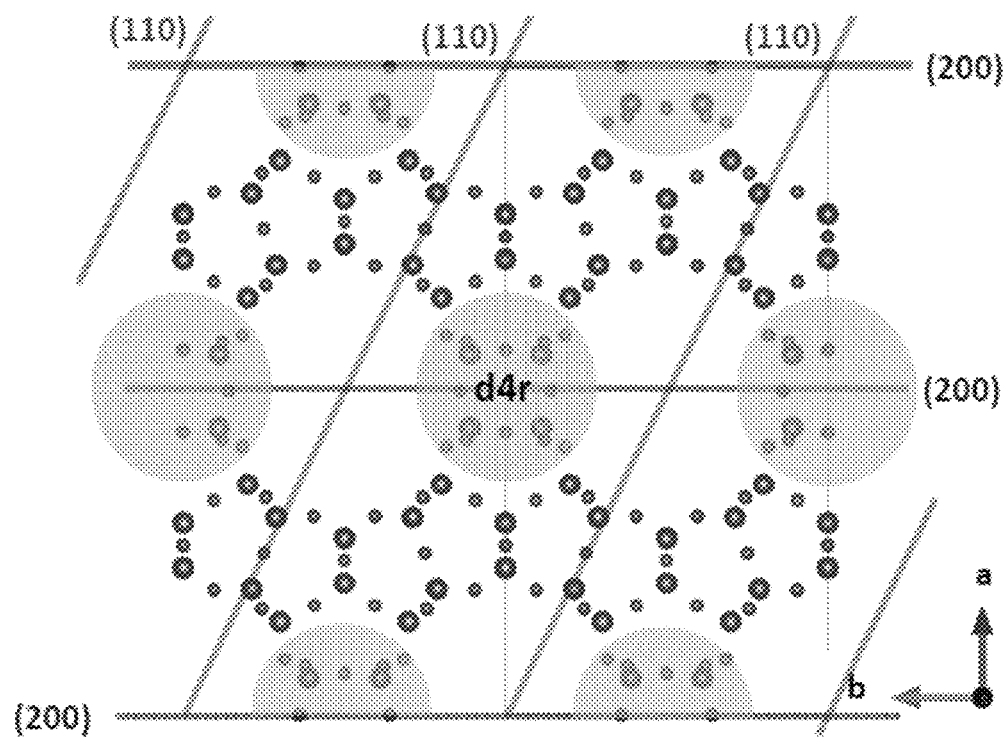

In each case, the CIT-13 framework was retained, while the Si/Ge ratio increased by factors of 5 to 25, with associated changes in morphologies of the resulting products (FIG. 6). Lesser or more severe treatments (by both time of exposure and temperature) may allow for ratios of from about 15 to about 250, or higher The high silica CIT-13 germanosilicates exhibit PXRD patterns consistent with their CIT-13 topologies, including the expected shift of the diffraction peaks associated with the (200) and (110) crystallographic planes to higher angles, relative to their lower silica analogs. Again, the higher 2-theta diffraction peaks associated with these crystallographic planes in the high silica CIT-13 germanosilicates reflect a more proximate spacing of these crystallographic planes in the product high silica CIT-13 materials than those of the latter hydrothermally treated starting materials. See FIGS. 7(A-B) and 8. For example, a high silica composition having Si/Ge of about 122 shows 2-θ of 6.7 and 7.38 for the (200) and (110) plane, corresponding to a shift of about 0.2 deg 2-theta relative to the corresponding silica-rich material (Si/Ge=5)

Figure 9:
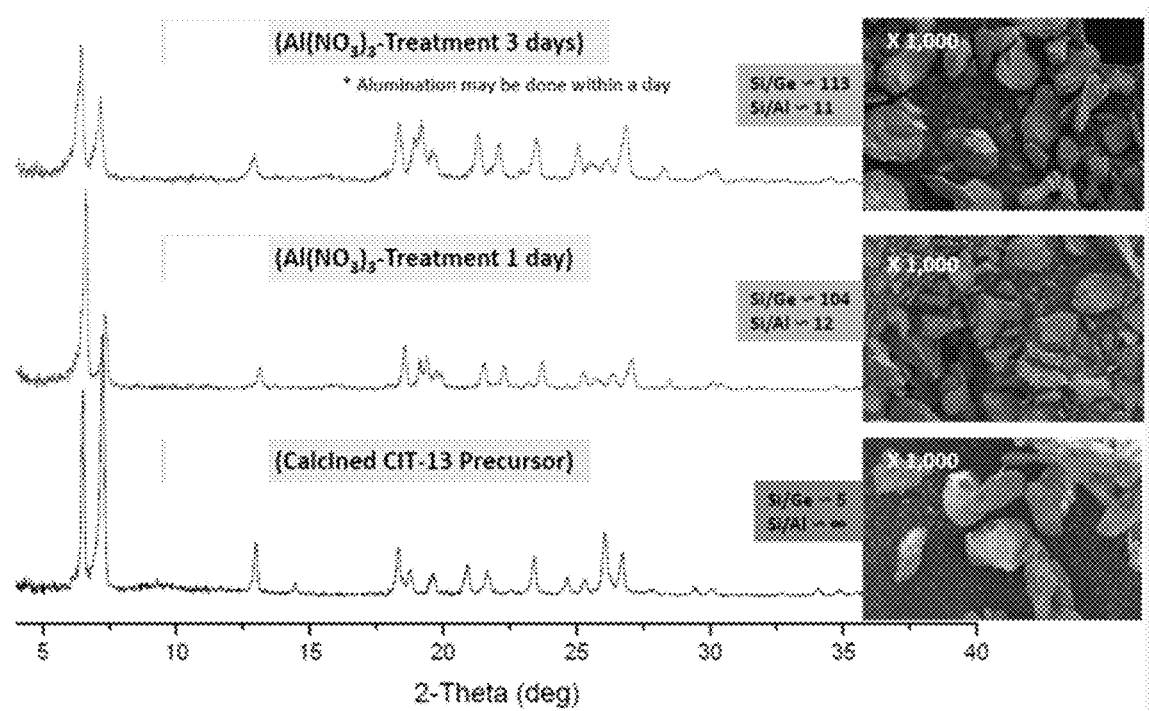
FIG. 9 shows representative data for the results of alumination/degermanation of CIT-13 using Al(NO$_3$)$_3$. See Table 3 for specific details.

When the high silica CIT-13 germanosilicates are treated with concentrated mineral acids in the presence of source of metal or metalloid oxides, M-oxides, these oxides can become incorporated into the CIT-13 lattice, displacing at least a portion of the germania-rich D4R units of the CIT-13 compositions. See Table 3 and FIG. 9.

TABLE 3

Alumination of CIT-13 Germanosilicate with 1M aqueous Al(NO₃)₃ at 170° C.

| Example | Time (days) | PXRD Result | Si/Al (EDS) | Si/Ge (EDS) |
| --- | --- | --- | --- | --- |
| 1 | 0 | Original CIT-13 | infinity | 5.08 ± 0.48 |
| 2 | 1 | Preserved CIT-13 | 11.7 ± 0.4 | 104 ± 14 |
| 3 | 3 | Preserved CIT-13 | 10.9 ± 0.3 | 113 ± 13 |

This reactivity has yielded new compositions which are both high in silica content and having incorporated metal or metalloid oxides in the germanosilica CIT-13 structures. These new structures are also considered separate embodiments of the present invention. In some embodiments, the source of the M-oxides also provides the source of the acid, for example in the case of Al(NO₃)₃. In some specific embodiments, M is or comprises Al, B, Fe, Ga, Hf, Si, Sn, Ti, V, Zn, Zr, or a combination thereof, preferably Al, B, Fe, Si, Sn, Ti, and/or Zn, most preferably Al. The high silica aluminogermanosilicates of CIT-13 topology are characterized herein as exhibiting PXRD patterns as described above (again, showing a displacement of the diffraction peaks associated with the (200) and (110) crystallographic planes. In these cases, the high silica CIT-13 germanosilicates further comprise M-oxides, where the Si/M ratio is in a range of from about 15 to about 200, preferably from about 30 to 200, and more preferably from about 40 to about 170.

In specific embodiments, the high silica CIT-13 germanosilicate is also an aluminosilicate (i.e., an aluminogermanosilicate), where aluminum is incorporated into the lattice, either or both in the D4R units or in the cfi-layers. The $^{27}$Al MAS NMR spectra of the CIT-13 aluminosilicates show characteristic chemical shifts at about 54 ppm, relative to 1 M aqueous aluminum nitrate solution, consistent with a tetrahedral environment of the aluminum. In some embodiments, the aluminosilicate further exhibits additional chemical shifts at or about 64.7 ppm and/or at or about 47.0 ppm. See FIG. 10. In other embodiments, some of the the aluminum is additionally present ex-framework, in the pore structures, as octahedral alumina. Some or all of this extra-framework alumina can be removed by chemical washing with an appropriate acid known to be useful for this purpose.

Figure 11A:
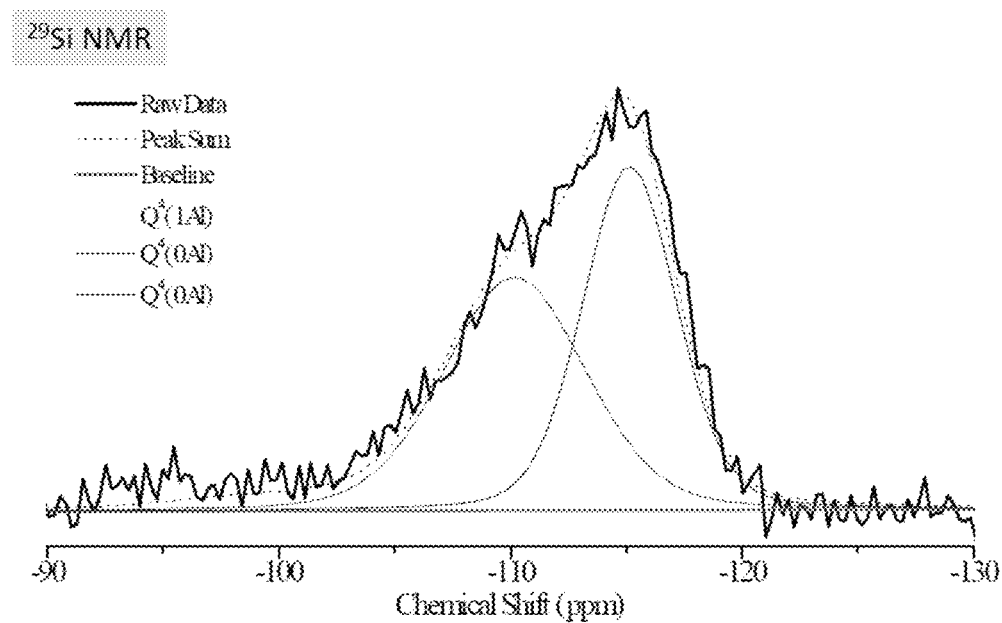
FIGS. 11(A-B) show deconvoluted $^{29}$Si 8K MAS solid-state NMR spectra of CIT-13 aluminosilicates at different alumina loading levels.
Figure 11B:
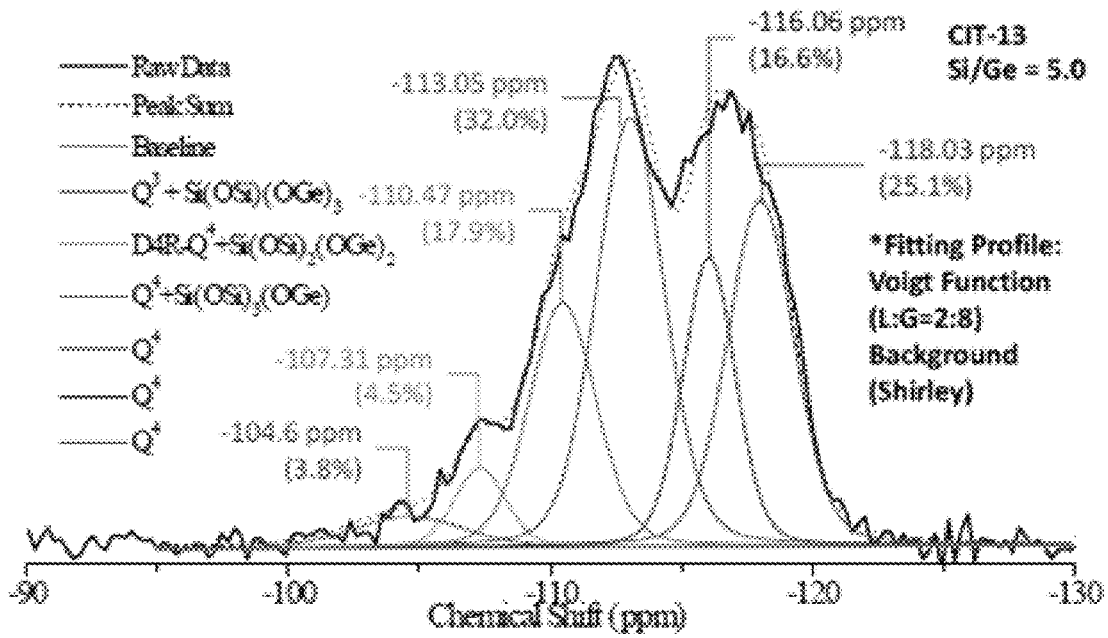

The CIT-13 aluminosilicates also exhibit $^{29}$Si MAS NMR spectra having characteristic chemical shifts at about −110 ppm and −115 ppm, relative to tetramethylsilane (TMS). See FIG. 11(A). In some cases, it is possible to detect additional shifts at about −108 ppm, attributed to Si in the D4R position, when the silica is sufficiently present in this environment. See FIG. 11(B), bottom spectrum.

Figure 12:
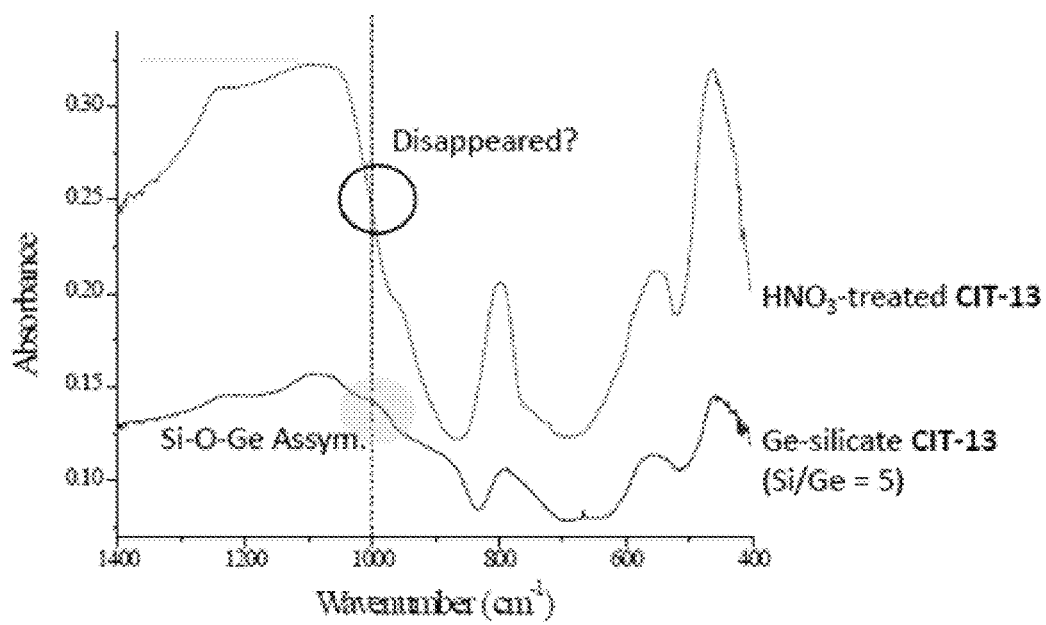
FIG. 12 shows the removal of the infrared peak at about 1000 cm$^{-1}$ that has been associated with a Ge—O—Si asymmetric vibration in the FTIR spectrum with following degermanation of CIT-13 germanosilicate (Si/Ge=5) with nitric acid.

Infrared spectroscopy can also provide some insights as to the framework elemental compositions accompanying these degermanation reactions. In some related systems, an infrared peak at about 1000 cm$^{-1}$ has been associated with a Ge—O—Si asymmetric vibration. As shown in FIG. 12, this peak appears in the CIT-13 germanosilicate (Si/Ge=5) and is removed or shifted on treatment with the HNO$_3$.

II. Reactions of Germania-Rich Germanosilicates of CIT-13 Topology . . .

The lability of the germania-rich D4R structures in the CIT-13 germanosilicates offers a rich chemistry, which differs depending on the germania content of the CIT-13 compositions. Considering first only the germania-rich germanosilicates, this can provide for delamination to form phyllosilicates (designated CIT-13P herein) or for topotactic rearrangements to form germania-rich germanosilicates of CIT-5 topology, which can further yield other new compositions. These are discussed separately herein.

A. The Application of Heat/Steam in the Absence of Added Mineral Acids to Form Germania-Rich Germanosilicates of CIT-5 Topology (Crystal Form II)

Figure 13:
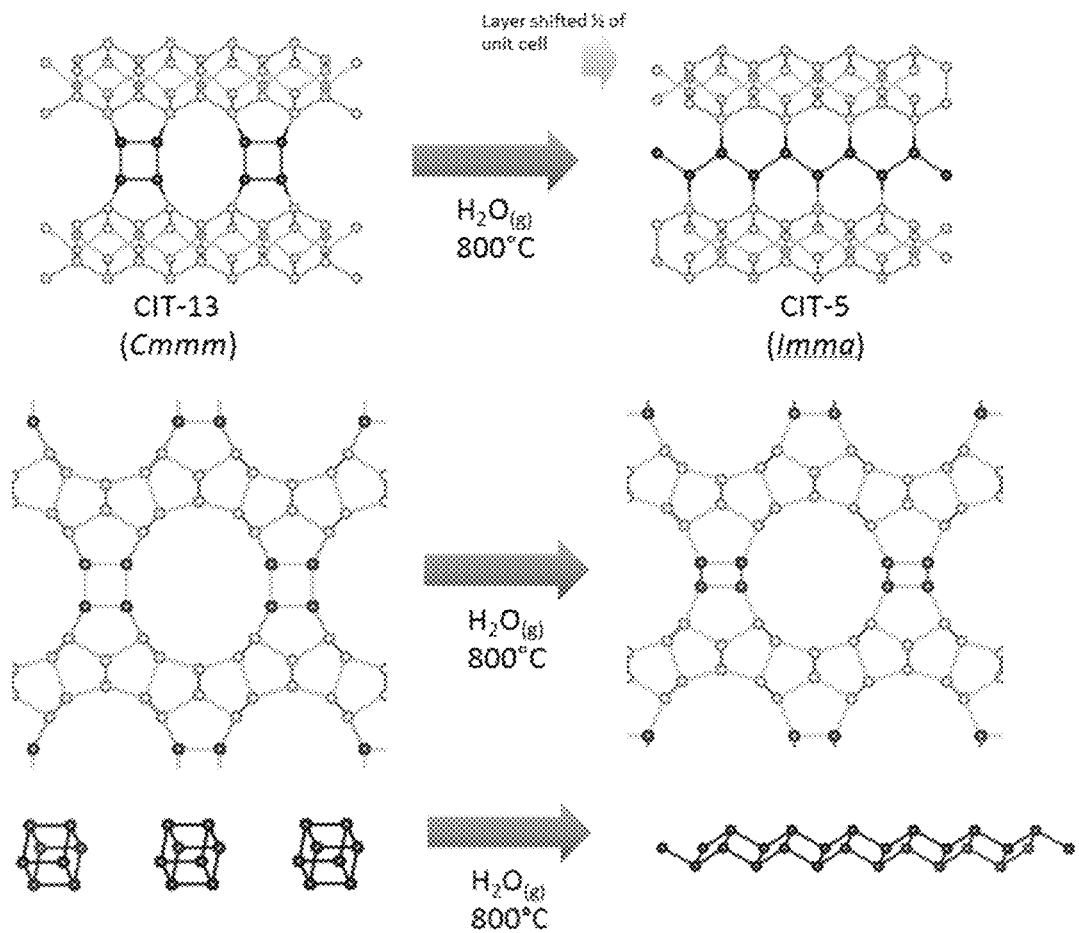
FIG. 13 shows a schematic representation of the changes associated with the transformation of CIT-13 germanosilicates to CIT-5 germanosilicates with the application of heat and optional steam.
Figure 14:
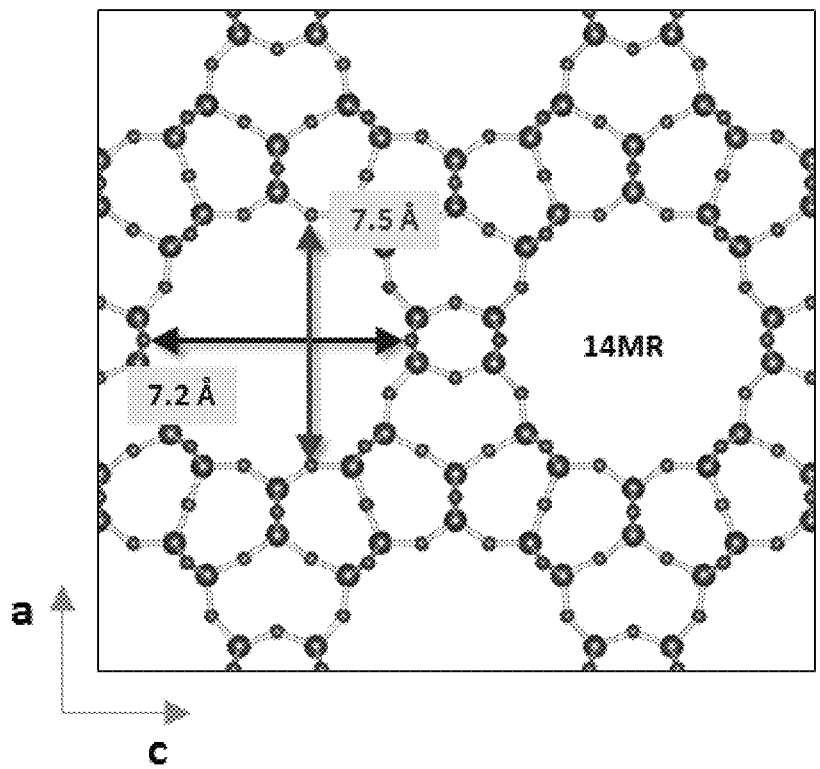
FIG. 14 shows a schematic representation of the pore size channel dimensions associated with CIT-5 germanosilicates. Pore data was adapted from IZA-Structure Database.

The germania-rich CIT-13 germanosilicates, where the Si/Ge ratio is in a range of from about 3.8 to about 5.4, preferably in a range of from about 3.8 to about 5, 4.5 or 4.35, topotactically rearrange in the presence of heat (air-calcining), and optionally/additionally in the presence of steam, to transform the CIT-13 topology to the first known germanosilicate compositions of CIT-5 topology. As shown schematically in FIG. 13, the transformation is consistent with the net rearrangement of at least a portion, and preferably all of, the germania-rich D4R units in the CIT-13 structure to a double zig-zag chain arrangement of the germania in the CIT-5 structure. Accordingly, the transformation of the CIT-13 topology to the CIT-5 topology typically and practically preserves the Si/Ge ratio of the former in the latter, while leaving the silica-rich cfi-layers largely unaffected. Also as illustrated in FIG. 13, the germania rich CIT-5 germanosilicates retains/contains the 14-membered pore, and differs from the absence of the 10-membered pores of the CIT-13 precursor.

Certain embodiments, then, provide for germanosilicates of the CIT-5 topology, having Si/Ge ratios in the range of from about 3.8 to about 5.4, or may be characterized as having a combination of two or more of the ratio ranges of from about 3.8 to about 3.9, from about 3.9 to about 4.0, from about 4.0 to about 4.1, from about 4.1 to about 4.2, from about 4.2 to about 4.25, from about 4.25 to about 4.3, from about 4.3 to about 4.35, from about 4.35 to about 4.3, from about 4.3 to about 4.35, from about 4.35 to about 4.5, from about 4.5 to about 4.55, from about 4.55 to about 4.6, from about 4.5 to about 4.65, from about 4.65 to about 4.7. from about 4.6 to about 4.75, from about 4.75 to about 4.8, from about 4.7 to about 4.85, from about 4.85 to about 4.9, from about 4.9 to about 4.95, from about 4.95 to about 5.0, from about 5.0 to about 5.05, from about 5.05 to about 5.1, from about 5.1 to about 5.15. from about 5.15 to about 5.2, from about 5.2 to about 5.25, from about 5.25 to about 5.3, from about 5.3 to about 5.35, or from about 5.35 to about 5.4.

It should be appreciated that, since transformation of the CIT-13 to the CIT-5 topologies appears to effect mainly the D4R units of the CIT-13 germanosilicates, the metal or metalloid oxide content within the cfi-layers of the CIT-5 products should mirror and be available from the CIT-13 precursors. For example, the lattice framework of the germania-rich CIT-5 may contain oxides of aluminum, boron, gallium, hafnium, iron, tin, titanium, vanadium, zinc, zirconium, or combination or mixture thereof derived from the precursor CIT-13 material.

A comparison of the PXRD data for these germania rich CIT-5 germanosilicates with their pure silicate analogs shows a good correlation, consistent with the CIT-5 structure. See Table 4 and FIGS. 15-18. In certain embodiments, then, the PXRDs of the germania rich CIT-5 germanosilicates are at least qualitative similar to other compositions of CIT-5 topologies, and in some cases may contain at least 5 of the characteristic peaks provided in Table 4 for this crystalline form. As is typically the case in metal substituted analogs, the presence of addition metal or metalloid oxides in the lattice may also be characterized by the PXRD patterns in Table 4. Some variability in the exact position is to be expected, based on the substitution of other metal oxides, and the skill artisan would be capable of recognizing these variations.

TABLE 4

Comparison of PXRD Data for Pure Silica CIT-5 and Ge-rich Germanosilicate CIT-5; all data in deg. 2θ

| Pure silica CIT-5* | Ge-CIT-5** | Miller Indices** |
| --- | --- | --- |
| 6.95 ± 0.15 (vs) | 7.02 ± 0.15 | 002 |
| 7.3 ± 0.15 (s-vs) | 7.38 ± 0.15 | 101 |
| — | 13.04 ± 0.15 | 200 |
| 13.9 ± 0.15 (w-s) | ~13.9 | 004 |
| 19.0 ± 0.15 (w-vs) | ~19.0 | 204 |
| 20.0 ± 0.15 (m-vs) | ~20.0 | 112 |
| 20.5 ± 0.15 (w-s) | — | — |
| 20.9 ± 0.15 (w-vs) | — | — |
| 24.6 ± 0.15 (w-m) | — | — |
| 26.8 ± 0.15 (w-vs) | 27.06 ± 0.15 | 412 |

*Data from U.S. Pat. No. 6,043,179 (reported relative intensities provided in parentheses).
**GE-rich germanosilicate CIT-5

Also as described elsewhere herein, these germania-rich CIT-5 germanosilicates may be prepared by calcining and/or steam treating their germania-rich CIT-13 topologs, having Si/Ge ratios in a range of about 3.8 to about 5, 4.5, or 4.35, and in certain embodiments, the these germania-rich CIT-5 germanosilicates may be characterized as the product of these treatments. In some embodiments, the germania-rich CIT-13 germanosilicates are calcined in air or an otherwise oxidizing environment. In this case, calcining may include treating at one or more temperatures in a range of from about 500° C. to about 1200° C., which may be characterized as one or more ranges of from 500° C. to about 600° C., from 600° C. to 700° C., from 700° C. to 800° C., from 800° C. to 900° C., from 900° C. to 1000° C., from 1000° C. to 1100° C., or from about 1100° C. to about 1200° C., more preferably in a range of from about 700° C. to about 900° C., for a time sufficient so as to effect the conversion. Such time can typically range from 6 to 72 hours, though lesser times are generally preferred simply for economic reasons. Again, these treatments are done in the absence of acid materials, as the present of such acid is described herein as yielding other products.

The topotactic transformation may also be accomplish by the use of steam, and some embodiments provide for the use of steam by itself and other embodiments call for the use of steam after calcining. In those embodiments where the calcining is followed by the application of steam, the steam is provided at autologous pressures at one or more temperatures in a range of from from 600° C. to about 1000° C., preferably in a range of from 700° C. to 900° C.

Figure 15:
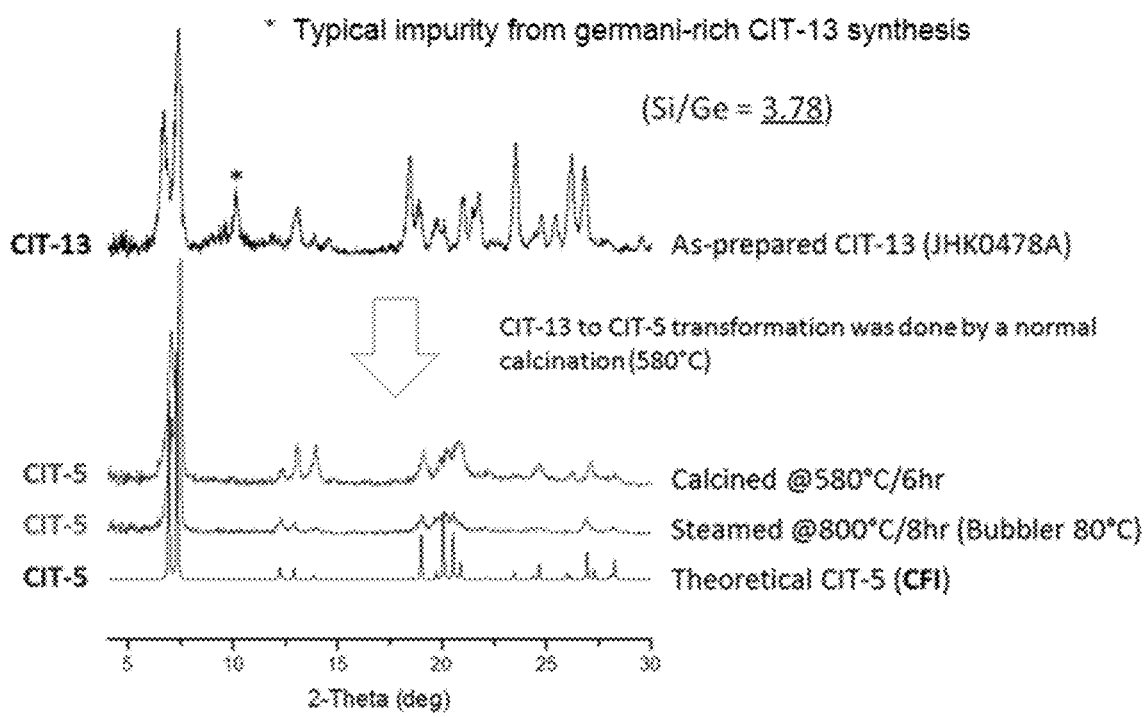
FIG. 15 shows PXRD pattern changes associated with calcining/steaming of CIT-13 germanosilicate (Si/Ge=3.78)
Figure 16:
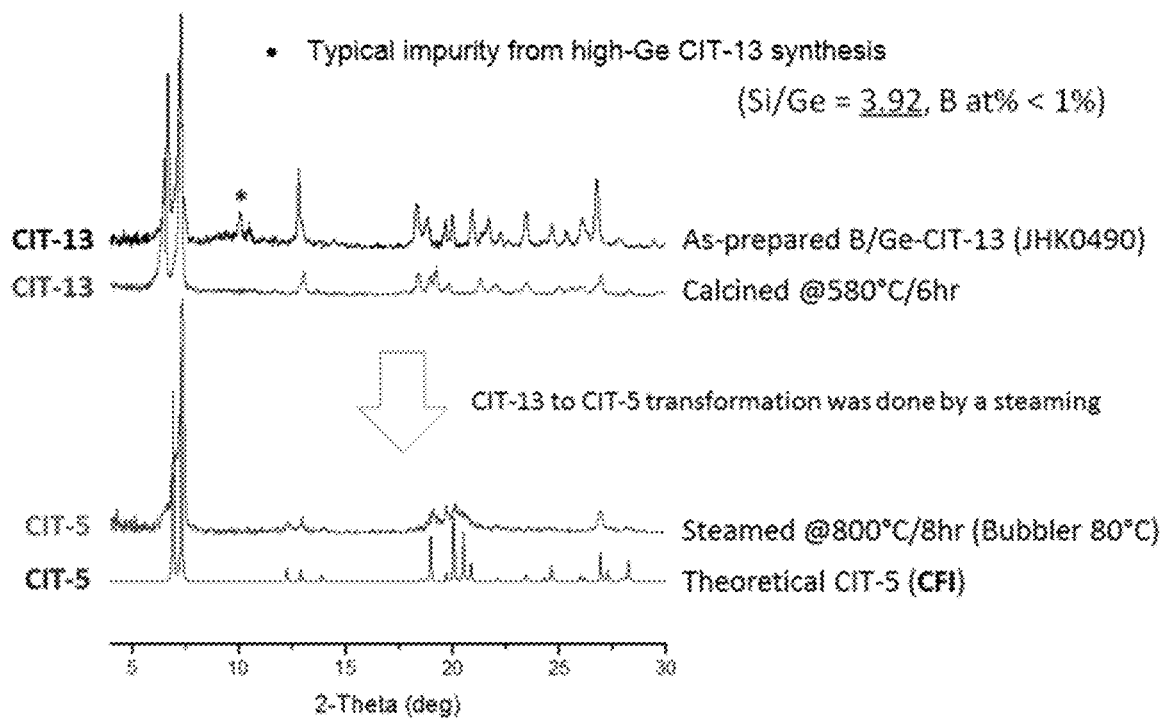
FIG. 16 shows PXRD pattern changes associated with calcining/steaming of B/Ge CIT-13 germanosilicate (Si/Ge=3.92, B<1 atom %).
Figure 17:
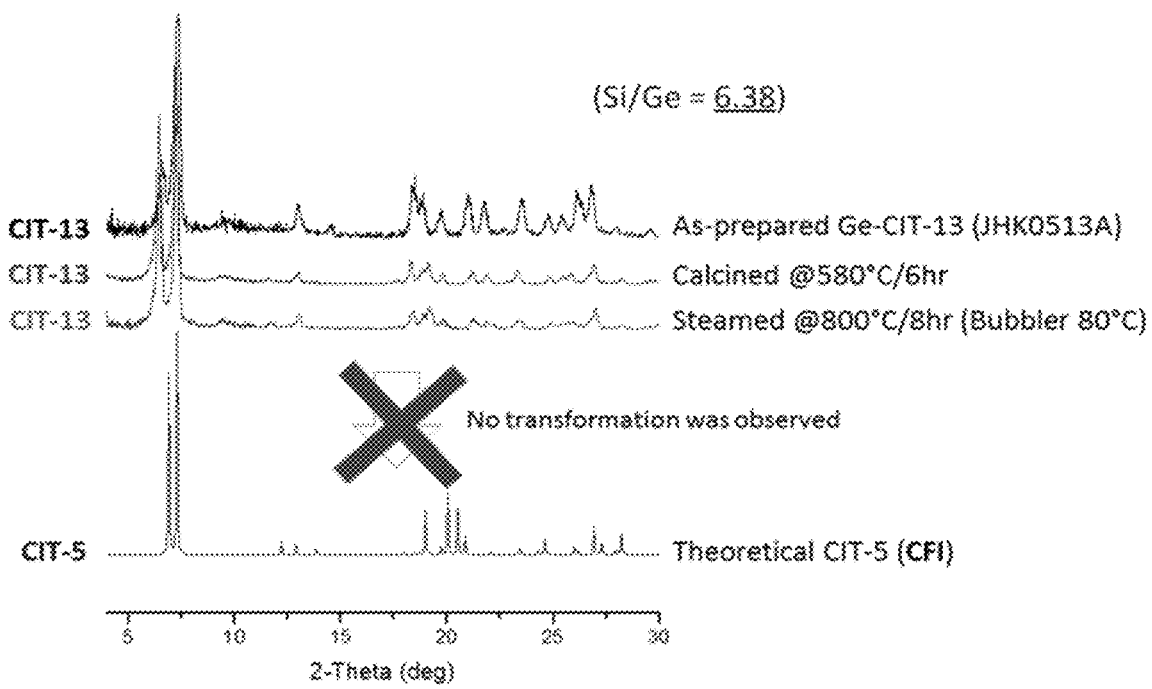
FIG. 17 shows absence of PXRD pattern changes associated with calcining/steaming of CIT-13 germanosilicate (Si/Ge=6.38).
Figure 18:
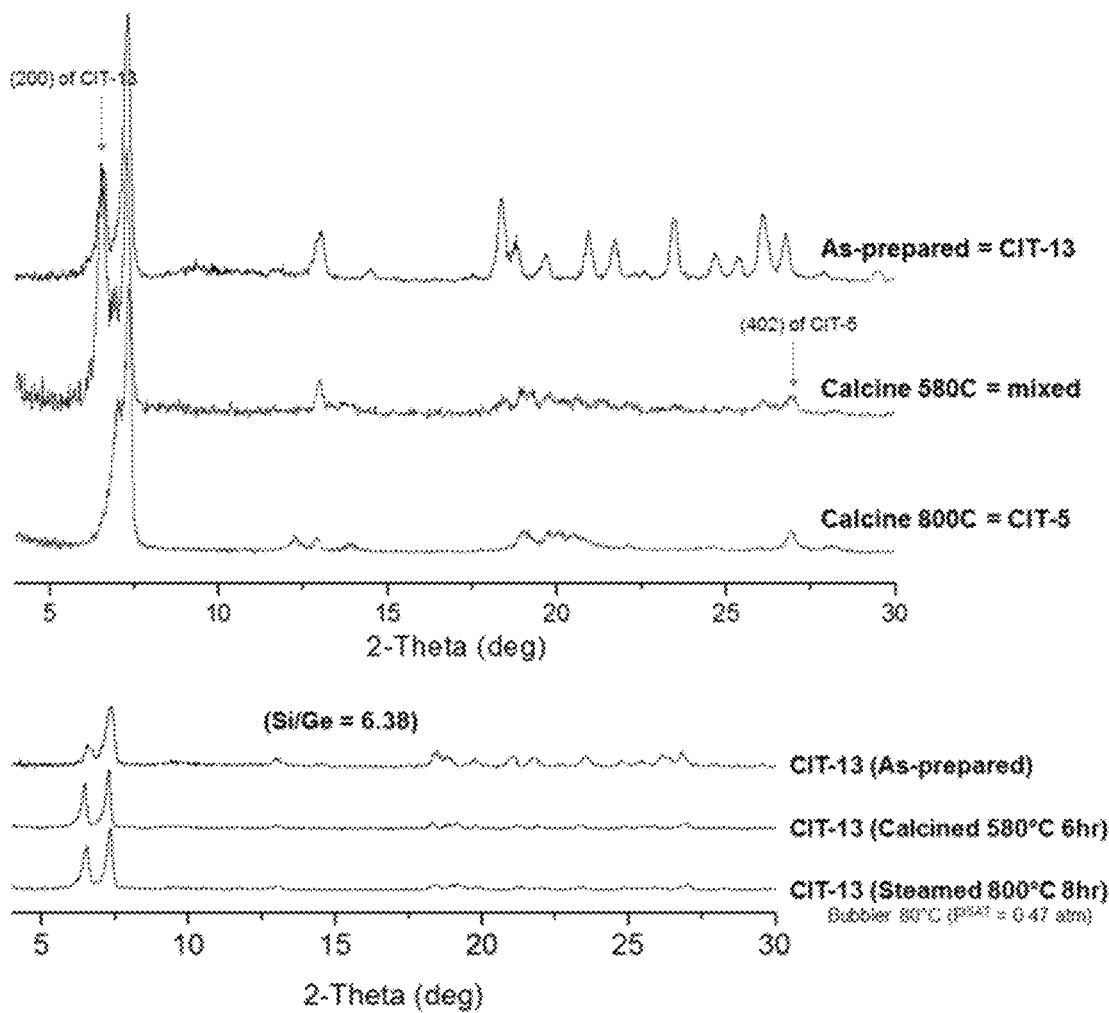
FIG. 18 shows PXRD pattern changes observed during calcining/steaming of CIT-13 germanosilicate, showing presence of either incomplete conversion to CIT-15 or reaction intermediate.
Figure 19A:
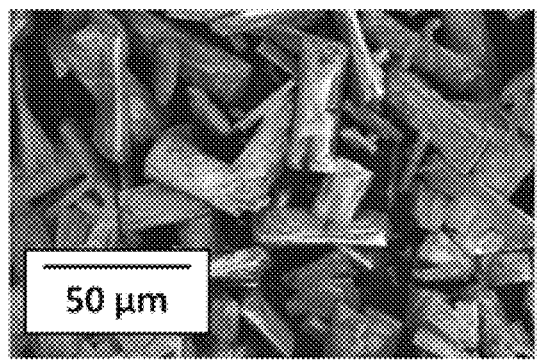
FIG. 19(A-F) shows product morphologies after calcining/steaming of CIT-13 germanosilicate. See Table 5. Results shown for FIG. 19(A): static oven, Si/Ge=3.84 (no transformation)
FIG. 19(B): rotating oven, Si/Ge=4.10 (CIT-5)
FIG. 19(C): rotating oven, Si/Ge=3.87 (CIT-5)
FIG. 19(D): static oven, Si/Ge=3.78 (no transformation)
FIG. 19(E): rotating oven, Si/Ge=6.60 (no transformation)
FIG. 19(F): static oven, Si/Ge=6.38 (no transformation).
Figure 19B:
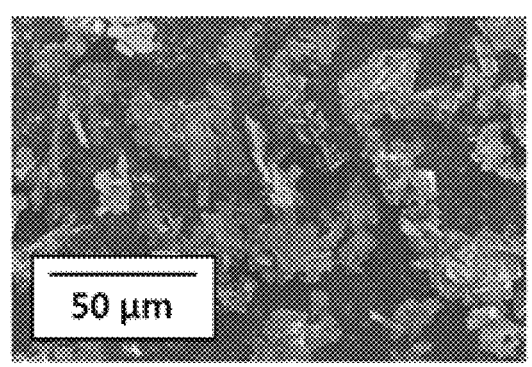
Figure 19C:
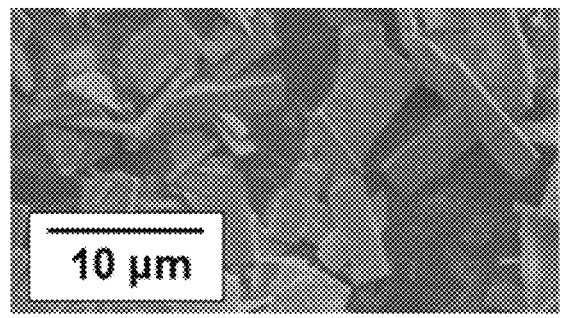
Figure 19D:
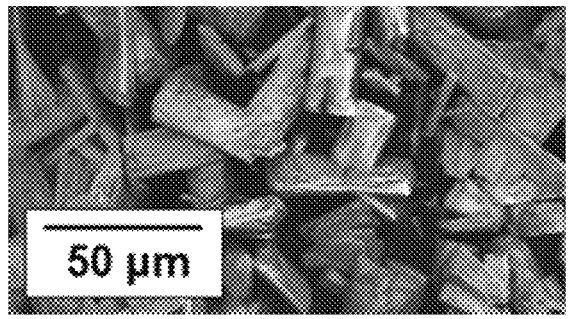
Figure 19E:
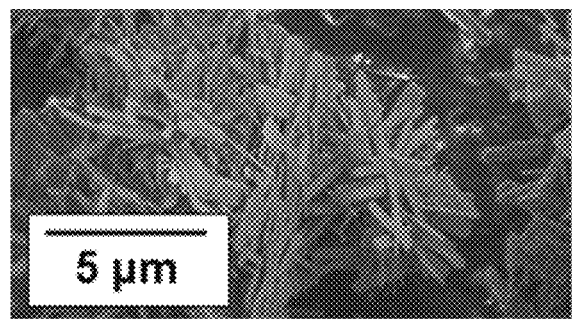
Figure 19F:
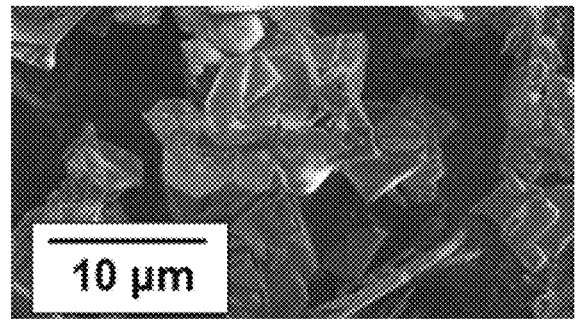

The manner in which the CIT-13 precursor materials are synthesized affects the eventual transformation to form the CIT-5 topology. In some cases, use of the different types of reactors can lead to different morphologies, and even different products. In separate embodiments, the synthesis of the CIT-13 precursor done in a static oven. In other embodiments, the synthesis of the CIT-13 precursor is done in a moving chamber, preferably a rotating chamber. Rotating chambers appear to yield finer crystals. See, e.g., Table 5 and FIGS. 15-17. As shown in Table 5, Ge-rich CIT-13 treated in rotary ovens transformed to germanosilicate CIT-5 at 580° C. (Si/Ge=3.87) (FIG. 15). Even after a harsh steaming process at 800° C./8 hr/$T_{bubbler}$=80° C., the CIT-5 framework of the originally prepared material was not broken (FIG. 17). After a calcination at 580° C. for 6 hr, CIT-13 (Si/Ge=4.22) had transformed to somewhere between CIT-13 and CIT-5, the PXPD profile showing both CIT-13 peaks and CIT-5 peaks (FIG. 18). This stage may simply be a mixture of CIT-13 phase and CIT-5 phase. Alternatively, this stage can be a dictionary-definition intermediate phase that is not CIT-13 nor CIT-5. This material completely transformed into CIT-5 after a 800° C./8 hr calcination A Ge-poor CIT-13 (Si/Ge=6.38) showed no phase transformation at any temperature. Even after a harsh steaming process at 800° C./8 hr/$T_{bubbler}$=80° C., the CIT-13 framework remained. Other experiments confirmed these limits. See FIGS. 19(A-F).

TABLE 5

Results of the transformations of CIT-13 germanosilicates to CIT-5 germanosilicates using steam/calcination.

| EDS Si/Ge | | CIT-13 to CIT-5 Transformation | | |
|---|---|---|---|---|
| Ratio of CIT-13 Precursor | Precursor Synthesis Oven Condition | Calcination 580° C. for 6 hours | Calcination 800° C. for 8 hours | Steaming 800° C. for 8 hours |
| 3.84 | Static | No | No | — |
| 3.87 | Rotary | Yes | Yes | Yes |
| 4.06 | Rotary | Yes | Yes | — |
| 4.1 | Rotary | Yes | Yes | — |
| 4.22 | Rotary | Yes | — | — |
| 4.28 | Static | Yes | — | — |
| 4.31 | Rotary | Yes | — | — |
| 4.35 | Rotary | Mix* | Yes | — |
| 4.72 | Static | No | No | — |
| 6.38 | Rotary | No | No | No |

See text, and FIGS. 15 to 19.

A1. Subsequent Reactions of the Germania-Rich Germanosilicates of CIT-5 Topology with Mineral Acid to Form High Silica Germanosilicates of CIT-5 Topology (Crystal Forms IIIA and IIIB)

Form IIIA.

The treatment of these germania-rich germanosilicates of CIT-5 topology (Form (II)) with concentrated mineral acids, such as $HNO_3$, at elevated temperatures (e.g., from 170-225° C.), results in the degermanation of the lattice, with the with retention of the CIT-5 framework, as evidenced by the characteristic PXRD patterns. As with many of these transformations, the heating/steaming can be done repeatedly to increase the Si/Ge ratios. This represents the first high silica germanosilicate having CIT-5 topology. These high-silica germanosilicates of CIT-5 topology exhibited Si/Ge ratios ranging from 25-250, as determined by EDS. In other embodiments, these high-silica germanosilicates may be described as exhibiting Si/Ge ratios in one or more ranges of from 15 to 25, from 25 to 30, from 30 to 40, from 40 to 50, from 50 to 60, from 60 to 70, from 70 to 80, from 80 to 90, from 100 to 110, from 110 to 120, from 120 to 130, from 130 to 140, from 140 to 150, from 150 to 200, and from 200 to 250, or higher.

Form IIIB.

When these germania-rich germanosilicates of CIT-5 topology are treated with concentrated mineral acids in the additional presence of source of other metal or metalloid oxides, these oxides can be incorporated into the CIT-5 lattice. In some embodiments, these metal or metalloid oxides, M, can be Al, B, Fe, Ga, Hf, Si, Sn, Ti, V, Zn, Zr, or a combination thereof. In preferred embodiments, M is Al. In some embodiments, the resulting Si/M ratio is in the range of from about 25 to 250, and the material can be characterized as exhibiting Si/M ratios in one or more ranges of from 15 to 25, from 25 to 30, from 30 to 40, from 40 to 50, from 50 to 60, from 60 to 70, from 70 to 80, from 80 to 90, from 100 to 110, from 110 to 120, from 120 to 130, from 130 to 140, from 140 to 150, from 150 to 200, and from 200 to 250, or higher. In specific embodiments, M is Al; i.e., the product is an aluminogermanosilicate of CIT-5 topology.

In one representative series of experiments (Tables 6 and 7), germania-rich germanosilicate CIT-5 (Z-2, produced by the transformation of germania-rich germanosilicate CIT-13 (Z-1) was treated with 1 M nitric acid and the presence or absence of 1 M aluminum nitrate at 185° C. for 24 hours. The degermanation and alumination was done simultaneously without any collapse of CIT-5 frameworks. Interestingly, in some circumstances, when treated only with 1 M aluminum nitrate (w/o nitric acid), Ge-CIT-5 was collapsed. Without being bound by the correctness of any particular theory, this may result from the fact that the pH of the 1 M aluminum nitrate (2.1-2.4) was higher than the isoelectic point (known as approx. 2) of the germanosilicate, and that keeping the pH of the acid is an important consideration in preparing these materials.

an idealized pure silica structure, in some embodiments, the CIT-13P contains residual germania units attached. (an Si/Ge ratio of 50 to 100 indicates the presence of 1-2% Ge).

TABLE 6

Treatment of Germania-Rich CIT-5 to Form High Silica CIT-5 and High Silica Aluminosilicate CIT-5; 24 hours at 185° C. (see also Table 7 and FIG. 20).

| Example | Nominal $[Al^{3+}]$ | Nominal $[H^+]$ | Nominal $[NO_3^-]$ | Nominal pH | Result (XRD) | EDS Analyses Si (%) | Ge (%) | Al % (%) |
|---|---|---|---|---|---|---|---|---|
| "Broken"* | 1 M | — | 3 M | 2.45 | Broken CIT-5 | 91% | 1.6 ± 0.1% | 7.0 ± 0.4 |
| 1 | 0.5 M | 0.5 M | 2 M | 0.3 | CIT-5 | 95% | 2.0 ± 0.2% | 2.5 ± 0.3 |
| 2 | 0.1 M | 0.9 M | 1.2 M | 0.05 | CIT-5 | 97% | 2.6 ± 0.4% | ~0.7% |
| 3 | — | 1 M | 1 M | 0.00 | CIT-5 | 97% | 3.0 ± 0.4% | — |

*CIT-5 Framework not preserved

TABLE 7

Comparison of PXRD Data for pure silica CIT-5 and high silica CIT-5 germanosilicates

| Pure silica CIT-5* | Ge-CIT-5** | Miller Indices** | Example 1 (°) | Example 2 (°) | Example 3 (°) |
|---|---|---|---|---|---|
| 6.95 ± 0.15 (vs) | 7.02 ± 0.15 | 002 | 7.08 ± 0.15 | 7.00 ± 0.15 | 7.08 ± 0.15 |
| 7.3 ± 0.15 (s-vs) | 7.38 ± 0.15 | 101 | 7.34 ± 0.15 | 7.38 ± 0.15 | 7.48 ± 0.15 |
| — | 13.04 ± 0.15 | 200 | ~13.0 | ~13.1 | ~13.1 |
| 13.9 ± 0.15 (w-s) | ~13.9 | 004 | ~13.9 | ~14.0 | ~14.0 |
| 19.0 ± 0.15 (w-vs) | ~19.0 | 204 | ~19.2 | ~19.2 | ~19.2 |
| 20.0 ± 0.15 (m-vs) | ~20.0 | 112 | ~20.0 | ~20.1 | ~20.1 |
| 20.5 ± 0.15 (w-s) | — | — | — | — | — |
| 20.9 ± 0.15 (w-vs) | — | — | — | — | — |
| 24.6 ± 0.15 (w-m) | — | — | — | — | — |
| 26.8 ± 0.15 (w-vs) | 27.06 ± 0.15 | 412 | ~27.1 | ~27.1 | ~27.2 |

*Data from U.S. Pat. No. 6,043,179; parenthetical relative intensities)
**Ge-rich germanosilicate CIT-5; all data in deg. 2θ

Figure 20A:
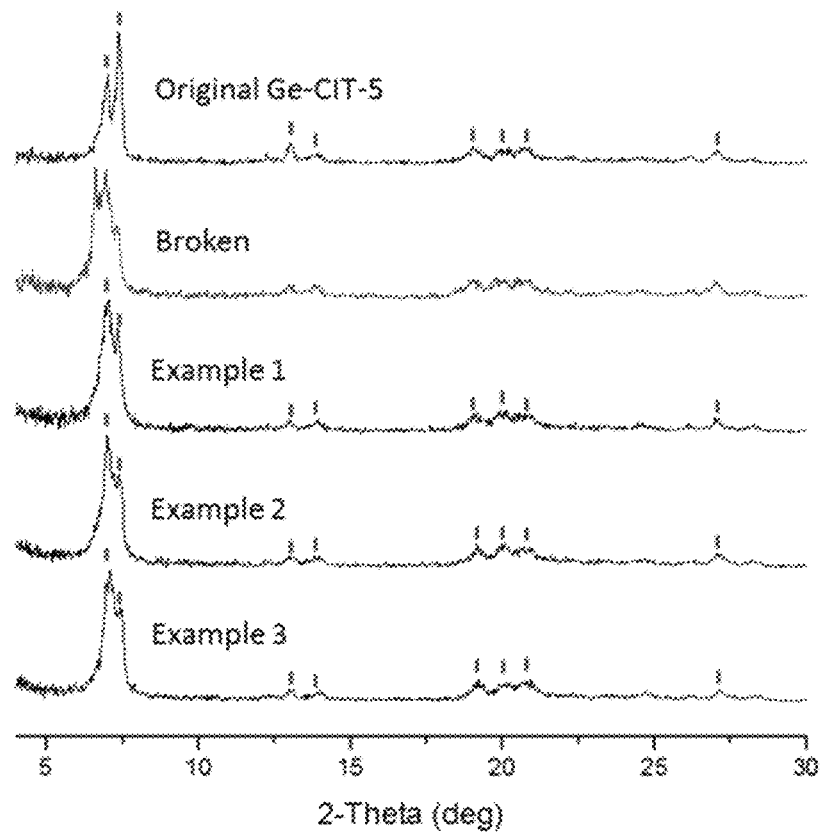
FIGS. 20(A-B) shows PXRD patterns for CIT-13 aluminosilicates with varying alumina content. See Tables 6 and 7 for description of Examples 1, 2, and 3.
Figure 20B:
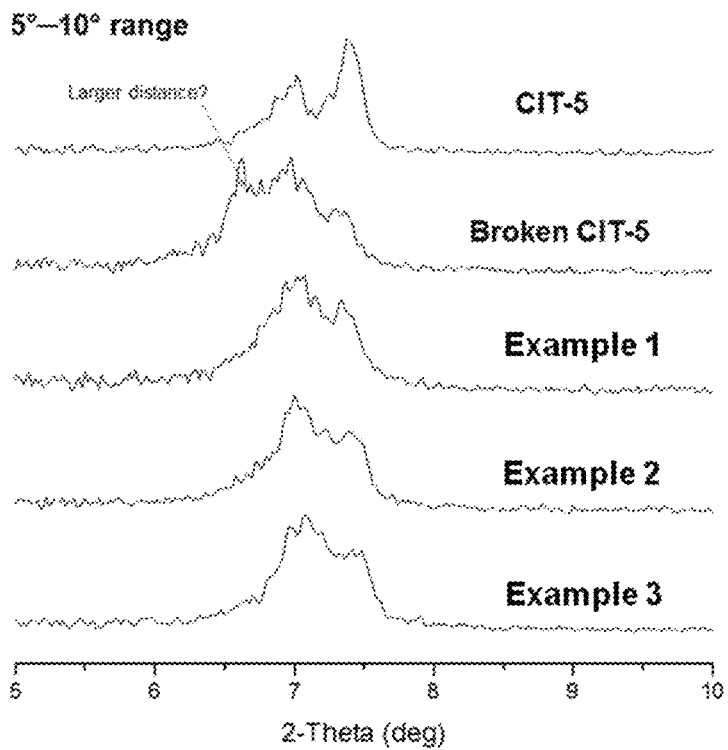
Figure 21:
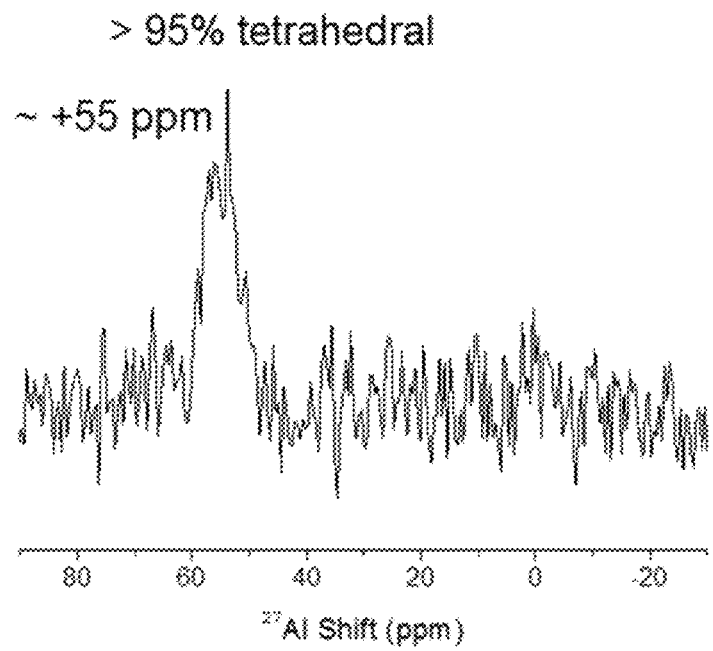
FIG. 21 shows the $^{27}$Al MAS NMR spectrum for the CIT-5 aluminosilicate described in Example 1 of Table 6.

In each case, the product had a PXRD pattern that was consistent that of other aluminosilicates having CIT-5 topology (FIG. 20). As shown in Table 6, the Si/Al ratios were 37-170, and Si/Ge ratios were 33-47 depending on the composition of mixture solutions. Finally, $^{27}$Al MAS NMR showed that aluminum atoms had been incorporated in frameworks (FIG. 21).

B. With Dilute Mineral Acid to Form Phyllosilicates (CIT-13P)(Crystal Form IV)

Figure 22:
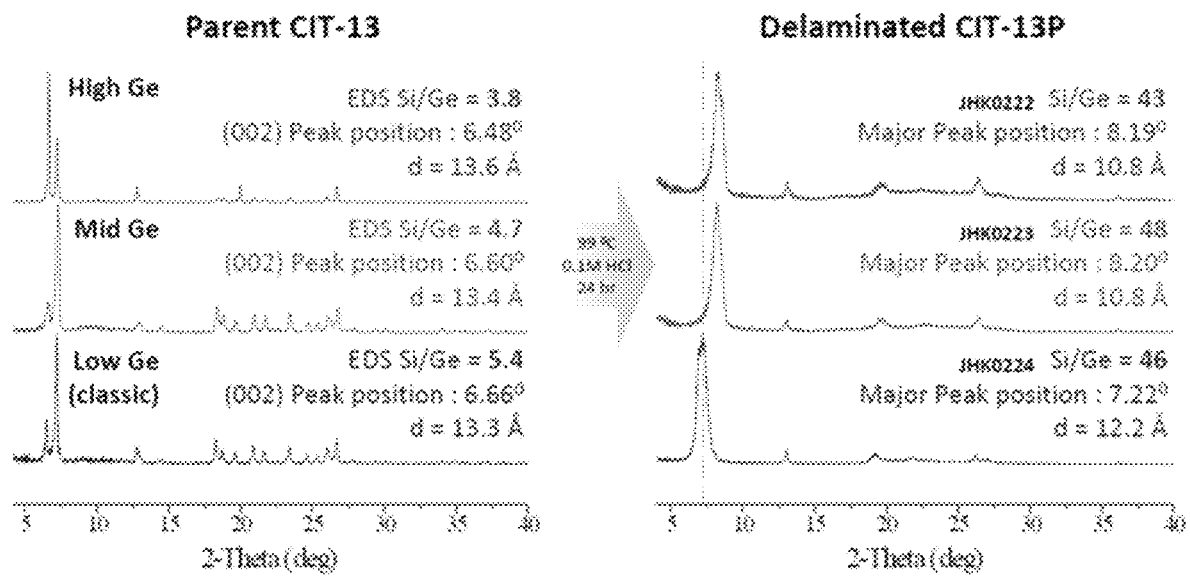
FIG. 22 shows PXRD pattern changes observed associated with treating CIT-13 germanosilicate having various Si/Ge ratios, showing delamination/degermanation to form CIT-13P.

Further embodiments of the present inventions include phyllosilicates, designated CIT-13P (Form IV), having Si/Ge ratios ranging from about 40 to infinity. These may be described as structures comprising the silica-rich cfi-layers, which can optionally be derived from the delamination of germania-rich CIT-5 (precursor having a Si/Ge ratio of 3.8 to about 5.4) or CIT-13 germanosilicates (having Si/Ge ratios in a range of from about 3.8 to about 5.68, 5.4, 5, or 4.5). See FIG. 22.

Figure 23:
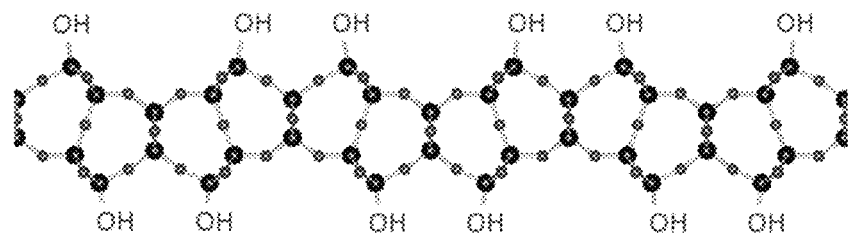
FIG. 23 shows a schematic representation of the idealized structure of CIT-13P.
Figure 23:
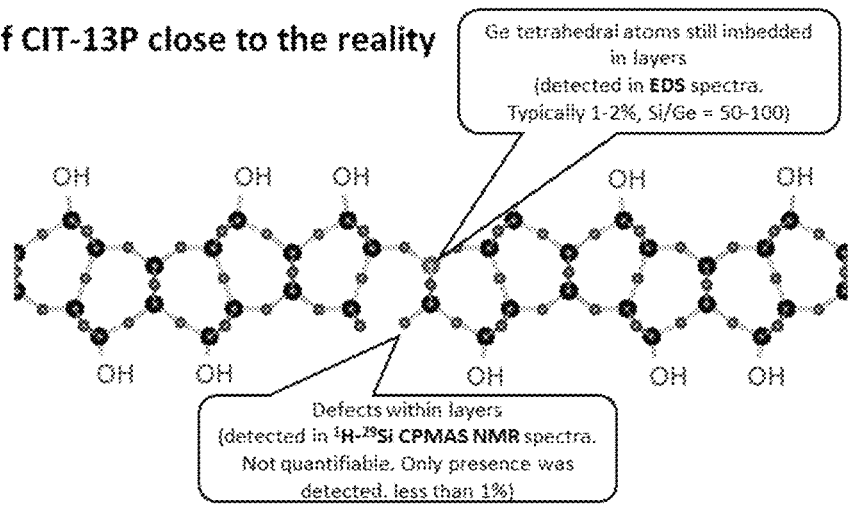

The germania-rich D4R or double zig zag layers of the precursors are removed, with the corresponding introduction of surface silanol (Si—OH) groups. Indeed, these structures can be derived from reacting the germania-rich germanosilicates of CIT-13 or CIT-5 (Form II) topology with dilute mineral acid (<0.3 M) at intermediate elevated temperatures (e.g., 90° C. to 120° C.). These phyllosilicates CIT-13P may also be independently described as (germano-) silicate compositions consisting essentially of siloxylated silica-rich cfi-layers (of the CIT-13 framework) While FIG. 23 shows In separate independent embodiments, the phyllosilicate CIT-13P materials contain or are free of defects, which may result from the hydrolysis of the silica-rich cfi-layers (level of defects, for example, less than 3, 2, 1, or 0.5%, as determined by $^1$H-$^{29}$Si CPMAS NMR and $^{29}$Si CPMAS-NMR).

In some embodiments, the CIT-13P phyllosilicates have a Si/Ge ratio in a range of from about 40 to infinity. The compositions may also be described in terms of intermediate ratio ranges, for example one or more of the ranges of ratios from about 40 to 50, from 50 to 60, from 60 to 80, from 80 to 100, from 100 to 200, and from 200 to infinity.

These phyllosilicates are characterized by a major peak in the powder X-ray diffraction (PXRD) pattern in a range of from about 6.9 to about 9 degrees 2-θ. See FIGS. 24-25. In other embodiments, the major peak in the PXRD pattern is a peak in a range of from about 7.0±0.2 degrees 2-θ to about 8.1±0.2 degrees 2-θ. This major peak is at a higher angle than the corresponding major peak in the crystalline microporous germania-rich CIT-13 germanosilicate composition from which they may be derived, and is consistent with the removal of the D4R units and the closer pack stacking of the stacked silica-rich cfi-layers. Some variance is seen in the absolute position of this major peak. This can be explained when one appreciates that the peak is attributable to stacked individual layers; i.e., each layer is insufficient to provide a diffraction pattern, and it is only by stacking multiple phyllosilicate layers that a diffraction pattern can be seen. In this case, the stacking appears to be extremely sensitive to trace intercalant impurities which may exist between the phyllosilicate layers (e.g., water), which influences the packing and therefor the location of the diffraction peak. Alternatively, different levels of silanol pendants may affect the stacking distances. In any case, the d-spacing of the stacked layers is in a range of from about 10.5 Å to about 11.5 Å.

Figure 26A:
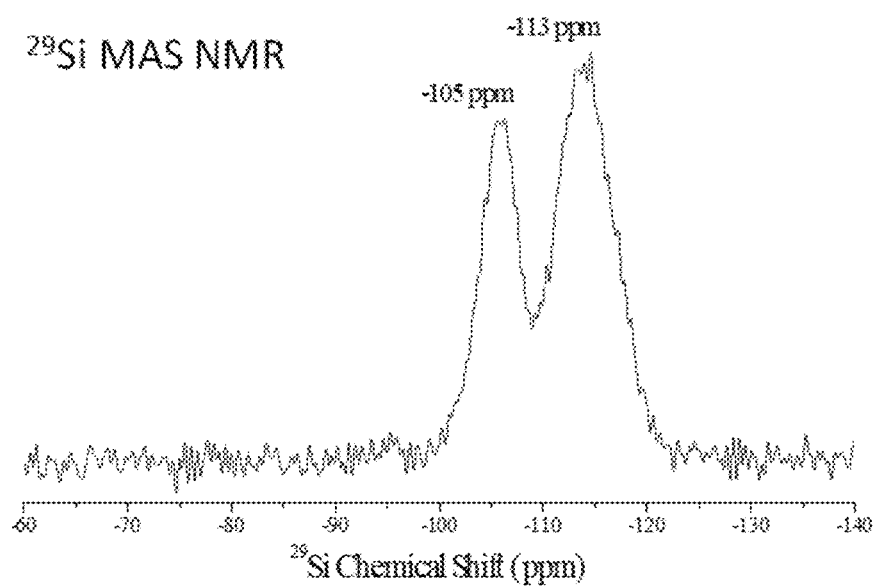
FIGS. 26(A-B) show a comparison of $^{29}$Si and $^{1}$H-$^{29}$Si CP MAS NMR, respectively, for CIP-13P.
Figure 26B:
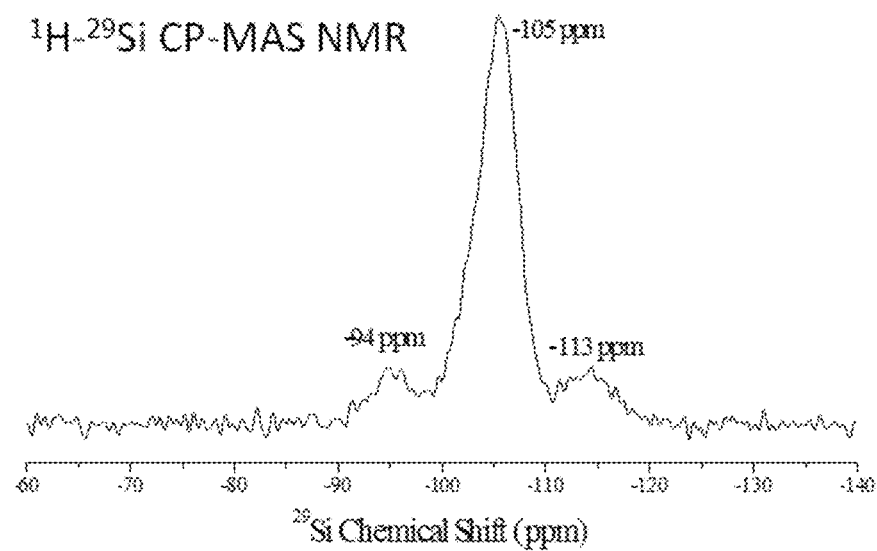
Figure 26B:
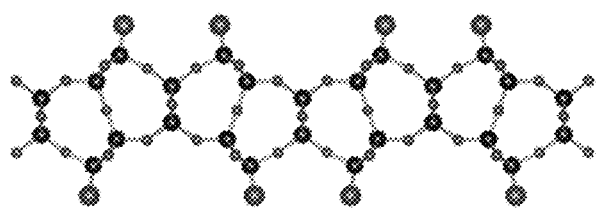

The phyllosilicates also exhibit characteristic $^{29}$Si and $^{1}$H-$^{29}$Si CP MAS NMR, as shown in FIGS. 26(A-B). Based on these MAS and CP-MAS spectra, the shifts, δ, at −113 ppm, −105 ppm, and −94 ppm correspond to $Q^4Si$, $Q^3Si$, and $Q^2Si$ show that 55% $Q^4Si$ and 45% $Q^3Si$ environments (Q4/Q3 ca. 1:1). Given that the idealize structure shown in FIG. 23 would have 66.7% $Q^4Si$ and 33.3% $Q^3Si$ environments (Q4/Q3=2:1).

Certain embodiments provide for the methods of making these materials. Other embodiments include those compositions which result from the application of these methods, to the extent that such compositions different from those described for the CIT-13P silicates.

These methods include those comprising treating a crystalline microporous CIT-5 or CIT-13 germanosilicate with a dilute aqueous mineral acid, at elevated temperatures, the crystalline microporous CIT-13 germanosilicate composition having an overall Si/Ge in a range of from about 3.8 to about 4.35, 4.5, 5, 5.4, or 5.68. The resulting phyllosilicate CIT-13P can exhibit a Si/Ge ratio in a range of from about 40 to practically infinity, as described elsewhere herein. That is, in certain embodiments, the germania is practically completely removed; i.e., Si/Ge is practically infinity. In other embodiments, the treatment provides compositions having detectable germania. In some embodiments, the treating is done at a temperature in a range of from about 80° C. to about 120° C., preferably at a time ranging from 12 to 72 hours. Treatments done at about 100° C. for about 24 hours appear to be sufficient to effect the transformation. In this context, the mineral acid comprises hydrochloric acid, nitric acid, phosphoric acid, and/or sulfuric acid, preferably comprising hydrochloric acid. The definition of dilute mineral acid is as described elsewhere herein, though in the present context, concentrations in the range of 0.05 to about 0.3, preferably about 1 provides acceptable conversions (>65% based on the precursor).

The CIT-13P silicates may also be characterized by their ability to transform to CIT-14 and CIT-15 germanosilicates, as described elsewhere herein.

Subsequent Reactions of the Phyllosilicate CIT-13P to Form Assembled and Re-Organized/Assembled Germanosilicate Compositions (CIT-14 and CIT-15) (Crystal Forms V and VI)

The phyllosilicate CIT-13P structures are also capable of topotactic rearrangements [(re)organizing and (re)assembling] to form new crystalline microporous structures, designated CIT-14 and CIT-15 herein. Each of these CIT-14 and CIT-15 exhibits a high silica germanosilicate framework, having Si/Ge ratios ranging from about 25 to practically infinity, including embodiments where this ratio is 75 to about 150 (in the case of CIT-14) or about 50 to about 100 (in the case of CIT-15). Indeed, the overall transformation of the CIT-13 frameworks through the phyllosilicate intermediates to either or both of the CIT-14 and CIT-15 frameworks, while practically retaining the original silica-rich cfi-layers, is consistent with condensation and pillaring transformations, sometimes referred to as ADOR (Assembly-Disassembly-Organization-Re-assembly).

B.1. Germanosilicate Compositions of CIT-15 Topology (Crystal Form V)

A first class of crystalline microporous silicates, designated CIT-15 germanosilicates, may be obtained from CIT-13P phyllosilicates by applying conditions consistent topotactic dehydration. Using such methods, crystalline microporous germanosilicate compositions of CIT-15 topology have been characterized by the present inventors, and may be defined in terms of PXRD patterns, and other analytical methods (including NMR).

Figure 27:
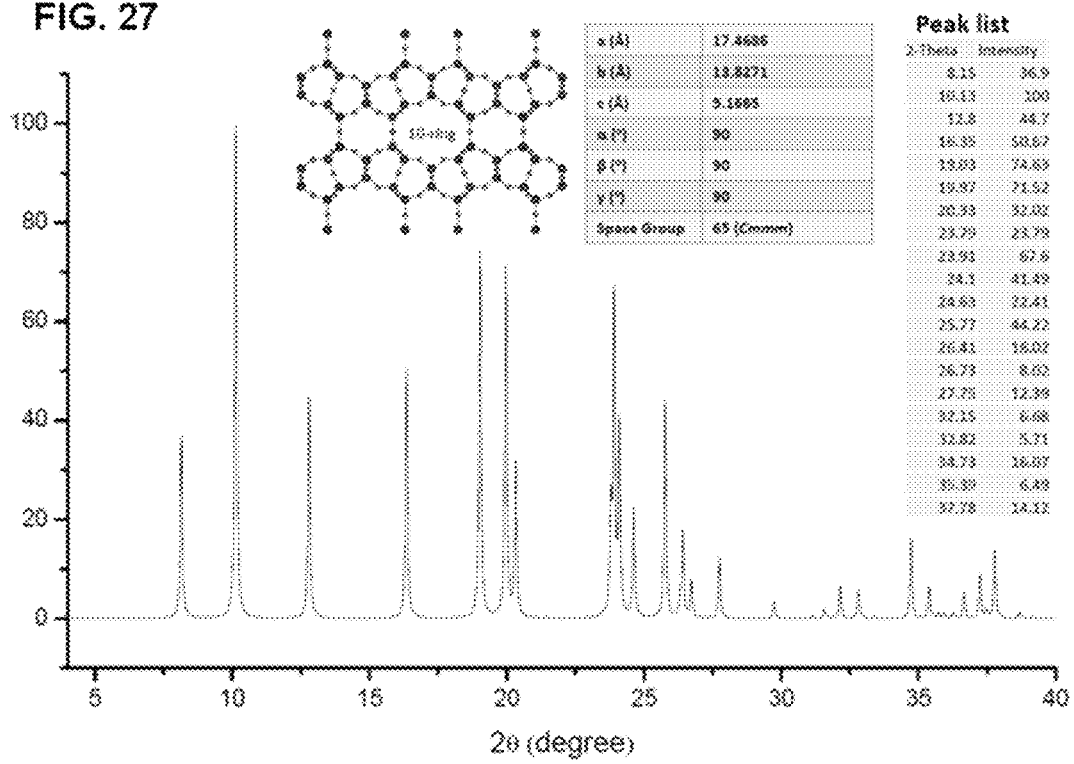
FIG. 27 shows a theoretical PXRD data for CIT-15. See Table 10 for theoretical peak listings.

Independent of the way in which these compounds can be prepared, in certain embodiments, the [CIT-15 germanosilicates (Form V) exhibit at least one of:

(a) a powder X-ray diffraction (XRD) pattern exhibiting at least five of the characteristic peaks at 8.15±0.2, 10.13±0.2, 12.80±0.2, 16.35±0.2, 19.03±0.2, 19.97±0.2, 20.33±0.2, 23.79±0.2, 23.91±0.2, 24.10±0.2, 24.63±0.2, 25.77±0.2, 26.41±0.2, 27.75±0.2, 34.73±0.2, and 37.78±0.2 degrees 2-θ;

(b) a powder X-ray diffraction (XRD) pattern substantially the same as shown in FIG. 27; or (c) unit cell parameters substantially equal to those shown in Table 8.

TABLE 8

| Cell parameters for CIT-15 germanosilicates | |
|---|---|
| Space group | Cmmm |
| a (Å) | 17.4686(5) |
| b (Å) | 13.8271(2) |
| c (Å) | 5.1665(2) |
| α = β = γ | 90° |
| Space Group | 65 (Cmmm) |

Note that the experimentally determine PXRD patterns show excellent correlation with those predicted theoretically, giving good evidence for this characterization. The CIT-15 germanosilicates comprise three-dimensional frameworks containing 10-MR channels. In some embodiments, these channels have dimensions of 5.6 Å×3.8 Å, variances of the metal or metalloid oxide content within these frameworks are expected to affect these specific dimensions. FIG. 27.

In some embodiments, the crystalline CIT-15 germanosilicates have a Si/Ge ratio in a range of from 25 to infinity. When prepared from CIT-13P phyllosilicate precursors, the Si/Ge ratio of the product generally reflects that of the precursor. In certain embodiments, then, the Si/Ge ratio can be described in terms of one or more ranges of from 25 to 50, from 50 to 60, from 60 to 80, from 80 to 100, from 100 to 200, and from 200 to infinity, for example from 50 to 100.

Figure 30:
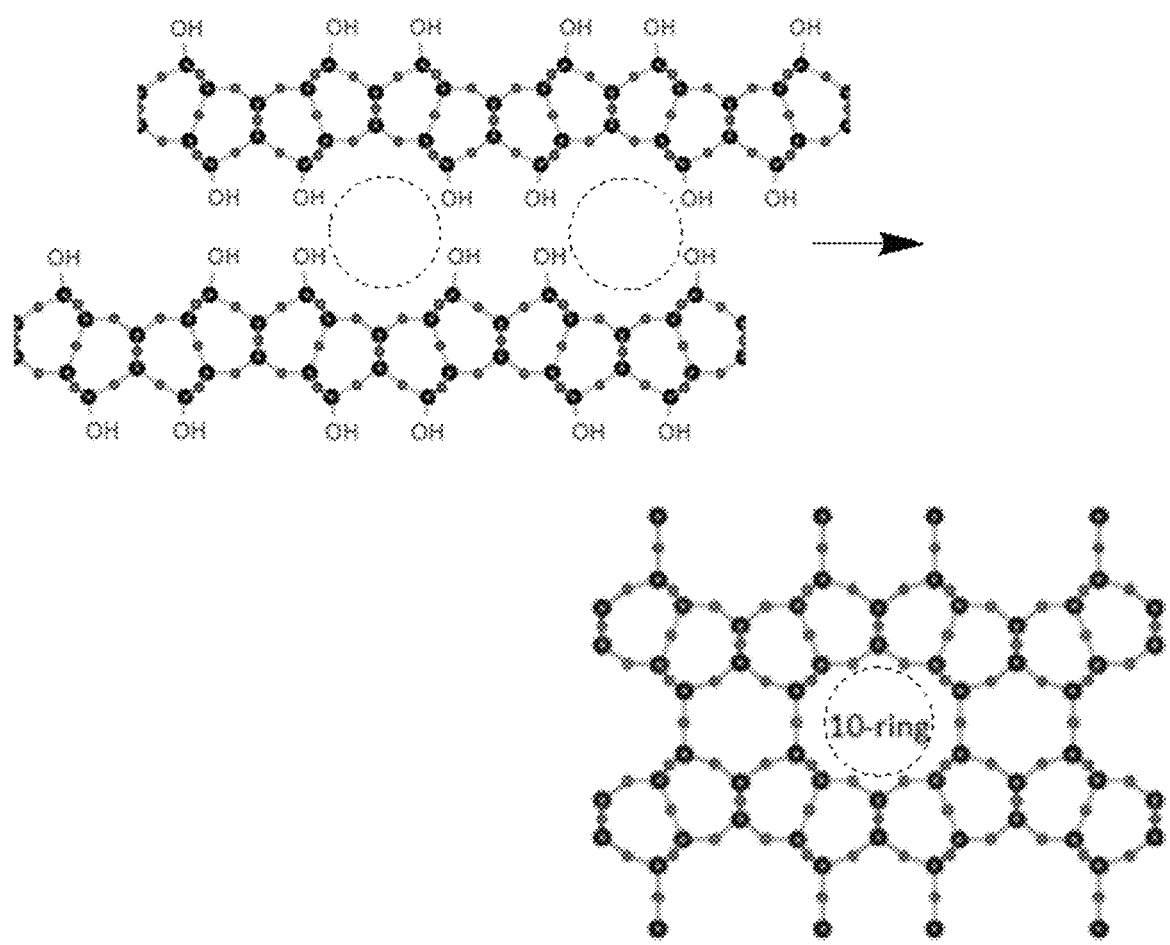
FIG. 30 shows a schematic representation of the changes thought to be associated with the transformation of CIT-13P phyllosilicates to CIT-15 germanosilicates. The dotted circles is thought to represent the placement position (into the page) of the C$_{1-12}$ alkyl amines during the preconditioning.

The crystalline microporous CIT-15 germanosilicates can be prepared by calcining the CIT-13P phyllosilicates. See FIG. 30. Other embodiments include those compositions which result from the application of these methods, to the extent that such compositions different from those described for the CIT-15 germanosilicates. Calcining temperatures have been defined elsewhere herein, but in certain specific embodiments here, calcining includes subjecting the precursor material to at least one temperature in a range of from about 400° C. to about 950° C. Good results have been achieved by calcining the CIT-13P at 580° C. to 750° C. for 6-8 hours. Topotactic condensations can occur with layered materials that contain terminal silanol groups, such as CIT-13P. With calcination, these terminal silanol groups condense, releasing water and forming Si—O—Si bonds. In this process, a 2-dimensional material is converted to a 3-dimensional framework material. Without intending to be bound by the correctness of any particular theory, the conversion of CIT-13P phyllosilicates to crystalline microporous CIT-15 germanosilicates is believed to be operating by this mechanism. E.g., see FIG. 30. It has been shown to be helpful, but not necessary, to intercalate long chain ($C_{1-12}$) alkyl amines, for example 1-heptyl amine or 1-octyl amine with the CIT-13P phyllosilicates before calcining. Again, without intending to be bound by the correctness or any particular theory, it is believed that these amines help organize and secure the positions of the pre-channels of the CIT-13P (e.g., as shown in the dotted circles of FIG. 30) before calcining.

B.2. Germanosilicate Compositions of CIT-14 Topology (Crystal Form VI)

Figure 31:
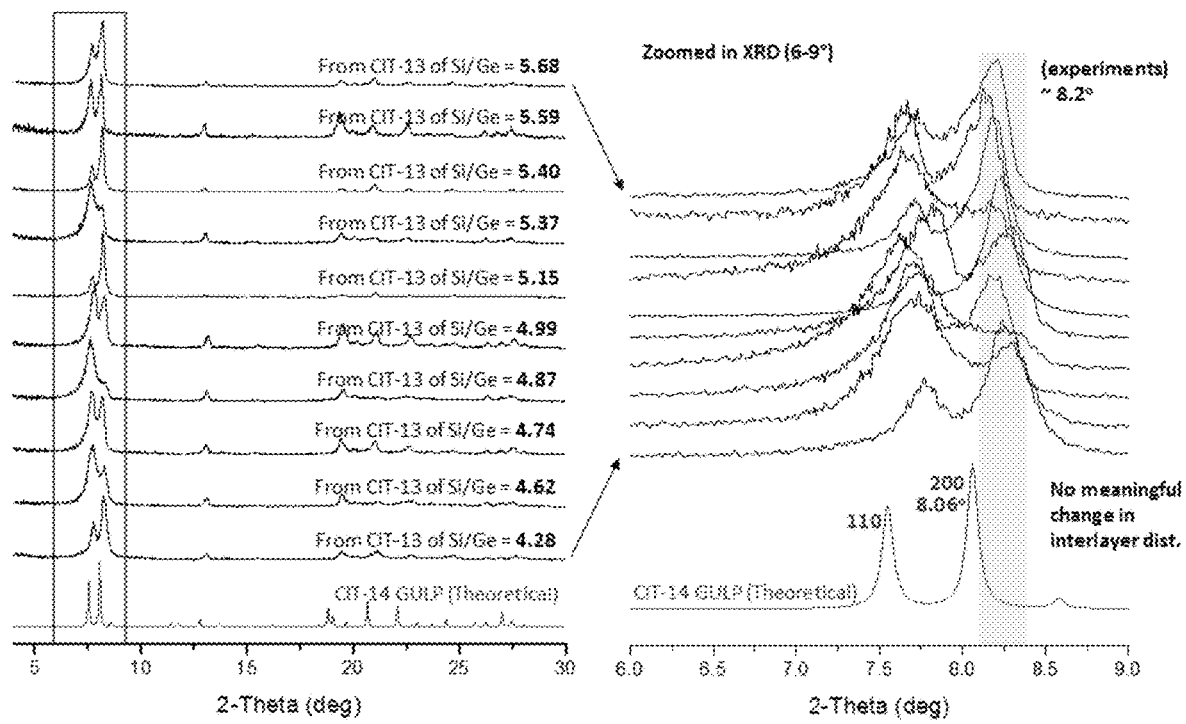
FIG. 31 shows the PXRD patterns associated with the organization of CIT-13P at varying Si/Ge precursor ratios into CIT-14 germanisilicated under pillaring conditions, showing the substantial constancy of the main peaks in the PXRD pattern of CIT-14 germanosilicates over the range of ratios.

A second class of crystalline microporous silicates, designated CIT-14 germanosilicates, may be obtained from CIT-13P phyllosilicates by applying conditions consistent with pillaring. In some embodiments, these crystalline microporous CIT-14 germanosilicates may be prepared by reacting CIT-13P phyllosilicates derived from CIT-13 germanosilicates having an Si/Ge ratio in a range of from 3.8 to about 5.68 with a silylating agent, in the presence of a concentrated mineral acid at elevated temperatures for times sufficient to effect the desired transformation. In the general context, the range of mineral acids is described elsewhere herein, but in certain additional embodiments, the mineral acid is or comprises nitric or hydrochloric acid, preferably nitric acid, in a concentration ranging from about 1 M to about 1.5 M, preferably 1.25 M. In certain embodiments, the reaction conditions include contacting the CIT-13P with a source of silica, for example, a silylating agent, in the presence of the mineral acid at one or more temperatures in a range of from about 165° C. to about 225° C., preferably 175° C., under autogenous pressures for times ranging from 12 to 36 hours, preferably from 18 to 24 hours, followed by calcination at 580° C. to 750° C. for 6 to 10 hours. In specific embodiments, the silylating agent comprises those known to be useful for pillaring such structures, for example including diethoxydimethylsilane (DEDMS) and/or 1,3-diethoxy-1,1,3,3-tetramethyldisiloxane (DETMDS). In certain embodiments, the CIT-14 silicates have a Si/Ge ratio ranging from about 25 to one approaching infinity, if not infinity (i.e., pure silica). In other embodiments, the Si/Ge ratio is described as being in a range of from about 25 to 150, or from about 75 to about 150. Representative PXRD patterns, for a range of Si/Ge ratios, are illustrated in FIG. 31.

Independent of the way in which they were prepared, these new CIT-14 germanosilicates exhibit powder X-ray diffraction (XRD) patterns having at least five of the characteristic peaks at 7.7, 8.2, 13.1, 19.5, 21.1, 22.7, and 27.6 degrees 2-θ. Owing to the structural disorder of the material, the observed diffraction peaks are broad, and the errors assigned to these peaks are ±0.5 degrees 2-θ (see Table 9, FIGS. 31 and 32). In other embodiments, the error associated with these peaks are ±0.3 degrees 2-θ. Consistent with other structures prepared by pillaring, and with the methods by which they can be made, the structure of these new materials is described in terms of a three-dimensional frameworks having pores defined by 8- and 12-membered rings. Based on the theoretical structure, the 8- and 12-membered rings have dimensions of 4.0×3.4 Å and 6.9×5.4 Å, respectively (see FIG. 33). The PXRD patterns identified from isolated products are not identical, but are consistent with the theoretical values associated with this structure (as predicted by the General Utility Lattice Program, GULP (Gale, 1997)), i.e., having silica pillars separating the silica-rich cfi-layers. See FIGS. 33 and 34. Again, such differences in the patterns can be explained by structural disorder and/or incomplete silica pillaring in the structure. In this case, versions of the CIT-14 may also be described in terms of the crystallographic parameters shown in FIGS. 33(A) and 33(B).

Figure 35:
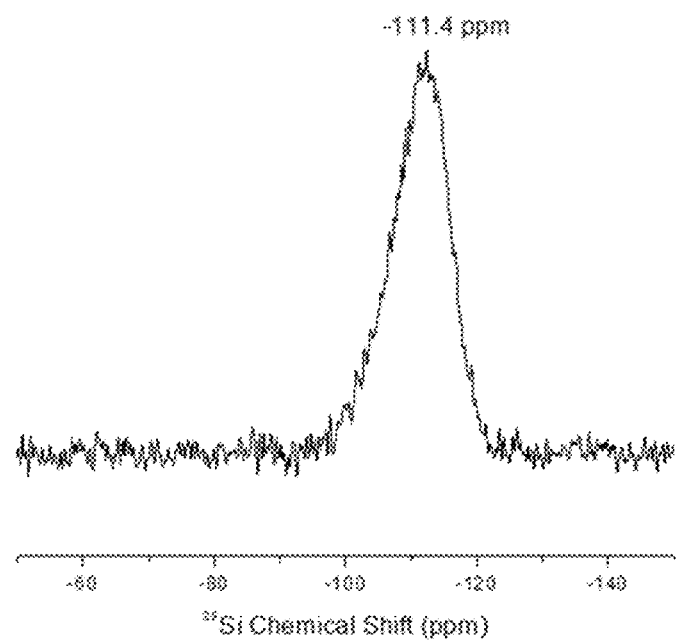
FIG. 35 shows a representative 29 Si MAS NMR of a CIT-14 germanosilicate, containing a plurality of $Q^4$ environments.

FIG. 35 shows a representative $^{29}$Si MAS NMR showing small amounts of Q3 Si species and multiple Q4 Si environments within the −108 to −120 chemical shift regions.

TABLE 9

Comparison of Theoretical and actual values for PXRD patterns of CIT-14

| Theoretical[a] | | 2-Theta | | |
|---|---|---|---|---|
| 2-Theta | Relative Intensity | Example 1 (Si/Ge = 4.4, DEDMS) | Example 2 (Si/Ge = 4.4, DETDMS) | Example 3 (Si/Ge = 3.8, DETDMS) |
| 7.55 | 71.49 | 7.72 | 7.68 | 7.76 |
| 8.06 | 100 | 8.24 | 8.24 | 8.24 |
| 12.79 | 11.78 | 13.08 | 13.04 | 13.12 |
| 18.82 | 31.01 | 19.4 | 19.4 | 19.5 |
| 119.04 | 17.96 | — | — | — |
| 20.67 | 38.36 | 21.1 | 21.1 | 21.2 |
| 22.07 | 32.05 | 22.7 | 22.7 | 22.7 |
| 27.01 | 22.21 | — | — | — |
| 27.48 | 11.35 | 27.6 | 27.6 | 27.6 |

[a]Based on structure shown in FIGS. 33(A-B) and 34.

TABLE 10

Figure 33A:
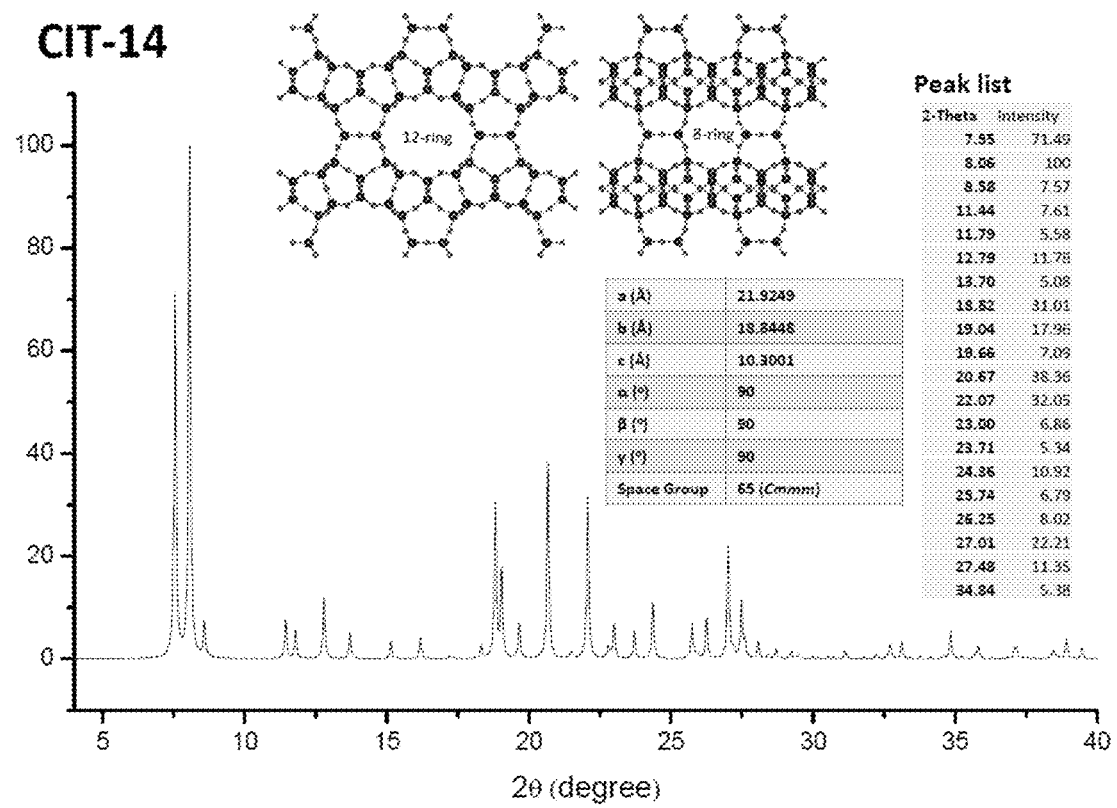
FIGS. 33(A-B) illustrate the structure believed to represent CIT-14 and its theoretical PXRD data (FIG. 33(A)) and pore channel dimensions (FIG. 33(B)). See Table 10 for theoretical peak listings.
Figure 34:
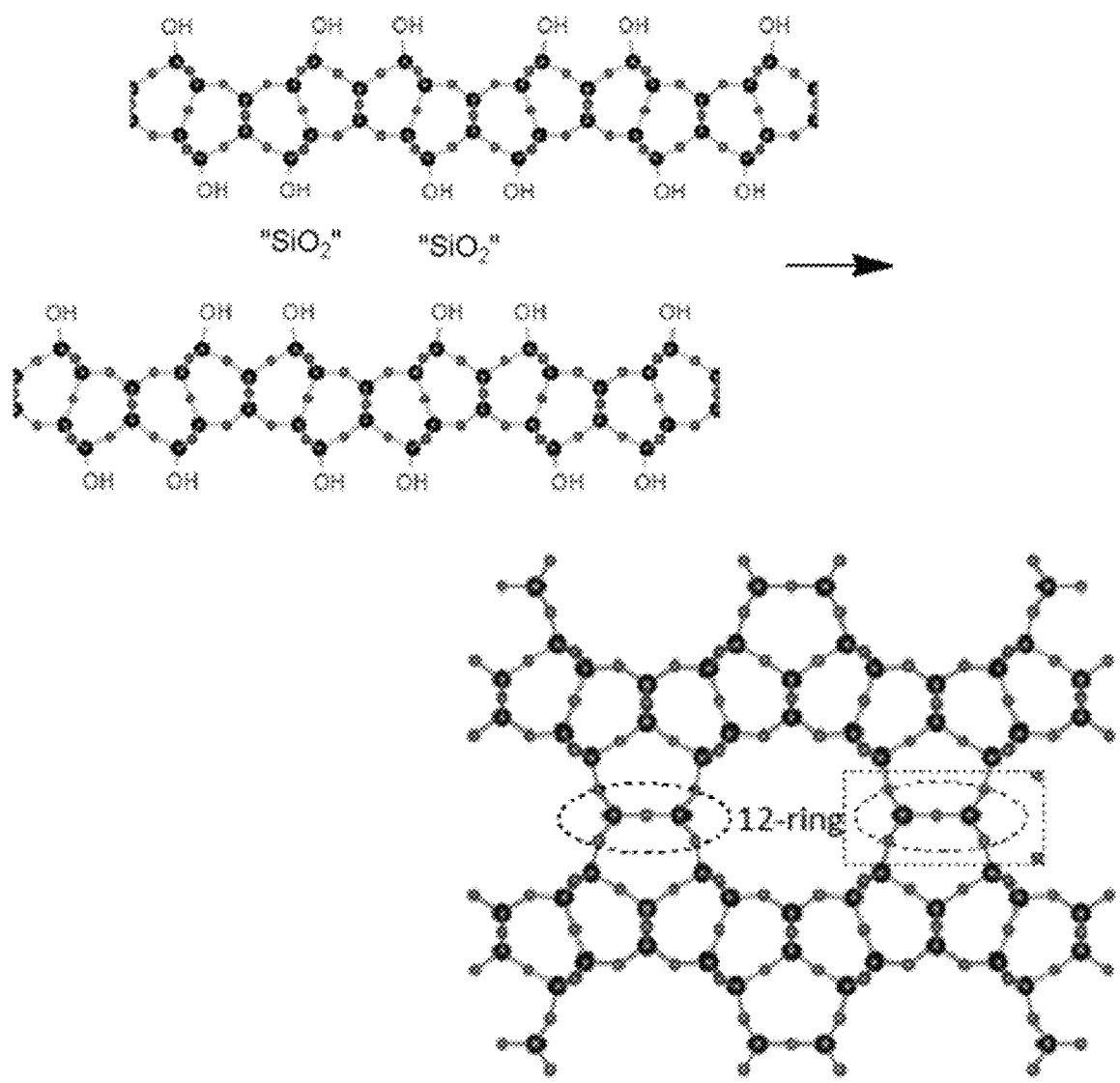
FIG. 34 shows a schematic representation of the changes thought to be associated with the transformation of CIT-13P phyllosilicates to CIT-14 germanosilicates. "SiO$_2$" represents a source of silica.

Compilation of Theoretical PXRD Data for CIT-13, CIT-14, and CIT-15 (from FIGS. 4, 33(A), and 27, respectively).

| | CIT-13 Germanosilicate | | CIT-14 Germanosilicate | | CIT-15 Germanosilicate | |
|---|---|---|---|---|---|---|
| No. | Peak, 2θ | Theoretical Intensity | Peak, 2θ | Theoretical Intensity | Peak, 2θ | Theoretical Intensity |
| 1 | 6.45 | 100 | 7.55 | 71.49 | 8.15 | 36.9 |
| 2 | 7.18 | 96.06 | 8.06 | 100 | 10.13 | 100 |
| 3 | 8.56 | 13.58 | 8.58 | 7.57 | 12.80 | 44.7 |
| 4 | 10.73 | 9.51 | 11.44 | 7.61 | 16.35 | 50.67 |
| 5 | 11.18 | 15.42 | 11.79 | 5.58 | 19.03 | 74.63 |
| 6 | 12.85 | 4.84 | 12.79 | 11.78 | 19.97 | 71.52 |
| 7 | 18.25 | 18.20 | 13.70 | 5.08 | 20.33 | 32.02 |
| 8 | 18.35 | 11.11 | 18.82 | 31.01 | 23.79 | 23.79 |
| 9 | 18.63 | 12.78 | 19.04 | 17.96 | 23.91 | 67.60 |
| 10 | 19.60 | 4.30 | 19.66 | 7.09 | 24.10 | 41.49 |
| 11 | 20.78 | 16.13 | 20.67 | 38.36 | 24.63 | 22.41 |
| 12 | 21.55 | 9.61 | 22.07 | 32.05 | 25.77 | 44.22 |
| 13 | 23.35 | 9.34 | 23.00 | 6.86 | 26.41 | 18.02 |
| 14 | 24.55 | 8.37 | 23.71 | 5.34 | 26.73 | 8.02 |
| 15 | 25.17 | 4.5 | 24.36 | 10.92 | 27.75 | 12.39 |
| 16 | 25.30 | 4.47 | 25.74 | 6.79 | 32.15 | 6.68 |
| 17 | 25.87 | 3.58 | 26.25 | 8.02 | 32.82 | 5.71 |
| 18 | 26.01 | 4.93 | 27.01 | 22.21 | 34.73 | 16.07 |
| 19 | 26.68 | 14.48 | 27.48 | 11.35 | 35.39 | 6.49 |
| 20 | 33.99 | 3.74 | 34.84 | 5.38 | 37.78 | 14.12 |

Other Modifications to the Microcrystalline Compositions.

In certain of embodiments, the crystalline microporous solids described in the present disclosure, including crystal Forms IA, IB, II, IIIA, IIIB, IV, V, and VI, are present in their hydrogen form. In other embodiments, the crystalline microporous solids of Forms IA, IB, II, IIIA, IIIB, V, and VI containing at least one metal cation salt or a transition metal or salt in their micropores. In other specific embodiments, the metal cation salt is a salt of $K^+$, $Li^+$, $Rb^+$, $ca^{2+}$, $Cs^+$: $Co^{2+}$, $Cu^{2+}$, $Mg^{2+}$, $Sr^{2+}$, $Ba^{2+}$, $Ni^{2+}$, or $Fe^{2+}$, the copper salt may include, for example, Schweizer's reagent (tetraamminediaquacopper dihydroxide, $[Cu(NH_3)_4(H_2O)_2](OH)_2]$), copper(II) nitrate, or copper(II) carbonate. Such metal cations may be incorporated, for example, using techniques known to be suitable for this purpose (e.g., ion exchange).

In other embodiments, the micropores may contain a transition metal or transition metal oxide. The addition of such materials may be accomplished, for example by chemical vapor deposition or chemical precipitation. In certain independent embodiments, the transition metal or transition metal oxide comprises an element of Groups 6, 7, 8, 9, 10, 11, or 12. In other independent embodiments, the transition metal or transition metal oxide comprises scandium, yttrium, titanium, zirconium, vanadium, manganese, chromium, molybdenum, tungsten, iron, ruthenium, osmium, cobalt, rhodium, iridium, nickel, palladium, platinum, copper, silver, gold, or mixtures. Fe, Ru, Os, Co, Rh, Ir, Ni, Pd, Pt, Cu, Ag, Au, and mixtures thereof are preferred. In independent embodiments, the aqueous ammonium or metal salt or chemically vapor deposited or precipitated materials independently include Li, Na, K, Rb, Cs, Be, Mg, Ca, Sr, Be, Al, Ga, In, Zn, Ag, Cd, Ru, Rh, Pd, Pt, Au, Hg, La, Ce, Pr, Nd, Pm, Sm, Eu, or $R_{4-n}N^+H_n$ cations, where R is alkyl, n=0-4 in at least some of its pores.

The term "transition metal" have been defined elsewhere herein, but in certain other independent embodiments, the transition metal or transition metal oxide comprises an element of Groups 6, 7, 8, 9, 10, 11, or 12. In still other independent embodiments, the transition metal or transition metal oxide comprises scandium, yttrium, titanium, zirconium, vanadium, manganese, chromium, molybdenum, tungsten, iron, ruthenium, osmium, cobalt, rhodium, iridium, nickel, palladium, platinum, copper, silver, gold, or mixtures. Fe, Ru, Os, Co, Rh, Ir, Ni, Pd, Pt, Cu, Ag, Au, and mixtures thereof are preferred dopants.

In other embodiments, the optionally doped crystalline solids are calcined in air a temperature defined as being in at least one range of from 400° C. to 500° C., from 500° C. to 600° C., from 600° C. to 700° C., from 700° C. to 800° C., from 800° C. to 900° C., from 900° C. to 1000° C., from 1000° C. to 1200° C., 500° C. to about 1200° C. The choice of any particular temperature may, in some cases, be limited by the stability of the particular solid, either with respect to decomposition or onward conversion to another crystal phase.

Other methods for modifying molecular sieves for use as catalysts are known by those skilled in the art, and any such additional modifications are considered within the scope of this disclosure Uses of the Inventive Compositions—Catalytic Transformations In various embodiments, the crystalline microporous germanosilicate solids of the present invention, calcined, doped, or treated as described herein, act as catalysts to mediate or catalyze an array of chemical transformation. All such combinations of compositions and catalytic reactions are considered individual embodiments of this disclosure, as if they have been individually and separately delineated. Such transformations may include carbonylating DME with CO at low temperatures, reducing NOx with methane (e.g., in exhaust applications), cracking, hydrocracking, dehydrogenating, converting paraffins to aromatics, dewaxing a hydrocarbon feedstock, MTO, isomerizing aromatics (e.g., xylenes), disproportionating aromatics (e.g., toluene), alkylating aromatic hydrocarbons, oligomerizing alkenes, aminating lower alcohols, separating and sorbing lower alkanes, hydrocracking a hydrocarbon, dewaxing a hydrocarbon feedstock, isomerizing an olefin, producing a higher molecular weight hydrocarbon from lower molecular weight hydrocarbon, reforming a hydrocarbon, converting lower alcohol or other oxygenated hydrocarbons to produce olefin products, epoxiding olefins with hydrogen peroxide, reducing the content of an oxide of nitrogen contained in a gas stream in the presence of oxygen, or separating nitrogen from a nitrogen-containing gas mixture by contacting the respective feedstock with the a catalyst comprising the crystalline microporous solid of any one of materials described herein under conditions sufficient to affect the named transformation. Particularly attractive applications include in which these germanosilicates are expected to be useful include catalytic cracking, hydrocracking, dewaxing, alkylation, and olefin and aromatics formation reactions. Additional applications include gas drying and separation.

Specific embodiments provide hydrocracking processes, each process comprising contacting a hydrocarbon feedstock under hydrocracking conditions with a catalyst comprising a crystalline microporous solid of this invention, preferably predominantly in the hydrogen form.

Still other embodiments provide processes for dewaxing hydrocarbon feedstocks, each process comprising contacting a hydrocarbon feedstock under dewaxing conditions with a catalyst comprising a crystalline microporous solid of this invention. Yet other embodiments provide processes for improving the viscosity index of a dewaxed product of waxy hydrocarbon feeds, each process comprising contacting the waxy hydrocarbon feed under isomerization dewaxing conditions with a catalyst comprising a crystalline microporous solid of this invention.

Additional embodiments include those process for producing a C20+ lube oil from a C20+ olefin feed, each process comprising isomerizing said olefin feed under isomerization conditions over a catalyst comprising at least one transition metal catalyst and a crystalline microporous solid of this invention.

Also included in the present invention are processes for isomerization dewaxing a raffinate, each process comprising contacting said raffinate, for example a bright stock, in the presence of added hydrogen with a catalyst comprising at least one transition metal and a crystalline microporous solid of this invention.

Other embodiments provide for dewaxing a hydrocarbon oil feedstock boiling above about 350° F. and containing straight chain and slightly branched chain hydrocarbons comprising contacting said hydrocarbon oil feedstock in the presence of added hydrogen gas at a hydrogen pressure of about 15-3000 psi with a catalyst comprising at least one transition metal and a crystalline microporous solid of this invention, preferably predominantly in the hydrogen form.

Also included in the present invention is a process for preparing a lubricating oil which comprises hydrocracking in a hydrocracking zone a hydrocarbonaceous feedstock to obtain an effluent comprising a hydrocracked oil, and catalytically dewaxing said effluent comprising hydrocracked oil at a temperature of at least about 400° F. and at a pressure of from about 15 psig to about 3000 psig in the presence of added hydrogen gas with a catalyst comprising at least one transition metal and a crystalline microporous solid of this invention.

Also included in this invention is a process for increasing the octane of a hydrocarbon feedstock to produce a product having an increased aromatics content, each process comprising contacting a hydrocarbonaceous feedstock which comprises normal and slightly branched hydrocarbons having a boiling range above about 40° C. and less than about 200° C., under aromatic conversion conditions with a catalyst comprising a crystalline microporous solid of this invention. In these embodiments, the crystalline microporous solid is preferably made substantially free of acidity by neutralizing said solid with a basic metal. Also provided in this invention is such a process wherein the crystalline microporous solid contains a transition metal component.

Also provided by the present invention are catalytic cracking processes, each process comprising contacting a hydrocarbon feedstock in a reaction zone under catalytic cracking conditions in the absence of added hydrogen with a catalyst comprising a crystalline microporous solid of this invention. Also included in this invention is such a catalytic cracking process wherein the catalyst additionally comprises an additional large pore crystalline cracking component.

This invention further provides isomerization processes for isomerizing C4 to C7 hydrocarbons, each process comprising contacting a feed having normal and slightly branched C4 to C hydrocarbons under isomerizing conditions with a catalyst comprising a crystalline microporous solid of this invention, preferably predominantly in the hydrogen form. The crystalline microporous solid may be impregnated with at least one transition metal, preferably platinum. The catalyst may be calcined in a steam/air mixture at an elevated temperature after impregnation of the transition metal.

Also provided by the present invention are processes for alkylating an aromatic hydrocarbon, each process comprising contacting under alkylation conditions at least a molar excess of an aromatic hydrocarbon with a C2 to C20 olefin under at least partial liquid phase conditions and in the presence of a catalyst comprising a crystalline microporous solid of this invention, preferably predominantly in the hydrogen form. The olefin may be a C2 to C4 olefin, and the aromatic hydrocarbon and olefin may be present in a molar ratio of about 4:1 to about 20:1, respectively. The aromatic hydrocarbon may be selected from the group consisting of benzene, toluene, ethylbenzene, xylene, or mixtures thereof.

Further provided in accordance with this invention are processes for transalkylating an aromatic hydrocarbon, each of which process comprises contacting under transalkylating conditions an aromatic hydrocarbon with a polyalkyl aromatic hydrocarbon under at least partial liquid phase conditions and in the presence of a catalyst comprising a crystalline microporous solid of this invention, preferably predominantly in the hydrogen form. The aromatic hydrocarbon and the polyalkyl aromatic hydrocarbon may be present in a molar ratio of from about 1:1 to about 25:1, respectively. The aromatic hydrocarbon may be selected from the group consisting of benzene, toluene, ethylbenzene, xylene, or mixtures thereof, and the polyalkyl aromatic hydrocarbon may be a dialkylbenzene.

Further provided by this invention are processes to convert paraffins to aromatics, each of which process comprises contacting paraffins under conditions which cause paraffins to convert to aromatics with a catalyst comprising a crystalline microporous solid of this invention, said catalyst comprising gallium, zinc, or a compound of gallium or zinc.

In accordance with this invention there is also provided processes for isomerizing olefins, each process comprising contacting said olefin under conditions which cause isomerization of the olefin with a catalyst comprising a crystalline microporous solid of this invention.

Further provided in accordance with this invention are processes for isomerizing an isomerization feed, each process comprising an aromatic C8 stream of xylene isomers or mixtures of xylene isomers and ethylbenzene, wherein a more nearly equilibrium ratio of ortho-, meta- and para-xylenes is obtained, said process comprising contacting said feed under isomerization conditions with a catalyst comprising a crystalline microporous solid of this invention.

The present invention further provides processes for oligomerizing olefins, each process comprising contacting an olefin feed under oligomerization conditions with a catalyst comprising a crystalline microporous solid of this invention.

This invention also provides processes for converting lower alcohols and other oxygenated hydrocarbons, each process comprising contacting said lower alcohol (for example, methanol, ethanol, or propanol) or other oxygenated hydrocarbon with a catalyst comprising a crystalline microporous solid of this invention under conditions to produce liquid products.

Also provided by the present invention are processes for reducing oxides of nitrogen contained in a gas stream in the presence of oxygen wherein each process comprises contacting the gas stream with a crystalline microporous solid of this invention. The a crystalline microporous solid may contain a metal or metal ions (such as cobalt, copper or mixtures thereof) capable of catalyzing the reduction of the oxides of nitrogen, and may be conducted in the presence of a stoichiometric excess of oxygen. In a preferred embodiment, the gas stream is the exhaust stream of an internal combustion engine.

Also provided are processes for converting synthesis gas containing hydrogen and carbon monoxide, also referred to as syngas or synthesis gas, to liquid hydrocarbon fuels, using a catalyst comprising any of the germanosilicates described herein, including those having CIT-13 frameworks, and Fischer-Tropsch catalysts. Such catalysts are described in U.S. Pat. No. 9,278,344, which is incorporated by reference for its teaching of the catalysts and methods of using the catalysts. The Fischer-Tropsch component includes a transition metal component of groups 8-10 (i.e., Fe, Ru, Os, Co, Rh, IR, Ni, Pd, Pt), preferably cobalt, iron and/or ruthenium. The optimum amount of catalytically active metal present depends inter alia on the specific catalytically active metal. Typically, the amount of cobalt present in the catalyst may range from 1 to 100 parts by weight per 100 parts by weight of support material, preferably from 10 to 50 parts by weight per 100 parts by weight of support material. In one embodiment, from 15 to 45 wt % cobalt is deposited on the hybrid support as the Fischer-Tropsch component. In another embodiment from 20 to 45 wt % cobalt is deposited on the hybrid support. The catalytically active Fischer-Tropsch component may be present in the catalyst together with one or more metal promoters or co-catalysts. The promoters may be present as metals or as metal oxide, depending upon the particular promoter concerned. Suitable promoters include metals or oxides of transition metals, including lanthanides and/or the actinides or oxides of the lanthanides and/or the actinides. As an alternative or in addition to the metal oxide promoter, the catalyst may comprise a metal promoter selected from Groups 7 (Mn, Tc, Re) and/or Groups 8-10. In some embodiments, the Fischer-Tropsch component further comprises a cobalt reduction promoter selected from the group consisting of platinum, ruthenium, rhenium, silver and combinations thereof. The method employed to deposit the Fischer-Tropsch component on the hybrid support involves an impregnation technique using aqueous or non-aqueous solution containing a soluble cobalt salt and, if desired, a soluble promoter metal salt, e.g., platinum salt, in order to achieve the necessary metal loading and distribution required to provide a highly selective and active hybrid synthesis gas conversion catalyst.

Still further process embodiments include those for reducing halide concentration in an initial hydrocarbon product comprising undesirable levels of an organic halide, the process comprising contacting at least a portion of the hydrocarbon product with a composition comprising any of the germanosilicate structures described herein, including CIT-13, under organic halide absorption conditions to reduce the halogen concentration in the hydrocarbon. The initial hydrocarbon product may be made by a hydrocarbon conversion process using an ionic liquid catalyst comprising a halogen-containing acidic ionic liquid. In some embodiments, the organic halid content in the initial hydrocarbon product is in a range of from 50 to 4000 ppm; in other embodiments, the halogen concentrations are reduced to provide a product having less than 40 ppm. In other embodiments, the production may realize a reduction of 85%, 90%, 95%, 97%, or more. The initial hydrocarbon stream may comprise an alkylate or gasoline alkylate. Preferably the hydrocarbon alkylate or alkylate gasoline product is not degraded during the contacting. Any of the materials or process conditions described in U.S. Pat. No. 8,105,481 are considered to describe the range of materials and process conditions of the present invention. U.S. Pat. No. 8,105,481 is incorporated by reference at least for its teachings of the methods and materials used to effect such transformations (both alkylations and halogen reductions).

Still further process embodiments include those processes for increasing the octane of a hydrocarbon feedstock to produce a product having an increased aromatics content comprising contacting a hydrocarbonaceous feedstock which comprises normal and slightly branched hydrocarbons having a boiling range above about 40 C and less than about 200 C under aromatic conversion conditions with the catalyst.

Specific conditions for many of these transformations are known to those of ordinary skill in the art. Exemplary conditions for such reactions/transformations may also be found in WO/1999/008961, U.S. Pat. Nos. 4,544,538, 7,083,714, 6,841,063, and 6,827,843, each of which are incorporated by reference herein in its entirety for at least these purposes.

Depending upon the type of reaction which is catalyzed, the microporous solid may be predominantly in the hydrogen form, partially acidic or substantially free of acidity. The skilled artisan would be able to define these conditions without undue effort. As used herein, "predominantly in the hydrogen form" means that, after calcination (which may also include exchange of the pre-calcined material with $NH_4^+$ prior to calcination), at least 80% of the cation sites are occupied by hydrogen ions and/or rare earth ions.

The germanosilicates of the present invention may also be used as adsorbents for gas separations. For example, these germanosilicate can also be used as hydrocarbon traps, for example, as a cold start hydrocarbon trap in combustion engine pollution control systems. In particular, such germanosilicate may be particularly useful for trapping $C_3$ fragments. Such embodiments may comprise processes and devices for trapping low molecular weight hydrocarbons from an incoming gas stream, the process comprising passing the gas stream across or through a composition comprising any one of the crystalline microporous germanosilicate compositions described herein, so as to provide an outgoing gas stream having a reduced concentration of low molecular weight hydrocarbons relative to the incoming gas stream. In this context, the term "low molecular weight hydrocarbons" refers to C1-C6 hydrocarbons or hydrocarbon fragments.

The germanosilicates of the present invention may also be used in a process for treating a cold-start engine exhaust gas stream containing hydrocarbons and other pollutants, wherein the process comprises or consist of flowing the engine exhaust gas stream over one of the germanosilicate compositions of the present invention which preferentially adsorbs the hydrocarbons over water to provide a first exhaust stream, and flowing the first exhaust gas stream over a catalyst to convert any residual hydrocarbons and other pollutants contained in the first exhaust gas stream to innocuous products and provide a treated exhaust stream and discharging the treated exhaust stream into the atmosphere.

The germanosilicates of the present invention can also be used to separate gases. For example, these can be used to separate water, carbon dioxide, and sulfur dioxide from fluid streams, such as low-grade natural gas streams, and carbon dioxide from natural gas. Typically, the molecular sieve is used as a component in a membrane that is used to separate the gases. Examples of such membranes are disclosed in U.S. Pat. No. 6,508,860.

For each of the preceding processes described, additional corresponding embodiments include those comprising a device or system comprising or containing the materials described for each process. For example, in the gas of the gas trapping, additional embodiments include those devices known in the art as hydrocarbon traps which may be positioned in the exhaust gas passage of a vehicle. In such devices, hydrocarbons are adsorbed on the trap and stored until the engine and exhaust reach a sufficient temperature for desorption. The devices may also comprise membranes comprising the germanosilicate compositions, useful in the processes described.

Terms

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

The transitional terms "comprising," "consisting essentially of" and "consisting" are intended to connote their generally in accepted meanings in the patent vernacular; that is, (i) "comprising," which is synonymous with "including," "containing," or "characterized by," is inclusive or open-ended and does not exclude additional, unrecited elements or method steps; (ii) "consisting of" excludes any element, step, or ingredient not specified in the claim; and (iii) "consisting essentially of" limits the scope of a claim to the specified materials or steps "and those that do not materially affect the basic and novel characteristic(s)" of the claimed invention. Embodiments described in terms of the phrase "comprising" (or its equivalents), also provide, as embodiments, those which are independently described in terms of "consisting of" and "consisting essentially of." For those embodiments provided in terms of "consisting essentially of" the basic and novel characteristic(s) is the facile operability of the methods or compositions/systems to provide the germanosilicate compositions at meaningful yields or the ability of the systems using only those ingredients listed.

The term "meaningful product yields" is intended to reflect product yields such as described herein, but also including greater than 20%, but when specified, this term may also refer to yields of 10%, 20%, 30%, 40%, 50%, 60%, 70%, 80%, or 90% or more, relative to the amount of original substrate.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C," as separate embodiments, as well as $C_{1-3}$.

Throughout this specification, words are to be afforded their normal meaning, as would be understood by those skilled in the relevant art. However, so as to avoid misunderstanding, the meanings of certain terms will be specifically defined or clarified.

The term "alkyl" as used herein refers to a linear, branched, or cyclic saturated hydrocarbon group typically although not necessarily containing 1 to about 6 carbon atoms, such as methyl, ethyl, n-propyl, isopropyl, n-butyl, isobutyl, tert-butyl, and the like.

The term "aromatic" refers to the ring moieties which satisfy the Hückel 4n+2 rule for aromaticity, and includes both aryl (i.e., carbocyclic) and heteroaryl structures.

The term "halide" is used in the conventional sense to refer to a chloride, bromide, fluoride, or iodide.

"Lower alcohols" or lower alkanes refer to alcohols or alkanes, respectively, having 1-10 carbons, linear or branched, preferably 1-6 carbon atoms and preferably linear. Methanol, ethanol, propanol, butanol, pentanol, and hexanol are examples of lower alcohols. Methane, ethane, propane, butane, pentane, and hexane are examples of lower alkanes.

As used herein, unless otherwise specified, the term "elevated temperatures" typically refers to at least one temperature in a range of from about 170° C. to about 230° C. The term "calcining" is reserved for higher temperatures. Unless otherwise specified, it refers to one or more temperatures in a range of from about 450° C. to about 1200° C. The term "delaminating temperature is intended to connote a temperature less than about 150° C., preferably in a range of from about 80° C. to about 120° C.

As used herein, the terms "metals or metalloids," as in "sources of metals or metalloids" or "oxides of metals or metalloids," refers to those Group 4, 5, 8, 13, 14, and 15 elements of the Periodic Table. These elements are typically found as oxides in molecular sieves, including for example, aluminum, boron, gallium, hafnium, iron, silicon, tin, titanium, vanadium, zinc, zirconium, or combinations thereof.

Typical sources of silicon oxide for the reaction mixtures include alkoxides, hydroxides, or oxides of silicon, or combination thereof. Exemplary compounds also include silicates (including sodium silicate), silica hydrogel, silicic acid, fumed silica, colloidal silica, tetra-alkyl orthosilicates, silica hydroxides, or combination thereof. Sodium silicate or tetraorthosilicates, for example tetraethyl orthosilicate (TEOS), diethoxydimethylsilane (DEDMS) and/or 1,3-diethoxy-1,1,3,3-tetramethyldisiloxane (DETMDS) are preferred sources.

Sources of germanium oxide can include alkali metal orthogermanates, $M_4GeO_4$, containing discrete $GeO_4^{4-}$ ions, $GeO(OH)_3^-$, $GeO_2(OH)_2^{2-}$, $[(Ge(OH)_4)_8(OH)_3]^{3-}$ or neutral solutions of germanium dioxide contain $Ge(OH)_4$, or alkoxide or carboxylate derivatives thereof.

Typical sources of aluminum oxide for the reaction mixture include aluminates, alumina, aluminum colloids, aluminum alkoxides, aluminum oxide coated on silica sol, hydrated alumina gels such as $Al(OH)_3$ and a sodium aluminate. Sources of aluminum oxide may also comprise an alkoxide, hydroxide, or oxide of aluminum, or combination thereof. Additionally, the sources of alumina may also comprise other ligands as well, for example acetylacetonate, carboxylates, and oxalates; such compounds are well known as useful in hydrothermal or sol-gel syntheses. Additional sources of aluminum oxide can include aluminum salts, such as $AlCl_3$, $Al(OH)_3$, $Al(NO_3)_3$, and $Al_2(SO_4)_3$, Sources of boron oxide, gallium oxide, hafnium oxide, iron oxide, tin oxide, titanium oxide, indium oxide, vanadium oxide, and/or zirconium oxide can be added in forms corresponding to their aluminum and silicon counterparts.

As used herein, the term "mineral acids" refer to mineralizing acids conventionally used in molecular sieve zeolite syntheses, for example HCl, HBr, HF, $HNO_3$, or $H_2SO_4$. Oxalic acid and other strong organic acids may also be employed in lieu of mineral acids. Generally, HCl and $HNO_3$ are preferred mineral acids. As used herein throughout, the terms "concentrated" and "dilute" with respect to mineral acids refers to concentrations in excess and less than 0.5 $\underline{M}$, respectively. In some embodiments, the term "concentrated" refers to concentrations in one or more of a range from 0.5 to 0.6, from 0.6 to 0.7, from 0.7 to 0.8, from 0.8 to 0.9, from 0.9 to 1.0, from 1.0 to 1.1, from 1.1 to 1.2, from 1.2 to 1.3, from 1.3 to 1.4, from 1.4 to 1.5, from 1.5 to 1.6, from 1.6 to 1.7, from 1.7 to 1.8, from 1.8 to 1.9, and from 1.9 to 2.0 or higher. In experiments described herein, and in preferred embodiments, concentrated acids refer to those in a composition range of from 0.9 to 1.1 M. Similarly, the term "dilute" refers to concentrations in one or more of a range from 0.5 to 0.4, from 0.4 to 0.3, from 0.3 to 0.2, from 0.2 to 0.15, from 0.15 to 0.1, and from 0.1 to 0.05. In experiments described herein, and in preferred embodiments, dilute acids refer to those in a composition range of from 0.5 to 0.15 M.

The term "CIT-5" topology describes a crystalline composition analogous to that described in U.S. Pat. Nos. 6,040,258 and 6,043,179, having a set of one-dimensional extra-large 14-MR pores. Pure silicate and aluminosilicate CIT-5 materials are prepared using very expensive Organic Structure Directing Agent (–)-N-methylsparteinium hydroxide. See Wagner, P., et al., *Chem. Comm.*, 1997m 217902180. The term "CIT-13" topology describes a crystalline microporous composition analogous to that described in U.S. patent application Ser. No. 15/169,816, having a set of orthogonally oriented 14-membered pores. The term "phyllosilicate" refers to a 2-dimensional layered structure of silica-containing oxides.

The terms "oxygenated hydrocarbons" or "oxygenates" as known in the art of hydrocarbon processing to refer to components which include alcohols, aldehydes, carboxylic acids, ethers, and/or ketones which are known to be present in hydrocarbon streams or derived from biomass streams other sources (e.g. ethanol from fermenting sugar).

The terms "separating" or "separated" carry their ordinary meaning as would be understood by the skilled artisan, insofar as they connote physically partitioning or isolating solid product materials from other starting materials or co-products or side-products (impurities) associated with the reaction conditions yielding the material. As such, it infers that the skilled artisan at least recognizes the existence of the product and takes specific action to separate or isolate it from starting materials and/or side- or byproducts. Absolute purity is not required, though it is preferred. In the case where the terms are used in the context of gas processing, the terms "separating" or "separated" connote a partitioning of the gases by adsorption or by permeation based on size or physical or chemical properties, as would be understood by those skilled in the art.

Unless otherwise indicated, the term "isolated" means physically separated from the other components so as to be free of at least solvents or other impurities, such as starting materials, co-products, or byproducts. In some embodiments, the isolated crystalline materials, for example, may be considered isolated when separated from the reaction mixture giving rise to their preparation, from mixed phase co-products, or both. In some of these embodiments, pure germanosilicates (including structures with or without incorporated OSDAs) can be made directly from the described methods. In some cases, it may not be possible to separate crystalline phases from one another, in which case, the term "isolated" can refer to separation from their source compositions.

The term "microporous," according to IUPAC notation refers to a material having pore diameters of less than 2 nm. Similarly, the term "macroporous" refers to materials having pore diameters of greater than 50 nm. And the term "mesoporous" refers to materials whose pore sizes are intermediate between microporous and macroporous. Within the context of the present disclosure, the material properties and applications depend on the properties of the framework such as pore size and dimensionality, cage dimensions and material composition. Due to this there is often only a single framework and composition that gives optimal performance in a desired application.

"Optional" or "optionally" means that the subsequently described circumstance may or may not occur, so that the description includes instances where the circumstance occurs and instances where it does not. For example, the phrase "optionally substituted" means that a non-hydrogen substituent may or may not be present on a given atom, and, thus, the description includes structures wherein a non-hydrogen substituent is present and structures wherein a non-hydrogen substituent is not present.

The terms "method(s)" and "process(es)" are considered interchangeable within this disclosure.

As used herein, the term "crystalline microporous solids" or "crystalline microporous germanosilicate" are crystalline structures having very regular pore structures of molecular dimensions, i.e., under 2 nm. The maximum size of the species that can enter the pores of a crystalline microporous solid is controlled by the dimensions of the channels. These terms may also refer specifically to CIT-13 compositions.

As used herein, the term "pillaring" refers generally to a process that introduces stable metal oxide structures ("so-called "pillars") between substantially parallel crystalline silicate layers. The metal oxide structures keep the silicate layers separated, creating by interlayer spacings of molecular dimensions. The term is generally used in the context of clay chemistry and are well understood by those skilled in the art of clays and zeolites, especially as applied to catalysts.

The term "silicate" refers to any composition including silicate (or silicon oxide) within its framework. It is a general term encompassing, for example, pure-silica (i.e., absent other detectable metal oxides within the framework), aluminosilicate, borosilicate, ferrosilicate, germanosilicate, stannosilicate, titanosilicate, or zincosilicate structures. The term "germanosilicate" refers to any composition including silicon and germanium oxides within its framework. The term "pure," such as "pure silicate" or "pure germanosilicate," connote that these compositions contain, as far as practicably possible, only silica or germania and silica, respectively, and any other metal oxides within the framework are present as inevitable, unintended, impurities. The germanosilicate may be "pure-germanosilicate" or optionally substituted with other metal or metalloid oxides. Likewise, the terms aluminosilicate, borosilicate, ferrosilicate, stannosilicate, titanosilicate, or zincosilicate structures are those containing silicon oxides and oxides of aluminum, boron, iron, tin, titanium, and zinc, respectively. When described as "optionally substituted," the respective framework may contain aluminum, boron, gallium, germanium, hafnium, iron, tin, titanium, indium, vanadium, zinc, zirconium, or other atoms or oxides substituted for one or more of the atoms or oxides not already contained in the parent framework.

As used herein, the term "transition metal" refers to any element in the d-block of the Periodic Table, which includes groups 3 to 12 on the Periodic Table. In actual practice, the f-block lanthanide and actinide series are also considered transition metals and are called "inner transition metals. This definition of transition metals also encompasses Group 3 to Group 12 elements. In certain other independent embodiments, the transition metal or transition metal oxide comprises an element of Groups 6, 7, 8, 9, 10, 11, or 12. In still other independent embodiments, the transition metal or transition metal oxide comprises scandium, yttrium, titanium, zirconium, vanadium, manganese, chromium, molybdenum, tungsten, iron, ruthenium, osmium, cobalt, rhodium, iridium, nickel, palladium, platinum, copper, silver, gold, or mixtures. Fe, Ru, Os, Co, Rh, Ir, Ni, Pd, Pt, Cu, Ag, Au, and mixtures thereof are preferred dopants.

The following listing of Embodiments is intended to complement, rather than displace or supersede, the previous descriptions.

Embodiment 1

A crystalline silicate composition derived or derivable from at least one transformation of a crystalline microporous, optionally hydrothermally derived, CIT-13 germanosilicate. In Aspects of this Embodiment, the crystalline silicate composition is the product of the reaction(s) attributed to them. In other Aspects of this Embodiment, the crystalline silicate is independent of the methods described as used to prepare them (i.e., they may be produced by any other means. In some Aspects of this Embodiment, the CIT-13 germanosilicate has a Si/Ge ratio in a range of from 3.8 to 10. In other Aspects, the optionally hydrothermally derived CIT-13 germanosilicate is one described in U.S. patent application Ser. No. 15/169,816. As described herein, the CIT-13 germanosilicate comprises silica-rich cfi-layers joined and spatially separated by germani-rich D4R units, the latter being subject to modifications under the conditions described herein. In separate Aspects of this Embodiment, the term transformation refers to degermanation of the CIT-13 structures and to the topotactic rearrangement of the germania D4R units. In some Aspects of this Embodiment, the crystalline composition is microporous; in other Aspects, it is not.

Embodiment 2

The crystalline silicate composition of Embodiment 1, further comprising at least one oxide of a metal or metalloid, M, where M is aluminum, boron, gallium, hafnium, iron, tin, titanium, vanadium, zinc, or zirconium. In preferred Aspects of this Embodiment, M is aluminum. In certain Aspects of this Embodiment, the at least one oxide is present in the crystalline silicate composition at levels consistent with those of the precursor crystalline microporous, optionally hydrothermally derived, CIT-13 germanosilicate (i.e., the Si/M ratios are the same or similar). In other Aspects of this Embodiment, the at least one oxide is present in the crystalline silicate composition is enriched relative to those of the precursor crystalline microporous, optionally hydrothermally derived, CIT-13 germanosilicate (i.e., the Si/M ratios at least two times higher in the latter than in the former).

Embodiment 3

The crystalline silicate composition of Embodiment 1 or 2, that is microporous and the result of degermanating the crystalline microporous, optionally hydrothermally derived, CIT-13 germanosilicate.

Embodiment 4

The crystalline silicate composition of any one of Embodiments 1 to 3, that is microporous, having a Si/Ge ratio in a range of from about 25 to about 200. In certain Aspects of this Embodiment, the Si/Ge ratio is in a range from about 25 to about 50, from 50 to about 100, from about 100 to about 125, from about 125 to about 150, from about 150 to about 200, from about 200 to about 250, from about 250 to about 500, from 500 to infinity, or any combination of two or more of these ranges. In certain Aspects of this Embodiment, the composition is one that has been prepared by the reaction of a concentrated mineral acid with a silica-rich CIT-13 germanosilicate having a Si/Ge ratio in a range of from about 4.5 to about 10, under conditions described herein for this conversion. In still other Aspects of this Embodiment, the composition exhibits a PXRD patter having peaks associated with the (200) and (110) crystallographic planes as described in FIG. 7

Embodiment 5

The crystalline silicate composition of Embodiment 4 further comprising at least one oxide of a metal or metalloid, M, where M is aluminum, boron, gallium, hafnium, iron, silicon, tin, titanium, vanadium, zinc, or zirconium, in a Si/M ratio in a range from about 25 to about 250. In certain Aspects of this Embodiment, the Si/M ratio is in range from about 25 to about 50, from 50 to about 100, from about 100 to about 125, from about 125 to about 150, from about 150 to about 200, from about 200 to about 250, from about 250 to about 500, from 500 to infinity, or any combination of two or more of these ranges. In certain Aspects of this Embodiment, the composition is one that has been prepared by the reaction of a concentrated mineral acid and a source of the metal or metalloid oxide with a silica-rich CIT-13 germanosilicate having a Si/Ge ratio in a range of from about 4.5 to about 10, under conditions described herein for this conversion. In other Aspects of this Embodiment, the crystalline silicate composition may be characterized as having silica-rich cfi-layers connected by units comprising at least one oxide of aluminum, boron, gallium, hafnium, iron, silicon, tin, titanium, vanadium, zinc, or zirconium.

Embodiment 6

The crystalline silicate composition of any one of Embodiments 1 to 5 that is a microporous aluminosilicate.

Embodiment 7

Figure 10:
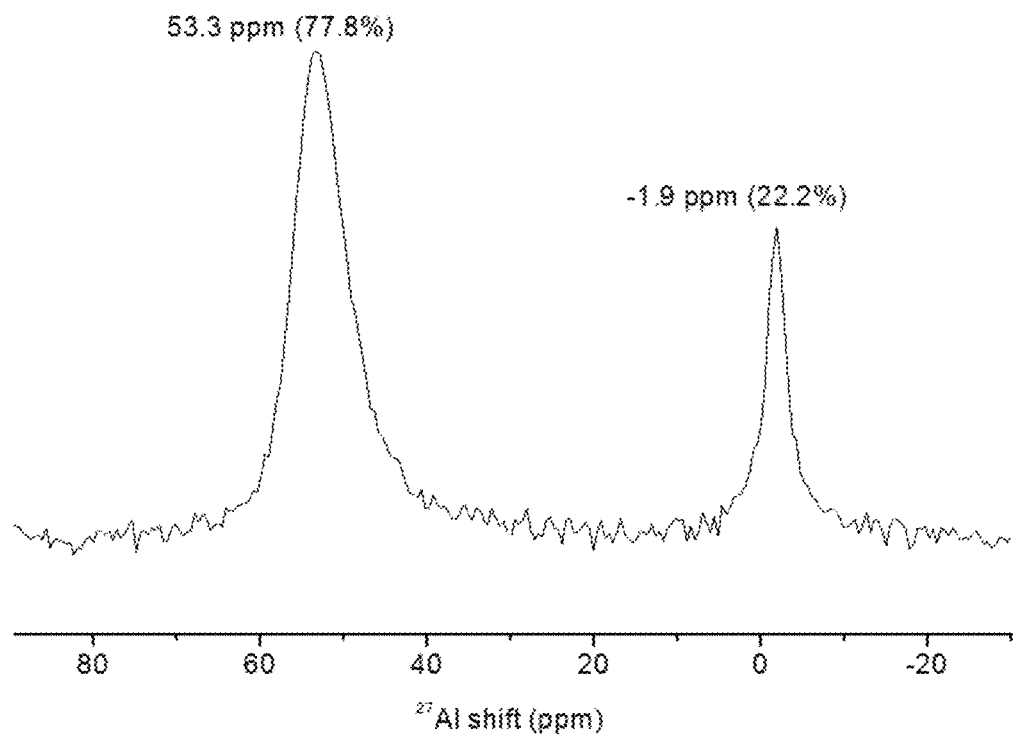
FIG. 10 show $^{27}$Al MAS NMR data for the aluminated CIT-13 germanosilicates, obtained before and after washing the first formed product of the alumination to remove the octahedral alumina. The upper spectrum showed that about ⅔ of the alumina was extra-framework. Exchanging with Na$^+$ and washing removed much of this extra-framework octahedral alumina.
Figure 10:
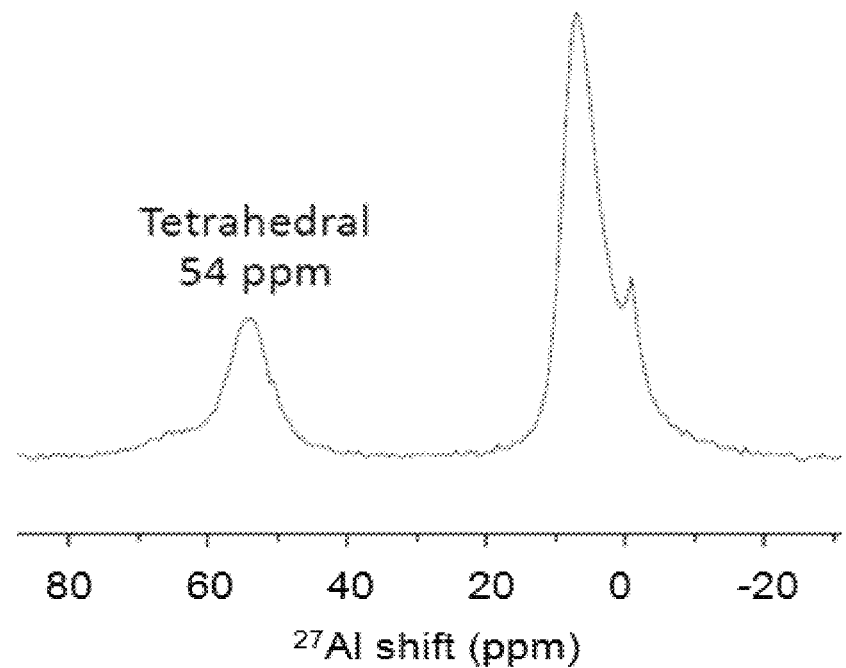

The crystalline silicate composition of Embodiment 5 or 6 that exhibits a $^{27}$Al MAS NMR spectrum having a characteristic chemical shift at about 54.1 ppm, relative to 1 M aqueous aluminum nitrate solution, corresponding to tetrahedral Al sites. In further Aspects of this Embodiment, the aluminosilicate further exhibits chemical shifts at or about 64.7 ppm and/or at or about 47.0 ppm, for example as shown in FIG. 10, corresponding to additional tetrahedral sites, and optionally chemical shifts at or about 6.7, 0.5, −1.1, and/or −7.1 ppm, corresponding to octahedral sites.

Embodiment 8

Figure 11B:
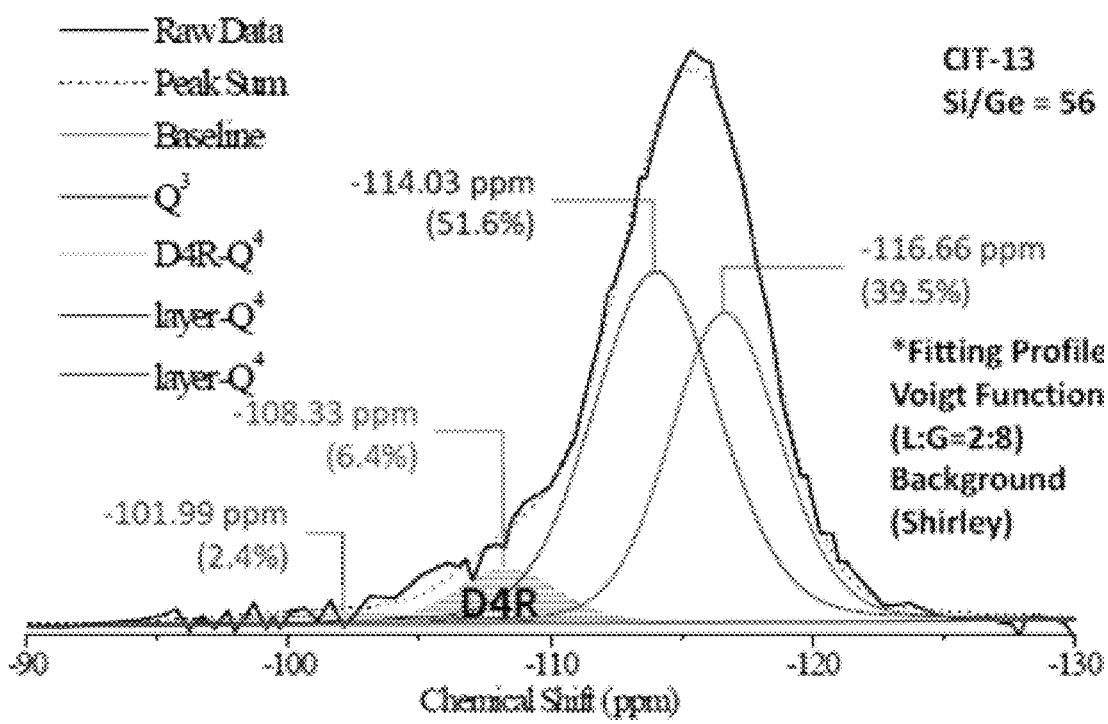

The crystalline silicate composition of any one of Embodiments 5 to 7 that exhibits a $^{29}$Si MAS NMR spectrum having characteristic chemical shifts at about −110 ppm and −115 ppm, relative to tetramethylsilane (TMS). In certain Aspects of this Embodiment, the $^{29}$Si MAS NMR spectrum contains the features as shown in FIGS. 11(A-B).

Embodiment 9

The crystalline silicate composition of Embodiment 1 or 2, which comprises a crystalline microporous germanosilicate composition having CIT-5 topology and a Si/Ge ratio in a range of from about 3.8 to about 5. In certain Aspects of this Embodiment, the Si/Ge ratio is in at least one of the ranges of from about 3.8 to about 4, from about 4 to about 4.2, from about 4.2 to about 4.4, from about 4.4 to about 4.6, from about 4.6 to about 4.8, or from about 4.8 to about 5.

Embodiment 10

The crystalline silicate composition of Embodiment 9, wherein the crystalline microporous CIT-5 germanosilicate is derived from the topotactic rearrangement of a germanium-rich CIT-13 germanosilicate having the same or similar Si/Ge. In other Aspects of this Embodiment, the composition may be described as comprising a double zig-zag chains of germania joining and holding separate substantially parallel silica-containing cfi-layers.

Embodiment 11

The crystalline silicate composition of Embodiment 9 or 10, wherein the germanosilicate composition having CIT-5 topology is prepared by applying heat, steam, or both heat and steam in the substantial absence of mineral acid to the crystalline microporous CIT-13germanosilicate composition designated CIT-13 composition having a Si/Ge ratio in a range of from about 3.8 to about 5.

Embodiment 12

The crystalline silicate composition of Embodiment 1 or 2, which comprises a crystalline microporous germanosilicate composition having CIT-5 topology and a Si/Ge ratio in a range of from about 5 to about 250. In certain Aspects of this Embodiment, the Si/Ge ratio is in at least one of the ranges of from about 5 to about 10, from about 10 to about 20, from about 20 to about 30, from about 30 to about 40, from about 40 to about 50, from about 50 to about 100, from about 100 to about 150, from about 150 to about 200, or from about 200 to about 250. In other Aspects of this Embodiment, the CIT-5 germanosilicate composition is derived from the reaction of mineral acid with a germania-rich CIT-5 germanosilicate having a Si/Ge ratio in a range of from about 3.8 to about 5, or as described in any one of Embodiments 9 to 11.

Embodiment 13

The crystalline silicate composition of Embodiment 12, further comprising at least one oxide of a metal or metalloid, M, where M is aluminum, boron, gallium, hafnium, iron, silicon, tin, titanium, vanadium, zinc, or zirconium, in a Si/M ratio in a range from about 25 to about 250. In certain Aspects of this Embodiment, the Si/M ratio is in range from about 25 to about 50, from 50 to about 100, from about 100 to about 125, from about 125 to about 150, from about 150 to about 200, from about 200 to about 250, from about 250 to about 500, from 500 to infinity, or any combination of two or more of these ranges. In certain Aspects of this Embodiment, the composition is one that has been prepared by the reaction of a concentrated mineral acid and a source of the metal or metalloid oxide with a germania-rich CIT-5 germanosilicate of any one of Embodiments 9 to 11, under conditions described herein for this conversion. In other Aspects of this Embodiment, the crystalline silicate composition may be characterized as having silica-rich cfi-layers connected by units comprising at least one oxide of aluminum, boron, gallium, hafnium, iron, silicon, tin, titanium, vanadium, zinc, or zirconium.

Embodiment 14

The crystalline silicate composition of Embodiment 1 or 2, designated CIT-13P, that is a phyllosilicate comprising siloxylated silica-rich cfi-layers having a Si/Ge ratio in a range of from about 30 to about 250, or from about 50 to about 100. In certain Aspects of this Embodiment, the phyllosilicate, when stacked, exhibits a PXRD pattern characterized by two major peaks in a range of from about 6 to about 9 2-θ. In other Aspects of this Embodiment, the phyllosilicate transforms to the germanosilicate CIT-15 on calcination. In still other Aspects of this Embodiment, the phyllosilicate transforms to the germanosilicate CIT-14 under pillaring conditions.

Embodiment 15

The crystalline silicate composition of Embodiment 14, wherein the phyllosilicate exhibits two major peak in the PXRD pattern is a peak in a range of from about 7.2 (±0.2) degrees 2-θ to about 8.2 (±0.2) degrees 2-θ.

Embodiment 16

The crystalline silicate composition of Embodiment 14 or 15, which exhibits a $^{29}$Si and $^{1}$H-$^{29}$Si CP MAS NMR spectrum having the chemical shifts as shown in FIG. 26. In certain Aspects of this Embodiment, the relative intensities of Q4/Q3 peaks is in a range of from 2:1 to 1:1

Embodiment 17

Figure 32:
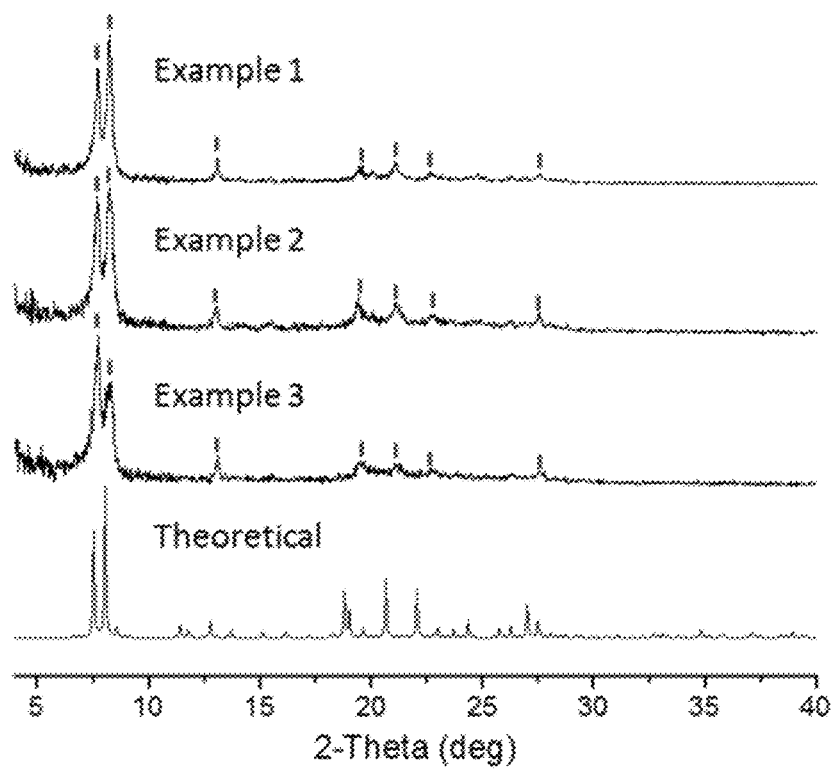
FIG. 32 shows the PXRD patterns associated with CIT-14 germanosilicates including the effect of precursor Si/Ge ratios on the position of the main peaks. See Table 9.
Figure 33B:
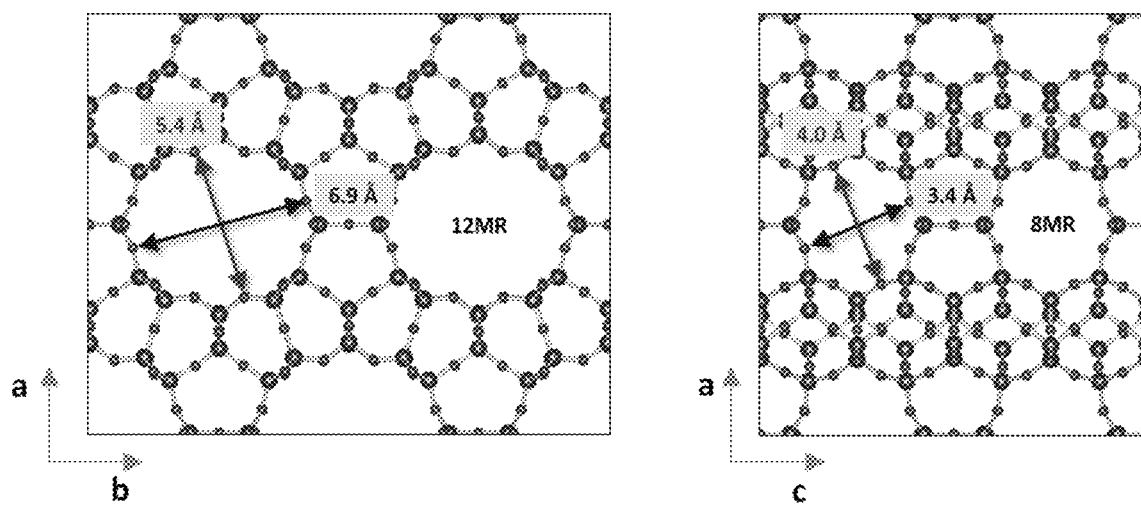

The crystalline silicate composition of Embodiment 1 or 2, designated CIT-14, that is a crystalline microporous germanosilicate having a Si/Ge ratio in a range of from about 25 to infinity. In some Aspects, the Si/Ge ratio is defined by at least on range of from about 25 to about 50, from about 50 to about 75, from about 75 to about 100, from about 100 to about 150, from about 150 to about 250, from about 250 to about 500, or from about 500 to about infinity (i.e., germania-free). In some Aspects, the CIT-14 germanosilicate exhibits a PXRD pattern having at least five of the characteristic peaks of Table 9. In certain Aspects of this Embodiment, the PXRD pattern is substantially as shown in FIG. 32 or FIG. 33. In other Aspects of this Embodiment, the CIT-14 germanosilicate is derived from the pillaring synthesis described elsewhere herein.

Embodiment 18

The crystalline silicate composition of any one of Embodiments 1, 2, or 17, designated CIT-14, that comprises a three dimensional framework having pore channels defined by 8- and 12-membered rings. In certain Aspects of this Embodiment, the pore channel dimensions of the 8- and 12-membered rings are 4.0×3.4 Å and 6.9×5.4 Å, respectively.

Embodiment 19

The crystalline silicate composition of any one of Embodiments 1, 2, 17, or 18, designated CIT-14, which exhibits at least one of:

(a) a powder X-ray diffraction (XRD) pattern exhibiting at least five of the characteristic peaks at 7.55±0.2, 8.06±0.2, 12.79±0.2, 18.82±0.2, 19.04±0.2, 20.67±0.2, 22.07±0.2, 24.36±0.2, 27.01±0.2, and 27.48±0.2 degrees 2-θ; as shown in FIG. 34(A); or (b) a powder X-ray diffraction (XRD) pattern substantially the same as shown in FIG. 32 or 33

Embodiment 20

The crystalline silicate composition of Embodiment 1 or 2 that is a crystalline microporous germanosilicate composition of CIT-15 topology comprising a three dimensional framework and having pore channels defined by 10-membered rings. In some Aspects of this Embodiment, the pore dimensions of the 10-membered rings are 5.6 Å×3.8 Å. In some Aspects of this Embodiment, the CIT-15 germanosilicate is derived from the calcination of the CIT-13P material, described herein.

Embodiment 21

Figure 28:
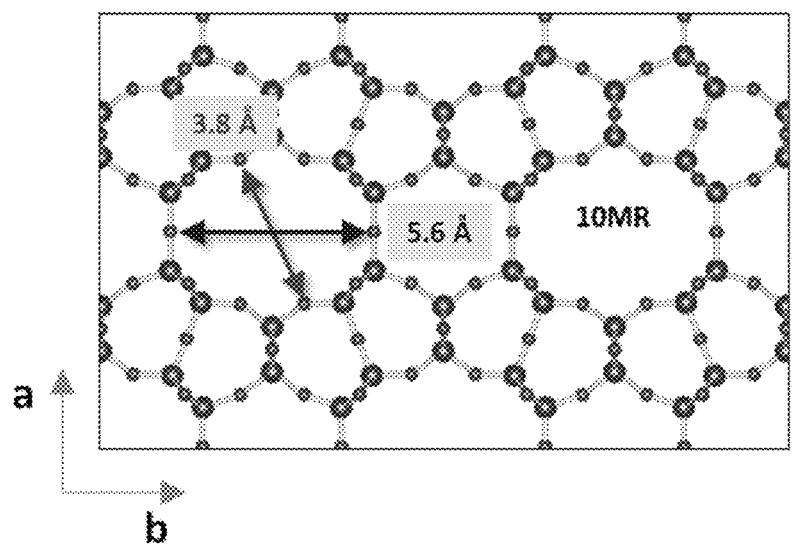
FIG. 28 shows a schematic representation of the pore size channel dimensions of CIT-15 germanosilicate.

The crystalline silicate composition of any one of Embodiments 1, 2, or 20 which exhibits at least one of:

(a) a powder X-ray diffraction (XRD) pattern exhibiting at least five of the characteristic peaks at 8.15±0.2, 10.13±0.2, 12.80±0.2, 16.35±0.2, 19.03±0.2, 19.97±0.2, 20.33±0.2, 23.79±0.2, 23.91±0.2, 24.10±0.2, 24.63±0.2, 25.77±0.2, 26.41±0.2, 27.75±0.2, 34.73±0.2, and 37.78±0.2 degrees 2-θ;

(b) a powder X-ray diffraction (XRD) pattern substantially the same as shown in FIG. 28 or 31; or (c) unit cell parameters substantially equal to the following at:

| Space group | Cmmm |
|---|---|
| a (Å) | 17.4686(5) |
| b (Å) | 13.8271(2) |
| c (Å) | 5.1665(2) |
| α = β = γ | 90° |
| Space Group | 65 (Cmmm) |

Embodiment 22

The crystalline silicate composition of Embodiment 21 which exhibits a powder X-ray diffraction (XRD) pattern exhibiting at least ten of the characteristic at 8.15±0.2, 10.13±0.2, 12.80±0.2, 16.35±0.2, 19.03±0.2, 19.97±0.2, 20.33±0.2, 23.79±0.2, 23.91±0.2, 24.10±0.2, 24.63±0.2, 25.77±0.2, 26.41±0.2, 27.75±0.2, 34.73±0.2, and 37.78±0.2 degrees 2-θ.

Embodiment 23

The crystalline silicate composition of any one of Embodiments 20 to 22, having a Si/Ge ratio in a range of from 25 to infinity. In some Aspects, the Si/Ge ratio is defined by at least on range of from about 25 to about 50, from about 50 to about 75, from about 75 to about 100, from about 100 to about 150, from about 150 to about 250, from about 250 to about 500, or from about 500 to about infinity (i.e., germania-free).

Embodiment 24

The crystalline silicate composition of any one of Embodiments 1 to 23, in its hydrogen form.

Embodiment 25

The crystalline microporous silicate or germanosilicate composition of any one of Embodiments 1 to 13 or 17 to 23, further comprising a metal cation salt, a transition metal, a transition metal oxide, or a transition metal salt in its micropores. In specific Aspects of this Embodiments, the metal cation salt, a transition metal, a transition metal oxide, or a transition metal salt is any one elsewhere described herein for this purpose

Embodiment 26

A catalyst comprising the crystalline microporous silicate composition of any one of Embodiments 1 to 13 or 17 to 25.

Embodiment 27

A process for affecting an organic transformation, the process comprising:

(a) carbonylating DME with CO at low temperatures;
(b) reducing NOx with methane:
(c) cracking, hydrocracking, or dehydrogenating a hydrocarbon;
(d) dewaxing a hydrocarbon feedstock;
(d) converting paraffins to aromatics:
(e) isomerizing or disproportionating an aromatic feedstock;
(f) alkylating an aromatic hydrocarbon;
(g) oligomerizing an alkene;
(h) aminating a lower alcohol;
(i) separating and sorbing a lower alkane from a hydrocarbon feedstock;
(j) isomerizing an olefin;
(k) producing a higher molecular weight hydrocarbon from lower molecular weight hydrocarbon;
(l) reforming a hydrocarbon
(m) converting a lower alcohol or other oxygenated hydrocarbon to produce an olefin product (including MTO);
(n) epoxiding olefins with hydrogen peroxide;
(o) reducing the content of an oxide of nitrogen contained in a gas stream in the presence of oxygen;
(p) separating nitrogen from a nitrogen-containing gas mixture; or
(q) converting synthesis gas containing hydrogen and carbon monoxide to a hydrocarbon stream; or
(r) reducing the concentration of an organic halide in an initial hydrocarbon product;
by contacting the respective feedstock with the catalyst of Embodiment 26, under conditions sufficient to affect the named transformation.

Embodiment 28

A method comprising calcining a crystalline microporous CIT-13 germanosilicate composition, having a Si/Ge ratio in a range of from about 3.8 to about 5.4, at a temperature in a range of from about 450° C. to about 1200° C., optionally in the presence of steam, but in the absence of mineral acid, for a time sufficient so as to convert the CIT-13 germanosilicate to a germanosilicate composition of CIT-5 topology. In certain Aspects of this Embodiment, the Si/Ge ratio of the CIT-5 germanosilicate is the same as or similar to that of the CIT-13 germanosilicate. In certain Aspects of this Embodiment, the synthesis of the precursor CIT is done in a static oven. In other Aspects, the synthesis is done in a moving chamber, preferably a rotating oven. In other Aspects of this Embodiment, the calcining is done in the presence of steam. In other Aspects, the calcining is done before or after the application of steam preferably at a temperature in a range of from 600° C. to about 1000° C., preferably in a range of from 700° C. to 900° C. In other Aspects, the CIT-5 germanosilicate is isolated.

Embodiment 29

The method of Embodiment 28, further comprising subjecting the CIT-5 germanosilicate to concentrated mineral acid under conditions sufficient (e.g., 175° C.-190° C. for 24 hours) to degermanate at least a portion of the CIT-5 germanosilicate, so as to produce a CIT-5 germanosilicate with a Si/Ge ratio in a range of from about 25 to about 250. In other Aspects, the product CIT-5 germanosilicate is isolated.

Embodiment 30

The method of Embodiment 28, further comprising subjecting the CIT-5 germanosilicate to concentrated mineral acid in the presence of a source of a metal or metalloid oxide, M, where M is aluminum, boron, gallium, hafnium, iron, silicon, tin, titanium, vanadium, zinc, or zirconium, preferably aluminum, under conditions sufficient (e.g., 175° C.-190° C. for 24 hours) to degermanate at least a portion of the CIT-5 germanosilicate, so as to produce a CIT-5 germanosilicate with a Si/Ge ratio in a range of from about 25 to about 250 and with a Si/M ratio in a range from about 25 to about 250. In other Aspects, the product CIT-5 germanosilicate is isolated.

Embodiment 31

A method comprising treating a crystalline microporous CIT-13 germanosilicate composition, having a Si/Ge ratio in a range of from about 4.5 to about 10, with a concentrated mineral acid (e.g., ca. 1 M) under conditions sufficient (e.g., 175° C.-190° C. for 24 hours) to degermanate at least a portion of the CIT-13 germanosilicate, so as to produce a CIT-13 germanosilicate with a Si/Ge ratio in a range of from about 25 to about 250. In other Aspects, the product CIT-13 germanosilicate is isolated.

Embodiment 32

The method of Embodiment 31, further comprising subjecting the CIT-13 germanosilicate to concentrated mineral acid in the presence of a source of a metal or metalloid oxide, M, where M is aluminum, boron, gallium, hafnium, iron, silicon, tin, titanium, vanadium, zinc, or zirconium, preferably aluminum, under conditions sufficient (e.g., 175° C.-190° C. for 24 hours) to degermanate at least a portion of the CIT-13 germanosilicate, so as to produce a CIT-13 germanosilicate with a Si/Ge ratio in a range of from about 25 to about 250 and with a Si/M ratio in a range from about 25 to about 250. In other Aspects, the product CIT-13 germanosilicate is isolated.

Embodiment 33

A method comprising treating a crystalline microporous CIT-13 germanosilicate composition, having a Si/Ge ratio in a range of from about 3.8 to about 5.4, with a dilute mineral acid (e.g., ca. 0.1 M) under conditions sufficient (e.g., 90° C.-110° C. for 24 hours) to delaminate at least a portion of the CIT-13 germanosilicate to form CIT-13P, as described elsewhere herein. In other Aspects, the product CIT-13P germanosilicate is isolated.

Embodiment 34

The method of Embodiment 34, further comprising calcining the CIT-13P under conditions sufficient (e.g., 580° C.-750° C. for 6 to 8 hours, in the presence of absence of C1-12 alkyl amines) to form a germanosilicate of CIT-15 topology.

Embodiment 35

The method of Embodiment 34, further comprising subjecting the CIT-13P to conditions consistent with a pillaring reaction, for example treating with a concentrated (e.g., ca. 1 M) mineral acid in the presence of a silica source under conditions to form a alkoxylated intermediate (e.g., 175° C. for 18-24 hours) followed by calcining the alkoxylated intermediate under conditions sufficient (e.g., 580° C. to 750° C. for 6-8 hours) to form a CIT-14 germanosilicate.

EXAMPLES

The following Examples provide the experimental methods used to characterize these novel materials as well as illustrate some of the concepts described within this disclosure. While each Example, both provided here and elsewhere in the body of the specification, is considered to provide specific individual embodiments of composition, methods of preparation and use, none of the Examples should be considered to limit the more general embodiments described herein.

In the following examples, efforts have been made to ensure accuracy with respect to numbers used (e.g. amounts, temperature, etc.) but some experimental error and deviation should be accounted for. Unless indicated otherwise, temperature is in degrees C., pressure is at or near atmospheric.

Example 1: Materials and Methods

Unless otherwise noted, all reagents were purchased from commercial sources and were used as received. Unless otherwise noted all, reactions were conducted in flame-dried glassware under an atmosphere of argon. Hydroxide ion exchanges were performed using OH-form styrene-divinylbenzene (DVB)-matrix ion exchange resin (DOWEX™ MARATHON™ A) with an exchange capacity of 1 meq/mL. Titrations were performed using a Mettler-Toledo DL22 autotitrator using 0.01 M HCl as the titrant. All liquid NMR spectra were recorded with a 500 MHz Varian Spectrometer. Liquid NMR spectra were recorded on Varian Mercury spectrometers.

All powder x-ray diffraction characterization were conducted on a Rigaku MiniFlex II diffractometer with Cu Kα radiation.

Solid-state $^{29}$Si MAS NMR and $^{27}$Al MAS NMR spectra were obtained using a Bruker DSX-500 spectrometer (11.7 T) and a Bruker 4 mm MAS probe. The spectral operating frequency was 99.4 MHz for the $^{29}$Si nuclei and 78.2 MHz for the $^{27}$Al nuclei using a 90° pulse length of 2 μs and a cycle delay time of 1 s. Spectra were referenced to external tetramethylsilane (TMS) standard for $^{29}$Si and a 1 M aqueous aluminum nitrate solution for $^{27}$Al. Samples were spun at 8 kHz for $^{29}$Si MAS and CPMAS NMR experiments and 12 kHz for $^{27}$Al MAS.

An Oxford X-Max SDD X-ray Energy Dispersive Spectrometer (EDS) system was used for determining the Si/Al and Si/Ge ratios of the samples. All powder x-ray diffraction (PXRD) characterization was conducted on a Rigaku MiniFlex II with Cu Kα radiation. Elemental analysis of calcined zeolite samples was performed using EDS.

SEM analyses were performed on a ZEISS 1550 VP FESEM, equipped with an Oxford X-Max SDD X-ray Energy Dispersive Spectrometer (EDS) system for determining the elemental ratios of the samples.

Example 2. Preparation of CIT-13P 100 mg of freshly calcined CIT-13 was dispersed in 160 ml of 0.1 N HCl aqueous solution. The mixture was stirred at 99° C. for 24 hours. After that, the solid was filtrated and dried at room temperature. The yield of this delamination is typically about 60-70%. The XRD peak corresponding to the interlayer diffraction of CIT-13P is about 8.19-8.20°. (complete removal of d4r) Otherwise (2theta<8°)

As those skilled in the art will appreciate, numerous modifications and variations of the present invention are possible in light of these teachings, and all such are contemplated hereby. All references cited herein are incorporated by reference herein, at least for their teachings in the context presented.

What is claimed:

1. A crystalline microporous silicate composition comprising a three-dimensional framework having pore channels defined by 10-membered rings, the crystalline microporous silicate composition having a Si/Ge ratio of from 25 to infinity and having a an x-ray diffraction (XRD) pattern with characteristic peaks at 8.15±0.2, 10.13±0.2, 12.80±0.2, 16.35±0.2, 20.33±0.2, and 25.77±0.2 degrees 2-θ, wherein the peak at 10.13±0.2 degrees 2-θ is the most intense peak in the X-ray diffraction (XRD) pattern.

2. The crystalline microporous silicate composition of claim 1, further comprising at least one oxide of a metal or metalloid, M, where M is aluminum, boron, gallium, hafnium, iron, tin, titanium, vanadium, zinc, or zirconium.

Figure 29:
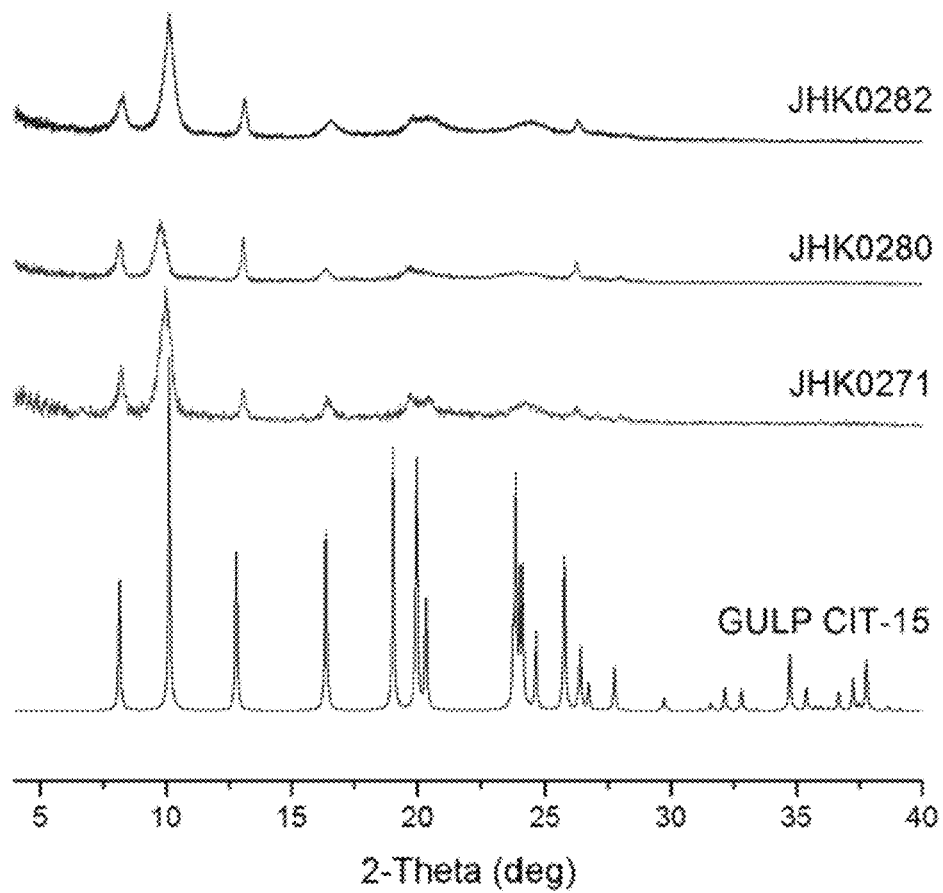
FIG. 29 shows a comparison of experimentally derived and theoretic PXRD patterns for CIT-15 germanosilicate.

3. The crystalline microporous silicate composition of claim 1 that exhibits at least one of:
(a) a powder X-ray diffraction (XRD) pattern having at least eight of the characteristic peaks at 8.15±0.2, 10.13±0.2, 12.80±0.2, 16.35±0.2, 19.03±0.2, 19.97±0.2, 20.33±0.2, 23.79±0.2, 23.91±0.2, 24.10±0.2, 24.63±0.2, 25.77±0.2, 26.41±0.2, 27.75±0.2, 34.73±0.2, and 37.78±0.2, degrees 2-θ, including those set forth in claim 1, wherein the park at 10.13±0.2 degrees 2-θ is the most intense peak in the X-ray diffraction (XRD) pattern;
(b) a powder X-ray diffraction (XRD) pattern substantially the same as shown in FIG. 27 or 29; or
(c) unit cell parameters substantially equal to the following:

| Space group | Cmmm |
|---|---|
| a (Å) | 17.4686(5) |
| b (Å) | 13.8271(2) |
| c (Å) | 5.1665(2) |
| α = β = γ | 90° |
| Space Group | 65 (Cmmm). |

4. The crystalline microporous silicate composition of claim 1 that exhibits a powder X-ray diffraction (XRD) pattern having characteristic peaks at 8.15±0.2, 10.13±0.2, 12.80±0.2, 16.35±0.2, 19.03±0.2, 19.97±0.2, 20.33±0.2, 23.79±0.2, 23.91±0.2, 24.10±0.2, 24.63±0.2, 25.77±0.2, 26.41±0.2, 34.73±0.2, and 37.78±0.2 degrees 2-θ, including those peaks set forth in claim 1, wherein the peak at 10.13±0.2 degrees 2-θ is the most intense peak in the X-ray diffraction (XRD) pattern.

5. The crystalline microporous silicate composition of claim 4 that exhibits a powder X-ray diffraction (XRD) pattern having at least ten of the characteristic peaks at 8.15±0.2, 10.13±0.2, 12.80±0.2, 16.35±0.2, 19.03±0.2, 19.97±0.2, 20.33±0.2, 23.79±0.2, 23.91±0.2, 24.10±0.2, 24.63±0.2, 25.77±0.2, 26.41±0.2, 27.75±0.2, 34.73±0.2, and 37.78±0.2 degrees 2-θ, including those peaks set forth in claim 1, wherein the peak at 10.13±0.2 degrees 2-θ is the most intense peak in the X-ray diffraction (XRD) pattern.

6. The crystalline microporous silicate composition of claim 1 that exhibits a powder X-ray diffraction (XRD) pattern substantially the same as shown in FIG. 27 or 29.

7. The crystalline microporous silicate composition of claim 1 having unit cell parameters substantially equal to the following:

| Space group | Cmmm |
|---|---|
| a (Å) | 17.4686(5) |
| b (Å) | 13.8271(2) |
| c (Å) | 5.1665(2) |
| α = β = γ | 90° |
| Space Group | 65 (Cmmm). |

8. The crystalline microporous silicate composition of claim 1, wherein the pore channels defined by 10-membered rings have channel dimensions of 5.6 Å×3.8 Å.

9. The crystalline microporous silicate composition of claim 1, in its hydrogen form.

10. The crystalline microporous silicate composition of claim 1, further comprising a metal cation salt, a transition metal, a transition metal oxide, or a transition metal salt in its micropores.

11. The crystalline microporous silicate composition of claim 1 that is a germanosilicate having a Si/Ge ratio of from 25 to 200.

12. The crystalline microporous germanosilicate composition of claim 11 having a Si/Ge ratio of from 50 to 100.

13. The crystalline microporous germanosilicate composition of claim 11 that exhibits at least one of:
(a) a powder X-ray diffraction (XRD) pattern having at least eight of the characteristic peaks at 8.15±0.2, 10.13±0.2, 12.80±0.2, 16.35±0.2, 19.03±0.2, 19.97±0.2, 20.33±0.2, 23.79±0.2, 23.91±0.2, 24.10±0.2, 24.63±0.2, 25.77±0.2, 26.41±0.2, 27.75±0.2, 34.73±0.2, and 37.78±0.2 degrees 2-θ, wherein the peak at 10.13±0.2 degrees 2-θ is the most intense peak in the X-ray diffraction (XRD) pattern;
(b) a powder X-ray diffraction (XRD) pattern substantially the same as shown in FIG. 27 or 29; or
(c) unit cell parameters substantially equal to the following:

| Space group | Cmmm |
|---|---|
| a (Å) | 17.4686(5) |
| b (Å) | 13.8271(2) |
| c (Å) | 5.1665(2) |
| α = β = γ | 900 |
| Space Group | 65 (Cmmm). |

14. The crystalline microporous germanosilicate composition of claim 11 that exhibits a powder X-ray diffraction (XRD) pattern having characteristic peaks at 8.15±0.2, 10.13±0.2, 12.80±0.2, 16.35±0.2, 19.03±0.2, 19.97±0.2, 20.33±0.2, 23.79±0.2, 23.91±0.2, 24.10±0.2, 24.63±0.2, 25.77±0.2, 26.41±0.2, 27.75±0.2, 34.73±0.2, and 37.78±0.2 degrees 2-θ, wherein the peak at 10.13±0.2 degrees 2-θ is the most intense peak in the X-ray diffraction (XRD) pattern.

15. The crystalline microporous germanosilicate composition of claim 14 that exhibits a powder X-ray diffraction (XRD) pattern having at least ten of the characteristic peaks at 8.15±0.2, 10.13±0.2, 12.80±0.2, 16.35±0.2, 19.03±0.2, 19.97±0.2, 20.33±0.2, 23.79±0.2, 23.91±0.2, 24.10±0.2, 24.63±0.2, 25.77±0.2, 26.41±0.2, 27.75±0.2, 34.73±0.2, and 37.78±0.2 degrees 2-θ, wherein the peak at 10.13±0.2 degrees 2-θ is the most intense peak in the X-ray diffraction (XRD) pattern.

16. The crystalline microporous silicate composition of claim 11 that exhibits a powder X-ray diffraction (XRD) pattern substantially the same as shown in FIG. 27 or 29.

17. The crystalline microporous silicate composition of claim 11 having unit cell parameters substantially equal to the following:

| Space group | Cmmm |
|---|---|
| a (Å) | 17.4686(5) |
| b (Å) | 13.8271(2) |
| c (Å) | 5.1665(2) |
| α = β = γ | 900 |
| Space Group | 65 (Cmmm). |

18. The crystalline microporous germanosilicate composition of claim 11, wherein the pore channels defined by 10-membered rings have channel dimensions of 5.6 Å×3.8 Å.

19. The crystalline microporous silicate composition of claim 11, in its hydrogen form.

20. The crystalline microporous germanosilicate composition of claim 11, further comprising a metal cation salt, a transition metal, a transition metal oxide, or a transition metal salt in its micropores.

21. A method of preparing the crystalline microporous germanosilicate composition of claim 11, the method comprising calcining a phyllosilicate of CIT-13P topology under conditions sufficient to form the crystalline microporous germanosilicate composition of CIT-15 topology.

22. The method of claim 21 comprising calcining a phyllosilicate of CIT-13P topology at a temperature in a range of from 400° C. to 950° C., thereby producing the crystalline germanosilicate composition designated CIT-15, the calcining optionally done in the presence of a $C_{1-12}$ alkyl amine, the phyllosilicate comprising siloxylated silica-rich cfi-layers having a Si/Ge ratio in a range of from 25 to 250, wherein the phyllosilicate designated CIT-13P is characterized as exhibiting one or both of:
  (i) two major peaks in the PXRD pattern a range of from 7.2 (±0.2) degrees 2-θ to 8.2 (±0.2) degrees 2-θ; or
  (ii) a $^{29}$Si MAS NMR spectrum showing characteristic peaks at chemical shifts of −105 ppm and −113 ppm or an $^{1}$H-$^{29}$Si CP MAS NMR spectrum showing peaks at −94 ppm, −105 ppm, and −113 ppm, relative to tetramethylsilane (TMS).

23. A catalyst comprising the crystalline microporous germanosilicate composition claim 11, the catalyst further optionally comprising at least one metal cation salt, transition metal, transition metal oxide, or transition metal salt in its micropores.

24. A process for affecting an organic transformation, the process comprising:
  (a) carbonylating DME with CO at low temperatures;
  (b) reducing NOx with methane;
  (c) cracking, hydrocracking, or dehydrogenating a hydrocarbon;
  (d) dewaxing a hydrocarbon feedstock;
  (e) converting paraffins to aromatic;
  (f) isomerizing or disproportionating an aromatic feedstock;
  (g) alkylating an aromatic hydrocarbon;
  (h) oligomerizing an alkene;
  (i) aminating a lower alcohol;
  (j) separating and sorbing a lower alkane from a hydrocarbon feedstock;
  (k) isomerizing an olefin;
  (l) producing a higher molecular weight hydrocarbon from lower molecular weight hydrocarbon;
  (m) reforming a hydrocarbon;
  (n) converting a lower alcohol or other oxygenated hydrocarbon to produce an olefin product (including MTO);
  (o) epoxidizing olefins with hydrogen peroxide;
  (p) reducing the content of an oxide of nitrogen contained in a gas stream in the presence of oxygen;
  (q) separating nitrogen from a nitrogen-containing gas mixture; or
  (r) converting synthesis gas containing hydrogen and carbon monoxide to a hydrocarbon stream; or
  (s) reducing the concentration of an organic halide in an initial hydrocarbon product;
  by contacting the respective feedstock with the catalyst of claim 23, under conditions sufficient to affect the named transformation.

25. A catalyst comprising the crystalline microporous germanosilicate composition claim 1, the catalyst further optionally comprising at least one metal cation salt, transition metal, transition metal oxide, or transition metal salt in its micropores.

26. A process for affecting an organic transformation, the process comprising:
  (a) carbonylating DME with CO at low temperatures;
  (b) reducing NOx with methane:
  (c) cracking, hydrocracking, or dehydrogenating a hydrocarbon;
  (d) dewaxing a hydrocarbon feedstock;
  (e) converting paraffins to aromatics:
  (f) isomerizing or disproportionating an aromatic feedstock;
  (g) alkylating an aromatic hydrocarbon;
  (h) oligomerizing an alkene;
  (i) aminating a lower alcohol;
  (j) separating and sorbing a lower alkane from a hydrocarbon feedstock;
  (k) isomerizing an olefin;
  (l) producing a higher molecular weight hydrocarbon from lower molecular weight hydrocarbon;
  (m) reforming a hydrocarbon
  (n) converting a lower alcohol or other oxygenated hydrocarbon to produce an olefin product (including MTO);
  (o) epoxidizing olefins with hydrogen peroxide;
  (p) reducing the content of an oxide of nitrogen contained in a gas stream in the presence of oxygen;
  (q) separating nitrogen from a nitrogen-containing gas mixture; or
  (r) converting synthesis gas containing hydrogen and carbon monoxide to a hydrocarbon stream; or
  (s) reducing the concentration of an organic halide in an initial hydrocarbon product; by contacting the respective feedstock with the catalyst of claim 25, under conditions sufficient to affect the named transformation.

* * * * *